US012752406B2

(12) United States Patent
Wood et al.

(10) Patent No.: US 12,752,406 B2
(45) Date of Patent: Oct. 6, 2026

(54) ADAPTIVE NUT REMOVAL MODE IN A POWER TOOL

(71) Applicant: MILWAUKEE ELECTRIC TOOL CORPORATION, Brookfield, WI (US)

(72) Inventors: Jacob G. Wood, Waukesha, WI (US); Jacob P. Schneider, Cedarburg, WI (US); Zachary G. Stanke, Wausau, WI (US); Shuvam Gupta, Wauwatosa, WI (US); Peng Peng, Rochester Hills, MI (US); Kaelan Anderson, Hancock, MI (US); Gareth Mueckl, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 345 days.

(21) Appl. No.: 18/697,943

(22) PCT Filed: Oct. 11, 2022

(86) PCT No.: PCT/US2022/046240
§ 371 (c)(1),
(2) Date: Apr. 2, 2024

(87) PCT Pub. No.: WO2023/064247
PCT Pub. Date: Apr. 20, 2023

(65) Prior Publication Data

US 2025/0235994 A1 Jul. 24, 2025

Related U.S. Application Data

(60) Provisional application No. 63/254,256, filed on Oct. 11, 2021.

(51) Int. Cl.
*H02P 21/20* (2016.01)
*B25B 21/02* (2006.01)
(Continued)

(52) U.S. Cl.
CPC .......... *B25B 23/1475* (2013.01); *B25B 21/02* (2013.01); *H02P 21/0089* (2013.01); *H02P 21/20* (2016.02); *H02P 25/184* (2013.01)

(58) Field of Classification Search
CPC ..... B25B 23/1475; B25B 21/02; H02P 21/20; H02P 21/0089; H02P 25/184
(Continued)

(56) References Cited

U.S. PATENT DOCUMENTS

| | | | |
|---|---|---|---|
| 10,646,982 | B2 | 5/2020 | Dey, IV et al. |
| 2004/0195994 | A1 | 10/2004 | Kume et al. |

(Continued)

FOREIGN PATENT DOCUMENTS

| | | | |
|---|---|---|---|
| JP | 2021008018 | A | 1/2021 |
| KR | 20160141942 | A | 12/2016 |

OTHER PUBLICATIONS

International Search Report and Written Opinion for Application No. PCT/US2022/046240 dated Feb. 8, 2023 (12 pages).

*Primary Examiner* — Nathaniel C Chukwurah
(74) *Attorney, Agent, or Firm* — Michael Best & Friedrich LLP

(57) ABSTRACT

Systems and methods for providing an adaptive nut removal mode in a power tool. The power tool includes a housing and a motor. The motor includes a rotor and a stator. The stator includes a plurality of stator windings. A power switching circuit is configured to provide a supply of power from a power source to the motor. An electronic controller is configured to control the power tool to remove a fastener from a joint. The electronic controller is configured to monitor a torque of the motor, determine whether the torque of the motor is equal to or less than a threshold torque value, operate, when the torque is greater than the threshold torque value, the motor in an loosening mode while the torque of the motor decreases, and increase, when the torque is equal
(Continued)

to or less than the threshold torque value, a speed of the motor.

20 Claims, 36 Drawing Sheets

(51) Int. Cl.
*B25B 23/147* (2006.01)
*H02P 21/00* (2016.01)
*H02P 25/18* (2006.01)

(58) Field of Classification Search
USPC .......................................................... 173/176
See application file for complete search history.

(56) References Cited

U.S. PATENT DOCUMENTS

| | | | | |
|---|---|---|---|---|
| 2014/0070738 | A1 | 3/2014 | Luedtke et al. | |
| 2015/0165604 | A1* | 6/2015 | Bartoszek | B25B 21/02<br>173/1 |
| 2016/0121467 | A1* | 5/2016 | Ng | B25B 23/1475<br>81/464 |
| 2018/0133873 | A1 | 5/2018 | Mergener | |
| 2020/0180128 | A1* | 6/2020 | Schneider | B25B 23/1475 |

* cited by examiner

| Phase | #SSRs |
|---|---|
| Orange | 1 |
| Blue | 1 |
| Green | 0 |

| Phase | #SSRs |
|---|---|
| Orange | 0 |
| Blue | 1 |
| Green | 0 |

2800

ADAPTIVE NUT REMOVAL MODE IN A POWER TOOL

RELATED APPLICATIONS

This application claims the benefit of U.S. Provisional Patent Application No. 63/254,256, filed Oct. 11, 2021, the entire content of which is hereby incorporated by reference.

FIELD

Embodiments described herein relate to brushless direct current motor power tools.

SUMMARY

Conventional power tools remove nuts (and/or other types of fasteners) from another fastener by operating the motor of the power tool at a high torque until the nut has broken away from the joint between the nut and the other fastener. The conventional power tool then reduces motor speed so as to reduce a likelihood of dropping or losing the nut. This conventional nut removal method improves control when removing nuts when, if dropped, the nut could become an inconvenience, become damaged, or be lost. When the conventional power tool stops the impact mode, a speed of the conventional power tool motor slows so it is easier for a user to identify the nut has broken free and allows an operator of the conventional power tool to prepare for the final removal sequence, when tension is no longer present in the joint between the nut and the other fastener and the nut may spin freely or with relatively low trailing thread torque.

While greater control can be of benefit, slowing the speed of the conventional power tool can reduce productivity. In some applications, the greater control may have less important benefit, in particular where control is less important than quickly performing nut removal. In these situations, it may be beneficial for the speed of the tool to increase rather than decrease when tension is eliminated. For example, in applications where long (e.g., greater than 1 nut width) threaded stud sections must be passed for nut removal, the conventional nut removal mode may pose a net decrease to productivity because the time to fully remove the nut may increase when the lower speed mode is active. These applications may be in iron or utility work where studs are anchored in concrete or are used to assist in alignment of beams and towers, or in heavy duty maintenance where stud/bolt lengths are long to ensure complete engagement of nut threads in all assembled scenarios.

Therefore, it would be beneficial to implement an adaptive nut removal mode, which gives users the ability to increase productivity while maintaining control. In particular, the adaptive nut removal mode is configured such that the speed of the motor is increased following the elimination of tension on the nut to quickly remove the nut from the other fastener, but decreases before the nut is entirely disengaged from the other fastener so as to maintain control of the nut.

Embodiments described herein provide a power tool including a housing and a motor within the housing. The motor includes a rotor and a stator. The stator includes a plurality of stator windings. A power switching circuit is configured to provide a supply of power from a power source to the motor. An electronic controller is configured to control the power tool to remove a fastener from a joint. The electronic controller is configured to monitor a torque of the motor, determine whether the torque of the motor is equal to or less than a threshold torque value, operate, when the torque of the motor is greater than the threshold torque value, the motor in an loosening mode while the torque of the motor decreases, and increase, when the torque of the motor is equal to or less than the threshold torque value, a speed of the motor.

Embodiments described herein provide a method implemented on a power tool for removing a fastener. The method includes monitoring a torque of a motor of the power tool, determining whether the torque of the motor is equal to or less than a threshold torque value, operating, when the torque of the motor is greater than the threshold torque value, the motor in a loosening mode while the torque of the motor decreases, and increasing, when the torque of the motor is equal to or less than the threshold torque value, a speed of the motor.

Embodiments described herein provide non-transitory computer readable medium storing a set of computer executable instructions for controlling operation of a power tool to monitor a torque of a motor of the power tool, determine whether the torque of the motor is equal to or less than a threshold torque value, operate, when the torque of the motor is greater than the threshold torque value, the motor in a loosening mode while the torque of the motor decreases, and increase, when the torque of the motor is equal to or less than the threshold torque value, a speed of the motor.

Embodiments described herein provide a power tool that includes a housing and a motor within the housing. The motor includes a rotor and a stator. The stator includes a plurality of stator windings. A power switching circuit is configured to provide a supply of power from a power source to the motor. An electronic controller is configured to control the power tool to remove a fastener from a joint. The electronic controller is configured to monitor a torque of the motor, determine whether the torque of the motor is equal to or less than a threshold torque value, operate, when the torque of the motor is greater than the threshold torque value, the motor in a loosening mode while the torque of the motor decreases, and increase, when the torque of the motor is equal to or less than the threshold torque value, a speed of the motor.

In some aspects, the electronic controller is further configured to apply an amount of field weakening to increase the speed of the motor.

In some aspects, the electronic controller is further configured to control the motor to maintain the increased speed of the motor for a predetermined time.

In some aspects, the electronic controller is further configured to reduce the amount of field weakening to decrease the speed of the motor after the predetermined time.

In some aspects, to determine the amount of field weakening, the electronic controller is configured to determine a parameter of the motor, determine, in response to determining that the parameter of the motor has exceeded a first predetermined threshold, a first stator flux current based on a max-torque-per-amps ("MTPA") algorithm, and inject the first stator flux current to the motor into reduce a magnetic flux of the motor.

In some aspects, to determine the amount of field weakening, the electronic controller is further configured to determine, in response to determining that the parameter of the motor has exceeded a second predetermined threshold, a second stator flux current based on a max-torque-per-volts ("MTPV") algorithm, and inject the second stator flux current into the motor to reduce the magnetic flux of the motor, the second predetermined threshold is greater than the first predetermined threshold.

In some aspects, to determine the amount of field weakening, the electronic controller is further configured to determine, in response to determining that the parameter of the motor has exceeded a third predetermined threshold, a third stator flux current based on the MTPA algorithm, and inject the third stator flux current into the motor to reduce the magnetic flux of the brushless motor, the third predetermined threshold is greater than the second predetermined threshold.

In some aspects, the power tool includes a plurality of switches configured to selectively couple the plurality of stator windings in a first configuration or a second configuration.

In some aspects, the electronic controller is further configured to change a motor configuration of the motor from the first configuration to the second configuration to increase the speed of the motor.

In some aspects, the electronic controller is further configured to operate the motor such that the parameter of the motor remains increased for a predetermined time.

In some aspects, the electronic controller is further configured to change a motor configuration of the motor from the second configuration to the first configuration to decrease the speed of the motor.

In some aspects, to change the motor configuration of the motor from the first configuration to the second configuration, the electronic controller is further configured to determine that the plurality of stator windings is configured in the first configuration and control the plurality of switches to configure the plurality of stator windings in the second configuration.

In some aspects, to change the motor configuration of the motor from the second configuration to the first configuration, the electronic controller is further configured to determine that the plurality of stator windings is configured in the second configuration and control the plurality of switches to configure the plurality of stator windings in the first configuration.

In some aspects, the first configuration is a WYE configuration and the second configuration is a DELTA configuration.

In some aspects, the power tool includes an impact mechanism including a hammer and an anvil, and an end tool coupled to the anvil and configured to removably couple to the fastener to transfer a rotational force of the power tool to the fastener. The hammer is configured to receive a rotational force from the motor and the anvil configured to be rotated by receiving an impacting force from the hammer.

Embodiments described herein provide a method implemented on a power tool for removing a fastener. The method includes monitoring a torque of a motor of the power tool, determining whether the torque of the motor is equal to or less than a threshold torque value, operating, when the torque of the motor is greater than the threshold torque value, the motor in a loosening mode while the torque of the motor decreases, and increasing, when the torque of the motor is equal to or less than the threshold torque value, a speed of the motor.

In some aspects, the method also includes applying an amount of field weakening to increase the speed of the motor.

In some aspects, the method also includes controlling the motor to maintain the increased speed of the motor for a predetermined time.

In some aspects, the method also includes reducing the amount of field weakening to decrease the speed of the motor after the predetermined time.

In some aspects, to determine the amount of field weakening, the method also includes determining a parameter of the motor; determining, in response to determining that the parameter of the motor has exceeded a first predetermined threshold, a first stator flux current based on a max-torque-per-amps ("MTPA") algorithm, and injecting the first stator flux current to the motor into reduce a magnetic flux of the motor.

In some aspects, to determine the amount of field weakening, the method also includes determining, in response to determining that the parameter of the motor has exceeded a second predetermined threshold, a second stator flux current based on a max-torque-per-volts ("MTPV") algorithm, and injecting the second stator flux current into the motor to reduce the magnetic flux of the motor. The second predetermined threshold is greater than the first predetermined threshold.

In some aspects, to determine the amount of field weakening, the method also includes determining, in response to determining that the parameter of the motor has exceeded a third predetermined threshold, a third stator flux current based on the MTPA algorithm, and injecting the third stator flux current into the motor to reduce the magnetic flux of the brushless motor. The third predetermined threshold is greater than the second predetermined threshold.

In some aspects, the motor includes a plurality of switches and a plurality of stator windings. The method also includes coupling, selectively, the plurality of switches to the plurality of stator windings in a first configuration or a second configuration.

In some aspects, the method also includes changing a motor configuration of the motor from the first configuration to the second configuration to increase the speed of the motor.

In some aspects, the method also includes operating the motor such that the parameter of the motor remains increased for a predetermined time.

In some aspects, the method also includes changing a motor configuration of the motor from the second configuration to the first configuration to decrease the speed of the motor.

In some aspects, to change the motor configuration of the motor from the first configuration to the second configuration, the method also includes determining that the plurality of stator windings is configured in the first configuration, and controlling the plurality of switches to configure the plurality of stator windings in the second configuration.

In some aspects, to change the motor configuration of the motor from the second configuration to the first configuration, the method also includes determining that the plurality of stator windings is configured in the second configuration, and controlling the plurality of switches to configure the plurality of stator windings in the first configuration.

In some aspects, the first configuration is a WYE configuration and the second configuration is a DELTA configuration.

In some aspects, the power tool removes a fastener from a joint and the power tool includes an impact mechanism and an end tool. The impact mechanism includes a hammer and an anvil. The anvil is coupled to the end tool and removably coupleable to the fastener to transfer a rotational force of the power tool to the fastener. The method also includes controlling the motor to provide a rotational force to the hammer. The anvil is rotated by receiving an impacting force from the hammer.

Embodiments escribed herein provide a non-transitory computer-readable medium that stores a set of computer executable instructions for controlling operation of a power tool to monitor a torque of a motor of the power tool, determine whether the torque of the motor is equal to or less than a threshold torque value, operate, when the torque of the motor is greater than the threshold torque value, the motor in a loosening mode while the torque of the motor decreases, and increase, when the torque of the motor is equal to or less than the threshold torque value, a speed of the motor.

In some aspects, the non-transitory computer-readable medium further stores computer executable instructions for controlling operation of a power tool to apply an amount of field weakening to increase the speed of the motor.

In some aspects, the non-transitory computer-readable medium further stores computer executable instructions for controlling operation of a power tool to maintain the increased speed of the motor for a predetermined time.

In some aspects, the non-transitory computer-readable medium further stores computer executable instructions for controlling operation of a power tool to decrease the speed of the motor after the predetermined time.

In some aspects, the non-transitory computer-readable medium further stores computer executable instructions for controlling operation of a power tool to determine a parameter of the motor, determine, in response to determining that the parameter of the motor has exceeded a first predetermined threshold, a first stator flux current based on a max-torque-per-amps ("MTPA") algorithm, and inject the first stator flux current to the motor into reduce a magnetic flux of the motor.

In some aspects, to determine the amount of field weakening, the non-transitory computer-readable medium further stores computer executable instructions for controlling operation of a power tool to determine, in response to determining that the parameter of the motor has exceeded a second predetermined threshold, a second stator flux current based on a max-torque-per-volts ("MTPV") algorithm and inject the second stator flux current into the motor to reduce the magnetic flux of the motor. The second predetermined threshold is greater than the first predetermined threshold.

In some aspects, to determine the amount of field weakening, the non-transitory computer-readable medium further stores computer executable instructions for controlling operation of a power tool to determine, in response to determining that the parameter of the motor has exceeded a third predetermined threshold, a third stator flux current based on the MTPA algorithm and inject the third stator flux current into the motor to reduce the magnetic flux of the brushless motor. The third predetermined threshold is greater than the second predetermined threshold.

In some aspects, the motor includes a plurality of switches and a plurality of stator windings, and the non-transitory computer-readable medium further stores computer executable instructions for controlling operation of a power tool to couple, selectively, the plurality of switches to the plurality of stator windings in a first configuration or a second configuration.

In some aspects, the non-transitory computer-readable medium further stores computer executable instructions for controlling operation of a power tool to change a motor configuration of the motor from the first configuration to the second configuration to increase the speed of the motor.

In some aspects, the non-transitory computer-readable medium further stores computer executable instructions for controlling operation of a power tool to operate the motor such that the parameter of the motor remains increased for a predetermined time.

In some aspects, the non-transitory computer-readable medium further stores computer executable instructions for controlling operation of a power tool to change a motor configuration of the motor from the second configuration to the first configuration to decrease the speed of the motor.

In some aspects, to change the motor configuration of the motor from the first configuration to the second configuration, the non-transitory computer-readable medium further stores computer executable instructions for controlling operation of a power tool to determine that the plurality of stator windings is configured in the first configuration and control the plurality of switches to configure the plurality of stator windings in the second configuration.

In some aspects, to change the motor configuration of the motor from the first configuration to the second configuration, the non-transitory computer-readable medium further stores computer executable instructions for controlling operation of a power tool to determine that the plurality of stator windings is configured in the second configuration and control the plurality of switches to configure the plurality of stator windings in the first configuration.

In some aspects, the first configuration is a WYE configuration and the second configuration is a DELTA configuration.

In some aspects, the power tool removes a fastener from a joint and the power tool includes an impact mechanism and an end tool. The impact mechanism includes a hammer and an anvil. The anvil is coupled to the end tool and removably coupleable to the fastener to transfer a rotational force of the power tool to the fastener. The set of computer executable instructions includes instructions to control the motor to provide a rotational force to the hammer. The anvil is rotated by receiving an impacting force from the hammer.

Embodiments described herein provide a power tool that includes a housing and a motor within the housing. The motor includes a rotor and a stator. The stator includes a plurality of stator windings. An impact mechanism includes a hammer and an anvil. An end tool is coupled to the anvil and is configured to removably couple to a fastener. A power switching circuit is configured to provide a supply of power from a power source to the motor. An electronic controller is configured to control the power tool to remove the fastener from a joint. The electronic controller is configured to monitor a state of the power tool, the state of the power tool including an impacting state or a non-impacting state, operate, when in the impacting state, the motor in a loosening mode, and increase, when in the non-impacting state, a speed of the motor.

In some aspects, the state of the power tool is determined based on a motor torque.

Embodiments described herein provide a power tool that includes a housing and a motor within the housing. The motor includes a rotor and a stator. The stator includes a plurality of stator windings. An impact mechanism includes a hammer and an anvil. An end tool is coupled to the anvil and is configured to removably couple to a fastener. A power switching circuit is configured to provide a supply of power from a power source to the motor. An electronic controller is configured to control the power tool to remove the fastener from a joint. The electronic controller is configured to monitor rotation of the anvil, determine whether the rotation per impact of the anvil is equal to or less than a threshold rotation value, operate, when the rotation per impact of the anvil is greater than the threshold rotation value, the motor in a loosening mode, and increase, when the rotation per impact of the anvil is equal to or less than the threshold rotation value, a speed of the motor.

In some aspects, the electronic controller is further configured to determine the rotation per impact of the anvil based on an anvil rotation sensor.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to systems, methods, and devices for power tools, such as handheld power tools, that implement an adaptive nut removal mode. Conventional power tools remove nuts from another fastener by operating the motor of the power tool at a high torque until the nut has broken away from the joint between the nut and the other fastener (e.g., a high torque or loosening mode) until there is limited or no tension on the nut. The conventional power tool then reduces motor speed so as to reduce a likelihood of dropping or losing the nut. By contrast, an adaptive nut removal mode increases motor speed following the high-torque operation so that the nut is disengaged from the remainder of the other fastener more quickly. Once the nut is almost disengaged, a controller can reduce the speed of the motor so as to reduce a likelihood of dropping or losing the nut. The speed increase and subsequent decrease can be achieved by several methods, such as dynamic field weakening, motor configuration switching, a combination thereof, or other speed control methods.

It should be understood that the term "nut" is used herein to describe a generic fastener removed by a power tool in an adaptive nut removal mode. In some embodiments, the fastener being removed is a nut, while in other embodiments the fastener being removed may be another type of fastener, such as a bolt, a screw, another threaded fastener, etc. Therefore, the term "nut," as used herein, does not necessarily refer to only a nut, but may also refer to other types of fasteners. Similarly, the terms "nut" and "fastener" may be used interchangeably.

Figure 1:
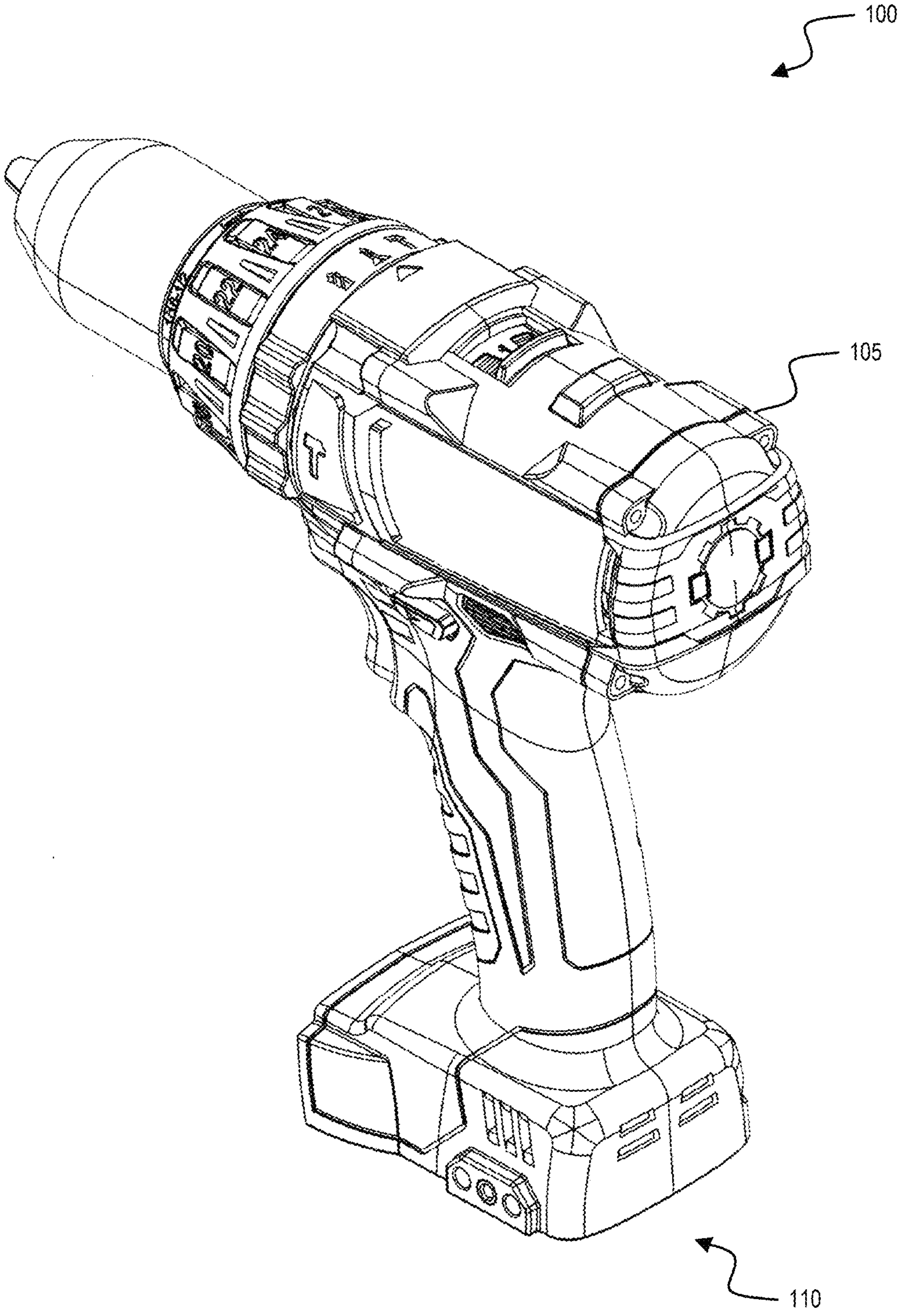
FIG. 1 illustrates a power tool implementing an adaptive nut removal mode, according to some embodiments.

FIG. 1 illustrates a power tool 100 that implements an adaptive nut removal mode. In the embodiment illustrated in FIG. 1, the power tool 100 is a drill/driver. In other embodiments, the power tool 100 is a different type of power tool (e.g., an impact wrench, a hammer drill, an impact driver, a rotary hammer, etc.). The power tool 100 includes a housing 105 and a battery pack interface 110 for connecting the power tool 100 to, for example, a battery pack. In some embodiments, the battery pack interface 110 may be configured to connect the power tool 100 to another device. In some embodiments, the power tool 100 may be configured to implement dynamic field weakening. In some embodiments, the power tool 100 may be configured to implement motor configuration switching.

Figure 2:
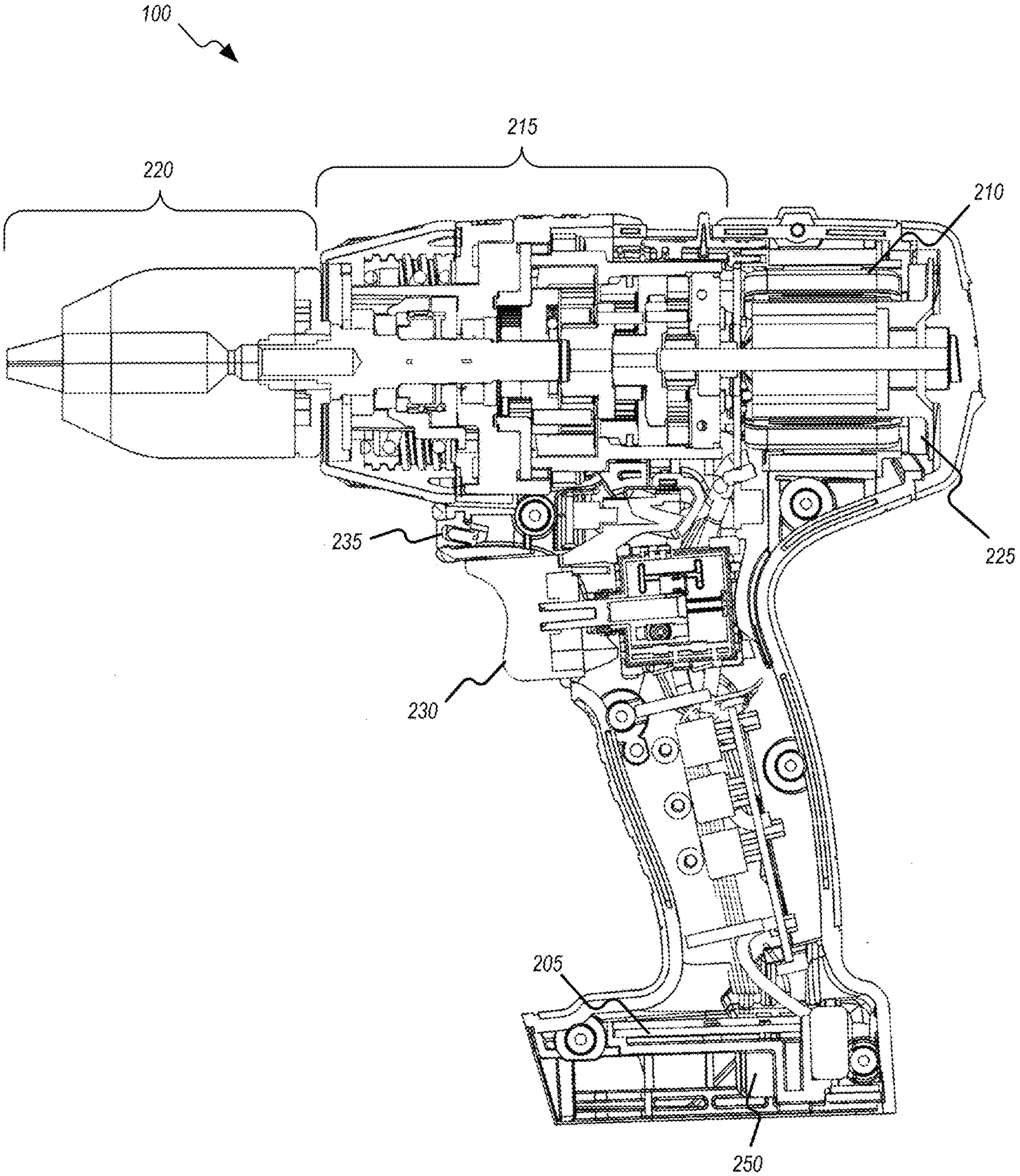
FIG. 2 illustrates a cross-sectional view of a power tool implementing an adaptive nut removal mode, according to some embodiments.

FIG. 2 illustrates a cross section of the power tool 100 of FIG. 1. The power tool 100 includes at least one printed circuit board ("PCB") 205 for various components of the power tool 100. In some embodiments, the PCB 205 is a control PCB. In addition to or instead of the control PCB, the power tool 100 may include a power PCB, a forward/reverse PCB, and/or a light-emitting diode ("LED") PCB. The power tool 100 may further include a motor 210. In some embodiments, the motor 210 may be a sensorless motor. Also illustrated in FIG. 2 is a drive mechanism 215 for transmitting the rotational output of the motor 210 to an output unit 220, and a cooling fan 225 rotated by the motor 210 and used to provide a cooling air flow over components of the power tool 100. In some embodiments, the drive mechanism 215 is an impact mechanism including a hammer and an anvil. In these embodiments, the hammer may be configured to be rotated by the motor 210 until a biasing force of the hammer is greater than a rotational force of the motor 210. The hammer is configured to strike the anvil to transfer rotational energy from the motor 210 to the anvil. The anvil is coupled to the output unit 220. The power tool 100 may further include a trigger 230 configured to be actuated by a user. In some embodiments, an amount of actuation of the trigger 230 is used to determine an amount of power supplied to the motor 210. The power tool 100 may further include a work light 235 configured to illuminate a working area of the power tool 100. In some embodiments, the work light 235 is mounted below the drive mechanism 215. In some embodiments, the work light 235 is configured to be activated in response to an actuation of the trigger 230.

Figure 3:
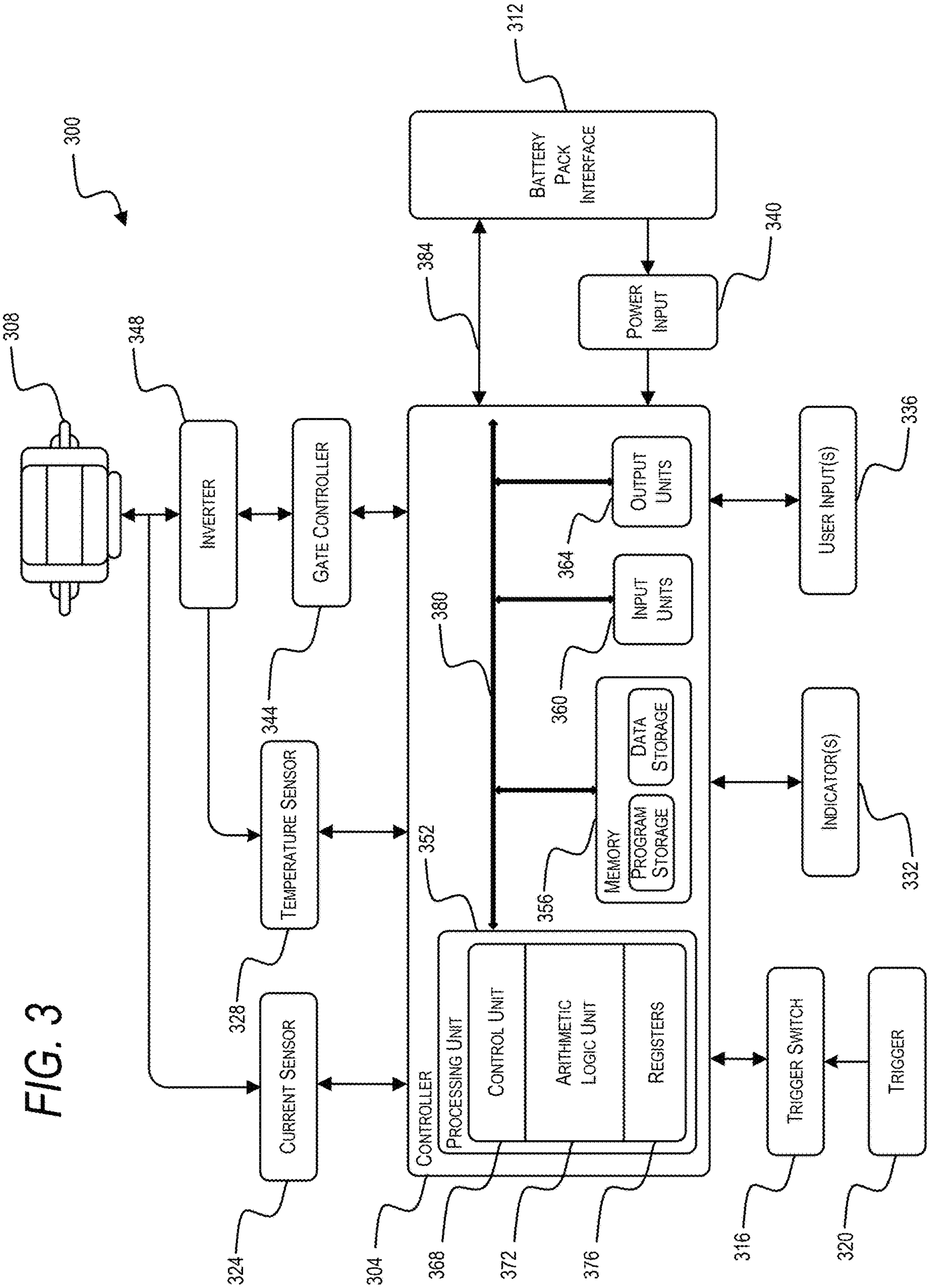
FIG. 3 illustrates a control system for a power tool implementing an adaptive nut removal mode, according to some embodiments.

FIG. 3 illustrates a control system 300 for a power tool implementing an adaptive nut removal mode (for example, the power tool 100 of FIG. 1). The control system 300 includes a controller 304. The controller 304 is electrically and/or communicatively connected to a variety of modules or components of the power tool. For example, the illustrated controller 304 is electrically connected to a sensorless motor 308 (for example, the motor 210 of FIG. 2), a battery pack interface 312 (for example, the battery pack interface 110 of FIG. 1), a trigger switch 316 (connected to a trigger 320, for example, the trigger 230 of FIG. 2), one or more sensors including at least a current sensor 324 and a temperature sensor 328, one or more indicators 332, one or more user input modules 336, a power input module 340, and a gate controller 344 (connected to an inverter 348). The motor 308 includes a rotor, a stator, and a shaft that rotates about a longitudinal axis. In some embodiments, the one or more sensors include an anvil rotation sensor for sensing or detecting an amount of rotation of the anvil (e.g., as the result of an impact with the hammer).

The controller 304 includes combinations of hardware and software that are operable to, among other things, control the operation of the power tool, monitor the operation of the power tool, activate the one or more indicators 332 (e.g., an LED), etc. The gate controller 344 is configured to control the inverter 348 to convert a DC power supply to a three-phase signal for powering the phases of the sensorless motor 308. The current sensor 324 is configured to, for example, sense a current between the inverter 348 and the sensorless motor 308. The temperature sensor is configured to, for example, sense a temperature of the inverter 348.

The controller 304 includes a plurality of electrical and electronic components that provide power, operational control, and protection to the components and modules within the controller 304 and/or the power tool 100. For example, the controller 304 includes, among other things, a processing unit 352 (e.g., a microprocessor, a microcontroller, an electronic controller, an electronic processor, or another suitable programmable device), a memory 356, input units 360, and output units 364. The processing unit 352 includes, among other things, a control unit 368, an arithmetic logic unit ("ALU") 372, and a plurality of registers 376 (shown as a group of registers in FIG. 3), and is implemented using a known computer architecture (e.g., a modified Harvard architecture, a von Neumann architecture, etc.). The processing unit 352, the memory 356, the input units 360, and the output units 364, as well as the various modules or circuits connected to the controller 304 are connected by one or more control and/or data buses (e.g., common bus 380). The control and/or data buses are shown generally in FIG. 3 for illustrative purposes. The use of one or more control and/or data buses for the interconnection between and communication among the various modules, circuits, and components would be known to a person skilled in the art in view of the invention described herein.

The memory 356 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 352 is connected to the memory 356 and executes software instructions that are capable of being stored in a RAM of the memory 356 (e.g., during execution), a ROM of the memory 356 (e.g., on a generally permanent basis), or another non-transitory computer readable medium such as another memory or a disc. Software included in the implementation of the power tool can be stored in the memory 356 of the controller 304. The software includes, for example, firmware, one or more applications, program data, filters, rules, one or more program modules, and other executable instructions. The controller 304 is configured to retrieve from the memory 356 and execute, among other things, instructions related to the control processes and methods described herein. In other constructions, the controller 304 includes additional, fewer, or different components.

The battery pack interface 312 includes a combination of mechanical components (e.g., rails, grooves, latches, etc.) and electrical components (e.g., one or more terminals) configured to and operable for interfacing (e.g., mechanically, electrically, and communicatively connecting) the power tool 100 with a battery pack. For example, power provided by the battery pack to the power tool is provided through the battery pack interface 312 to the power input module 340. The power input module 340 includes combinations of active and passive components to regulate or control the power received from the battery pack prior to power being provided to the controller 304. The battery pack interface 312 also supplies power to the inverter 348 to be switched by the switching FETs to selectively provide power to the sensorless motor 308. The battery pack interface 312 also includes, for example, a communication line 384 to provide a communication line or link between the controller 304 and the battery pack.

The indicators 332 include, for example, one or more light-emitting diodes ("LEDs"). The indicators 332 can be configured to display conditions of, or information associated with, the power tool. For example, the indicators 332 are configured to indicate measured electrical characteristics of the power tool, the status of the power tool, etc. The one or more user input modules 336 may be operably coupled to the controller 304 to, for example, select a forward mode of operation or a reverse mode of operation, a torque and/or speed setting for the power tool (e.g., using torque and/or speed switches), etc. In some embodiments, the one or more user input modules 336 may include a combination of digital and analog input or output devices required to achieve a desired level of operation for the power tool, such as one or more knobs, one or more dials, one or more switches, one or more buttons, etc. In some embodiments, the one or more user input modules 336 may receive signals wirelessly from a device external to the power tool (e.g., a user's mobile phone).

The controller 304 may be configured to determine whether a fault condition of the power tool is present and generate one or more control signals related to the fault condition. For example, the controller 304 may calculate or include, within memory 356, predetermined operational threshold values and limits for operation of the power tool. For example, when a potential thermal failure (e.g., of a FET, the sensorless motor 308, etc.) is detected or predicted by the controller 304, power to the sensorless motor 308 can be limited or interrupted until the potential for thermal failure is reduced. If the controller 304 detects one or more such fault conditions of the power tool or determines that a fault condition of the power tool no longer exists, the controller 304 may be configured to provide information and/or control signals to another component of the power tool (e.g., the battery pack interface 312, the indicators 332, etc.). The signals can be configured to, for example, trip or open a fuse of the power tool, reset a switch, etc.

Figure 4:
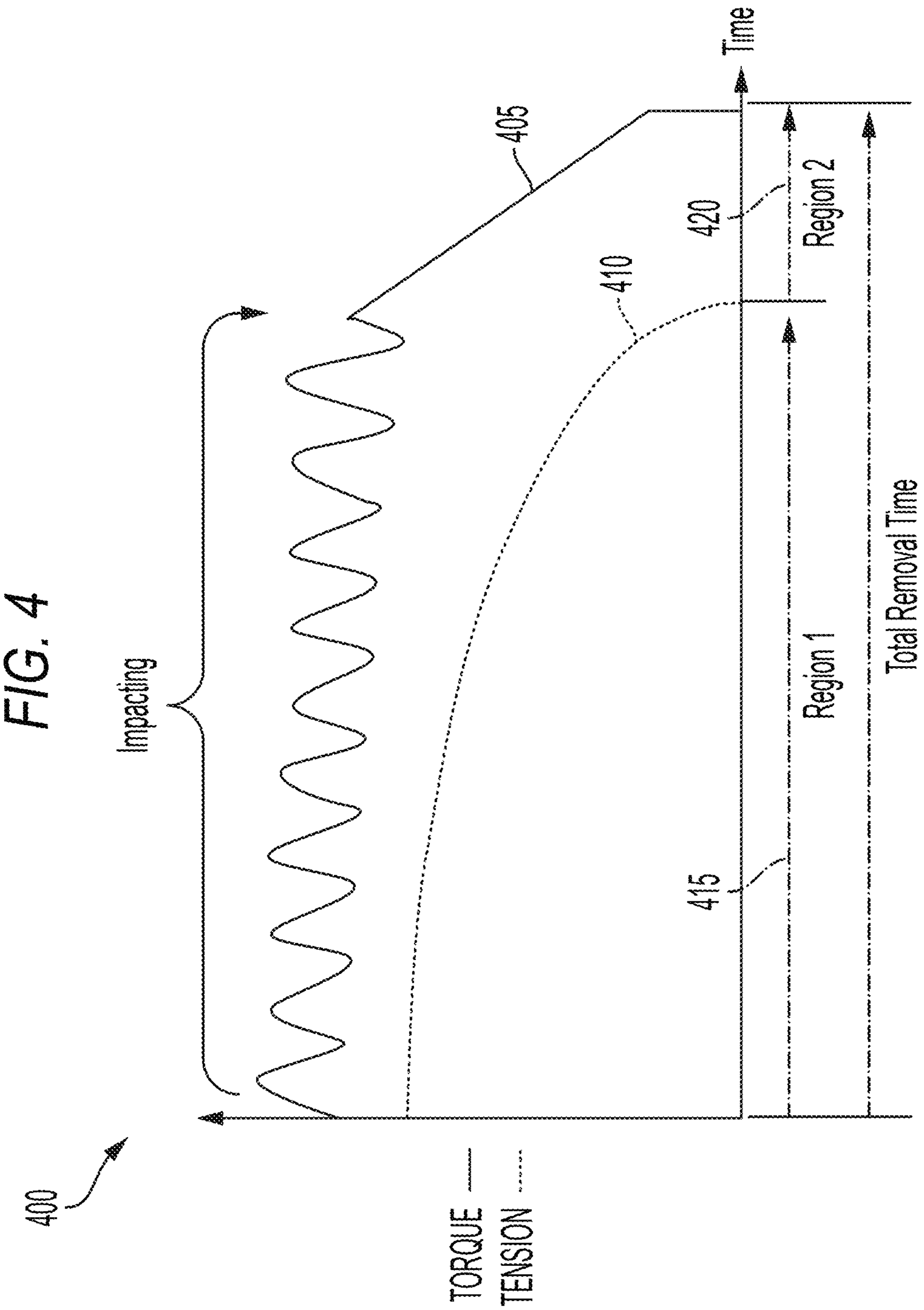
FIG. 4 is a graph illustrating a relationship between motor torque and nut tension, according to some embodiments

FIG. 4 is a graph 400 illustrating a motor torque and nut tension during a nut removal. The graph 400 includes a solid line 405 illustrating a motor torque of a power tool (for example, the power tool 100) during a nut removal operation. In some implementations, the solid line 405 includes oscillations in the motor torque that indicate a power tool is in an impacting state. For example, in some embodiments, the power tool is an impact wrench. The graph 400 also includes a dotted line 410 illustrating a tension of a nut during the nut removal operation. The x-axis of the graph 400 represents a time of the nut removal operation. The x-axis is divided into a first region 415 and a second region 420, representing two periods of time in the nut removal operation. The first region 415 represents a time during which a tension of the nut is still present (i.e., the nut resists spinning), and the second region 420 represents a time during which there is no tension on the nut (i.e., the nut spins freely). As illustrated by FIG. 4, the first region 415 is longer than the second region 420. However, in some embodiments, the first region 415 is shorter than the second region 420, or the same length as the second region 420. The y-axis of the graph 400 represents a torque value of the power tool 100 or a tension value of the nut. The solid line 405 illustrating torque shows that, once a tension of the nut has been overcome at the end of the first region 415 (illustrated by the dotted line 410 illustrating nut tension intercepting the x-axis), the power tool 100 may operate at a reduced torque value in the second region 420. The reduced torque value is a torque primarily associated with thread friction of another fastener that the nut may be engaged with (e.g., a bolt, a stud, a screw, etc.). The torque of the power tool 100 may reduce to zero (0) following the nut disengaging from the other fastener (i.e., at the end of the second region 420). In some embodiments, the torque of the power tool 100 may reduce to zero (0) following the nut disengaging from the other fastener at a constant rate.

In the first region 415, the power tool 100 may be in a loosening mode (e.g., an impacting mode). While operating in this mode, the torque of the power tool 100 generally decreases as tension is removed from the nut. Once all tension is eliminated, the second region 420 begins in which trailing torque (also referred to as prevailing torque in a tightening sequence) still exists, making removal by hand impractical. Trailing torque is generally referred to as the torque required to remove a fastener once no tension exists on the fastener. In the second region 420, the power tool 100 may be in a removal mode (e.g., a non-impacting mode or in an intermittent impacting mode). In some embodiments, impacting could occur in the second region 420 in response to a high resistance section of thread being encountered. In some embodiments, the power tool 100 determines an operating mode or operating state of the power tool 100 based on, for example, a motor torque, a motor speed, an output from a gyroscope, a hammer translation sensor, a microphone, etc. The power tool 100 can determine that the power tool 100 is in the impacting state or the non-impacting state based on such parameters. In some embodiments, when in the impacting state, the power tool 100 is configured to operate in a loosening mode to loosen a fastener. When in the non-impacting state, the power tool 100 is configured to increase the speed of the motor (e.g., after the impacting state ends). In some embodiments, an amount of rotation of the anvil is monitored to switch between the impacting mode and the non-impacting mode. The rotation of the anvil can be determined, for example, using the anvil rotation sensor or by monitoring rotation of the motor. For example, for an impact, the controller can monitor how much the anvil rotates. If an amount of anvil rotation is less than or equal to a threshold value for an impact, the fastener is still too tight and the power tool 100 will be operated in the impacting mode. If the amount of anvil rotation greater than the threshold value, the fastener is loose and the power tool 100 can be operated in the non-impacting mode (e.g., with increased speed).

Figure 5A:
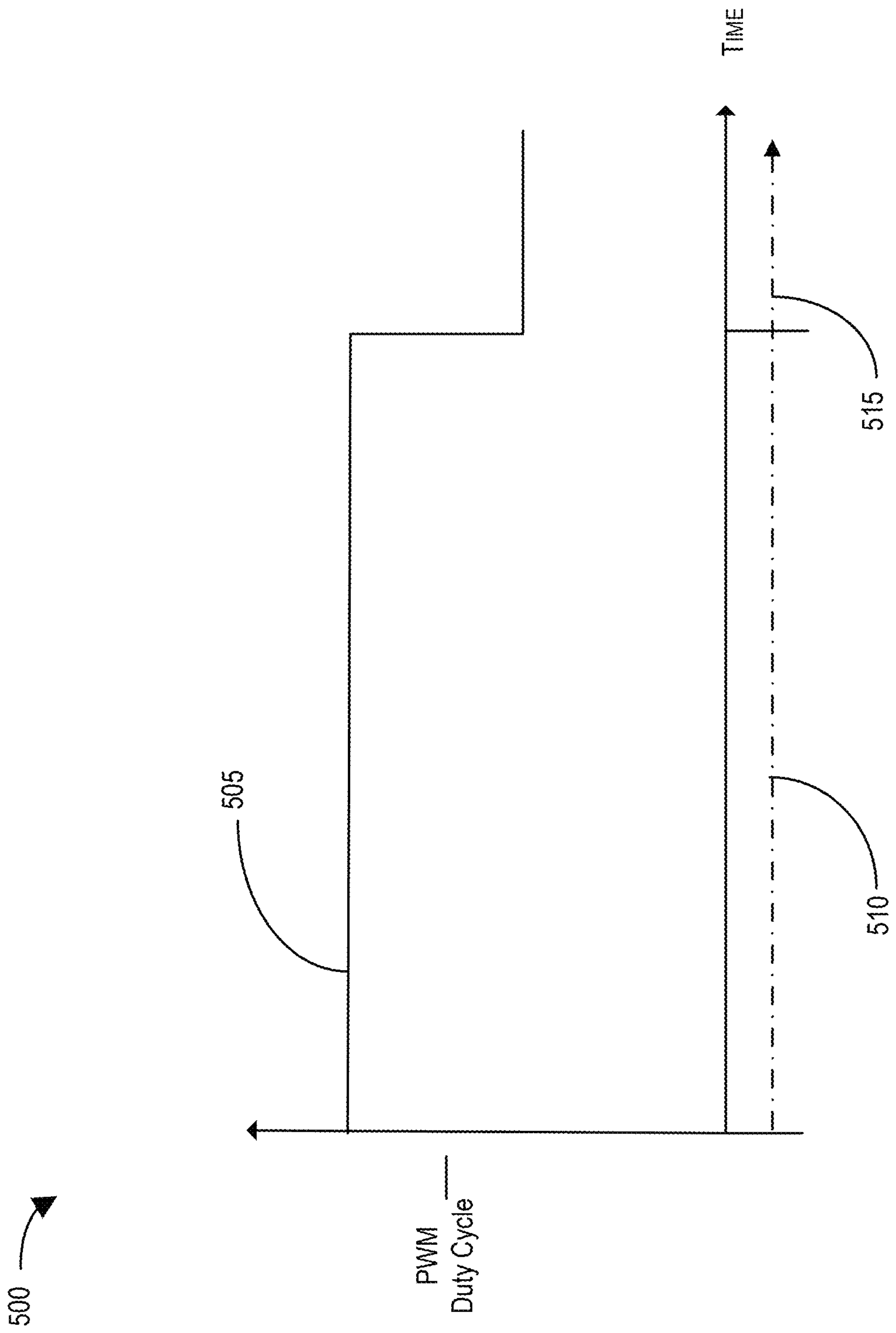
FIG. 5A is a graph illustrating a PWM duty cycle of a power tool implementing a conventional nut removal method.

FIG. 5A is a prior art graph 500 illustrating a pulse-width modulation ("PWM") cycle of a power tool implementing a conventional nut removal method ("conventional power tool"). The graph 500 includes a line 505 representing a PWM signal applied to the conventional power tool. Similar to FIG. 4, the x-axis of the graph 500 represents a time of the nut removal operation. The x-axis is divided into a first region 510 and a second region 515, representing two periods of time in the nut removal operation. The first region 510 represents a time during which a tension of the nut is still present (i.e., the nut resists spinning), and the second region 515 represents a time during which there is no tension on the nut (i.e., the nut spins freely). The y-axis of the graph 500 represents a duty cycle value of the PWM signal. In the first region 510, the PWM signal is HIGH. In the second region 515, the PWM signal is LOW, which represents a lower motor speed.

Figure 5B:
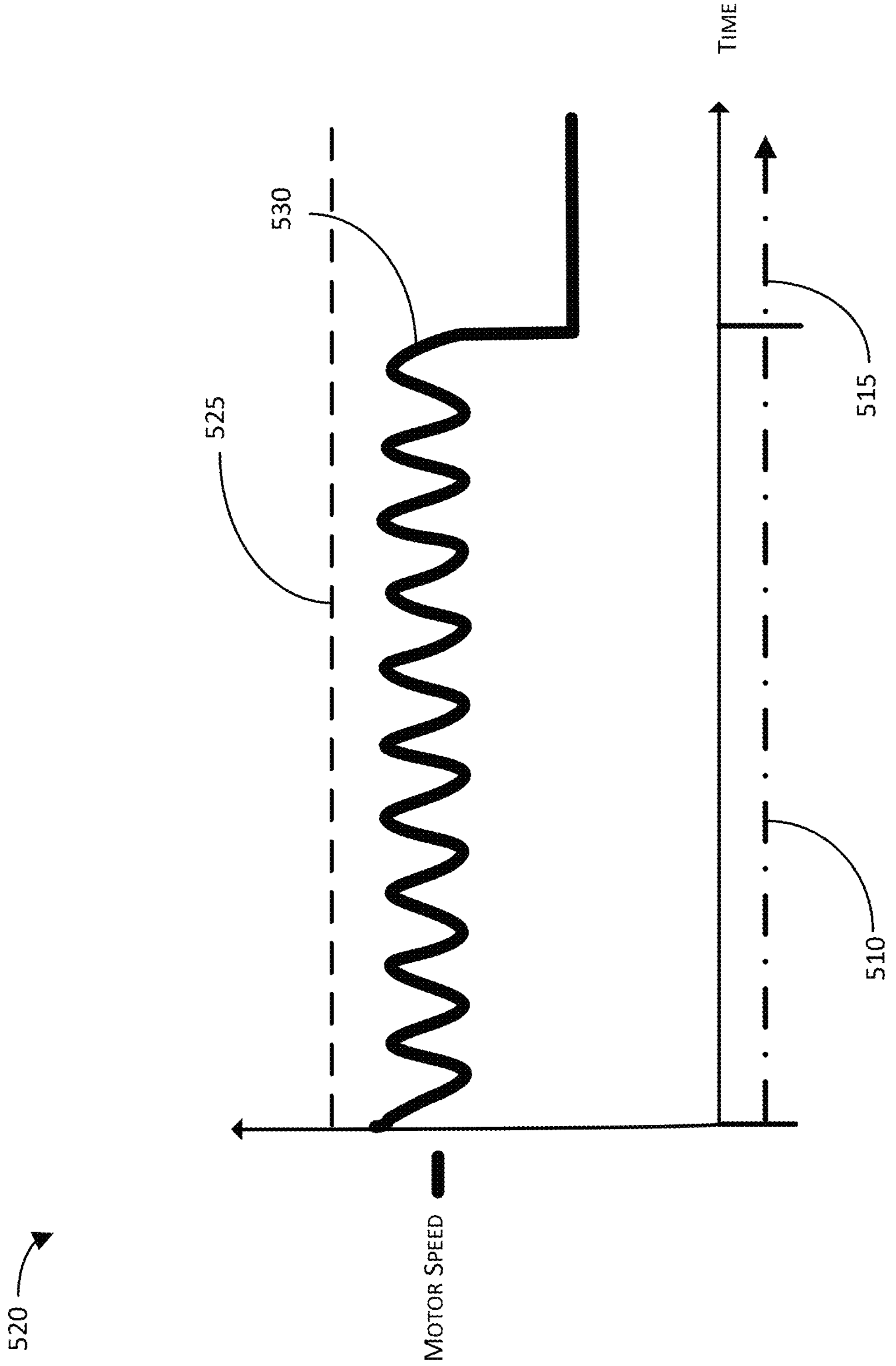
FIG. 5B is a graph illustrating a speed of a motor implementing a conventional nut removal method.

FIG. 5B is a prior art graph 520 illustrating a speed of a motor implementing a conventional nut removal method. The graph 520 corresponds to the graph 500 of FIG. 5A, that is, the speed of the conventional motor is proportional to the PWM duty cycle of FIG. 5A. The x-axis of the graph 520 is the same as the x-axis of the graph 500 and includes the first region 510 and the second region 515. The y-axis of the graph 520 represents the speed of the motor. The graph 520 also includes a dashed line 525 representing a speed of the motor while under no load. The speed of the motor is represented by a solid line 530. As illustrated by the solid line 530, in the first region 510 the motor speed generally oscillates within a high-speed range less than the no-load speed. Even with the constant duty cycle PWM signal in the first region 510, the conventional motor speed oscillates due to the demand of, for example, an impact mechanism changing as a hammer translates along and around a cam shaft. Once the motor crosses into the second region 515 (i.e., the PWM signal becomes LOW), the motor speed reduces to a constant value less than the high speed in the high-speed range. In the conventional nut removal method, once the nut has broken loose from the other fastener, the motor speed drops and continues to rotate at the lower speed until the nut is entirely disengaged from the other fastener. While this prevents the user of the conventional power tool from dropping or losing the nut, this increases the amount of time necessary to removal the nut.

Figure 6:
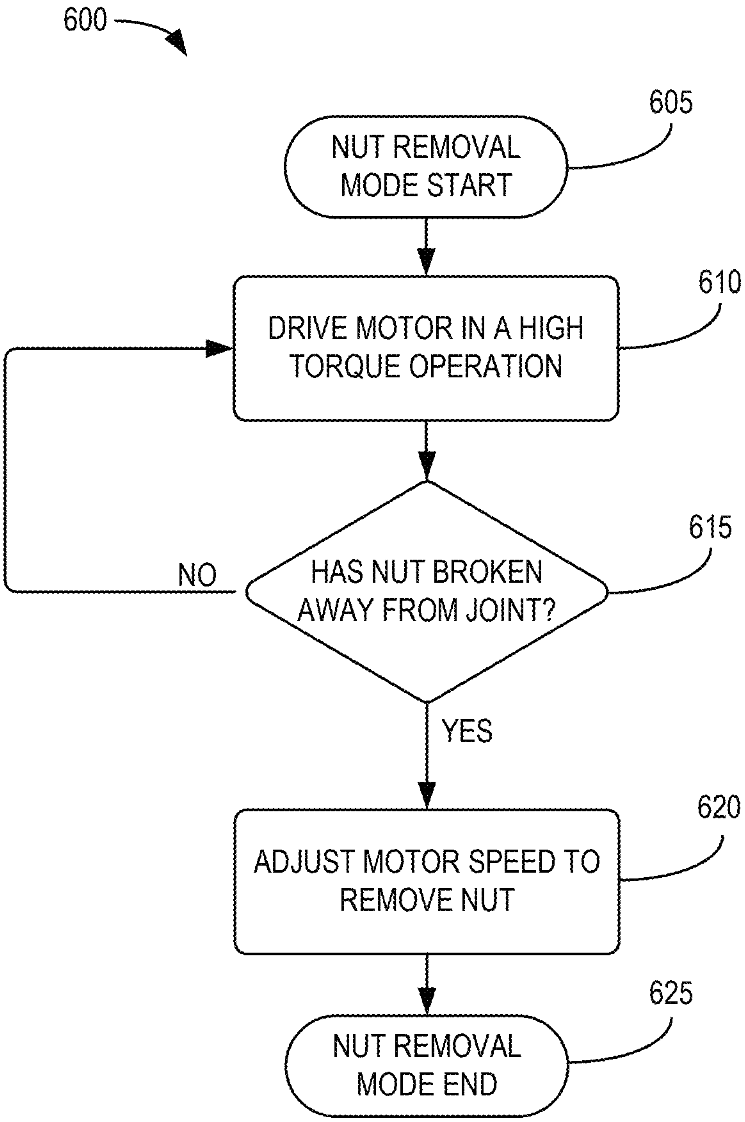
FIG. 6 is a flow chart of a method for an adaptive nut removal mode for a power tool, according to some embodiments.

FIG. 6 is a flow chart of a method 600 for an adaptive nut removal mode for a power tool (for example, the power tool 100). The method 600 begins when the adaptive nut removal mode begins (BLOCK 605). In some embodiments, the method 600 begins in response to a selection made by a user (for example, through the user input module [s] 336). In other embodiments, the method 600 begins in response to a detection made by the power tool 100 that a nut is being removed. The method 600 also includes driving the motor (for example, the motor 308) in a high torque operation (BLOCK 610). The motor 308 is driven at a high torque so that the motor 308 overcomes a breakaway torque value of the nut. The method 600 includes determining whether the nut has broken away from the joint between the nut and another fastener to which the nut is engaged (i.e., the breakaway torque has been overcome) (BLOCK 615). If the nut has not broken away from the joint, the method 600 returns to BLOCK 610. In some embodiments, the method 600 may additionally include increasing the torque of the motor 308 before returning to BLOCK 610. In some embodiments, breakaway of the nut is determined based on a comparison of motor torque to a trailing threshold. The trailing threshold is a threshold torque value below which a low torque or no torque is required to remove the nut from the other fastener. If the nut has broken away from the joint, the method 600 includes adjusting (e.g., increasing) a speed of the motor 308 in order to remove the nut from the other fastener (BLOCK 620). Specific methods by which the motor speed is adjusted will be explained below. Once the nut has been fully disengaged from the other fastener, the adaptive nut removal mode, and the method 600, ends (BLOCK 625).

Figure 7:
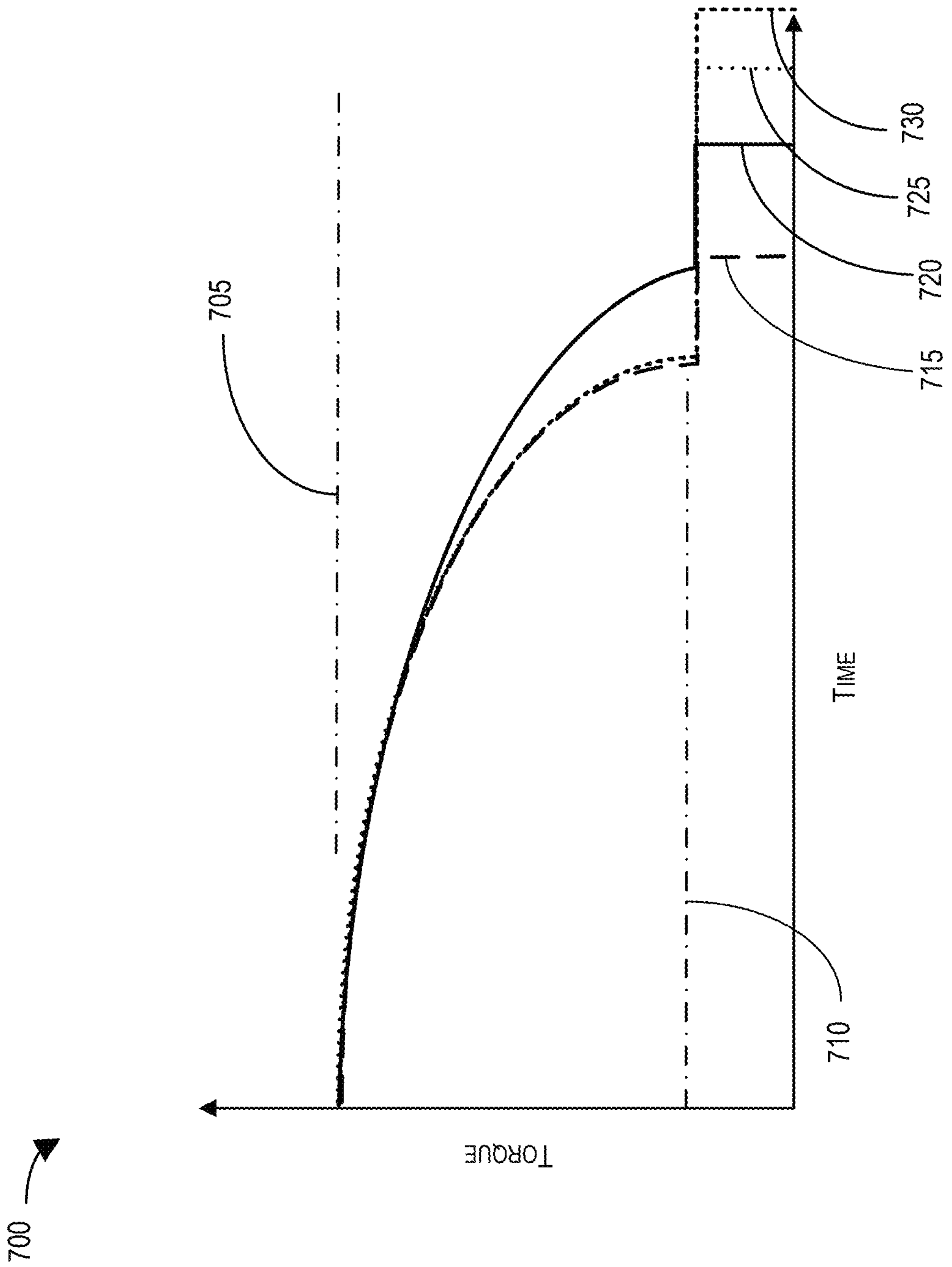
FIG. 7 is a graph illustrating relationships between motor torque and time for various power tools, according to some embodiments.

FIG. 7 is a graph 700 illustrating relationships between motor torque and time for various power tools. The graph 700 illustrates time on the x-axis and motor torque on the y-axis. The graph 700 includes a first dashed-and-dotted line 705 at a higher torque representing a breakaway torque, and a second dashed-and-dotted line 710 at a lower torque representing a trailing torque. The graph 700 includes torque-versus-time data for four types of power tools: a DC power tool implementing an adaptive nut removal mode (for example, the power tool 100), represented by the long-dashed line 715, a pneumatic power tool implementing an alternative nut removal mode, represented by the solid line 720, a DC power tool implementing an alternative nut removal mode, represented by the dotted line 725, and a DC power tool implementing a conventional nut removal mode, represented by the short-dashed line 730. As can be seen by the graph 700, the DC power tool implementing the adaptive nut removal mode takes the least amount of time to fully remove the nut, therefore requiring less power than the conventional or alternative options. Additionally, as can be seen by the solid line 720, while the DC power tools are faster than the pneumatic power tool at removing the nut, the pneumatic power tool can regain speed very quickly with high no-load or light load speed. Therefore, the pneumatic tool is effective in the second region (for example, the second region 420) of a nut removal mode, as it is not uncommon that the pneumatic tool is faster at total nut removal even if initial breakaway takes longer. However, despite pneumatic power tools being traditionally faster at total nut removal than DC power tools, the power tool 100 is still faster than the pneumatic power tool.

Figure 8A:
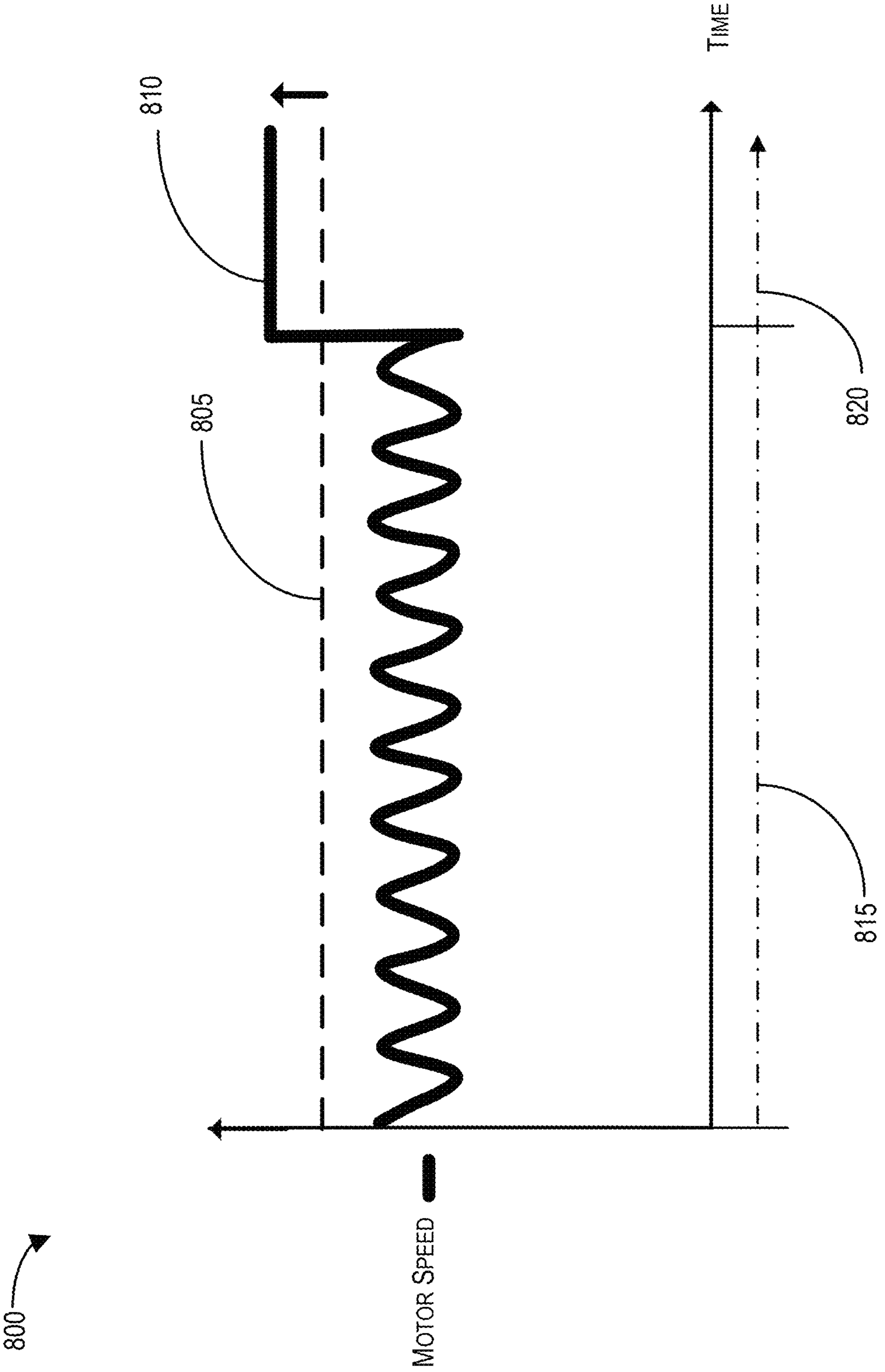
FIGS. 8A and 8B are graphs illustrating motor speed of a power tool implementing an adaptive nut removal mode at a first time and a second time, respectively, according to some embodiments.

FIG. 8A is a graph 800 illustrating motor speed of a power tool implementing an adaptive nut removal mode (for example, the power tool 100) at a first time. The graph 800 includes a dashed line 805 representing a speed of a motor of the power tool 100 (for example, the motor 308) while operating in a no-load condition. The graph 800 also includes a solid line 810 representing a speed of the motor 308 during the adaptive nut removal mode. The x-axis of the graph 800 is divided into a first region 815 and a second region 820, representing two periods of time in the nut removal operation. The first region 815 represents a time during which a tension of the nut is still present (i.e., the nut resists spinning), and the second region 820 represents a time during which there is no tension on the nut (i.e., the nut spins freely). The y-axis of the graph 800 represents the speed of the motor. As evidenced by the solid line 810, while operating in the first region 815, the motor 308 functions similarly to the conventional motor illustrated by FIG. 5B. However, unlike the conventional motor, in the second region 820 the speed of the motor 308 increases to a higher (e.g., constant value) greater than the no-load speed. In some embodiments, this speed increase is accomplished by employing dynamic field weakening, which is explained further below. Increasing the speed of the motor in the second region 820 allows for the nut to be removed faster than in a conventional nut removal mode.

Figure 8B:
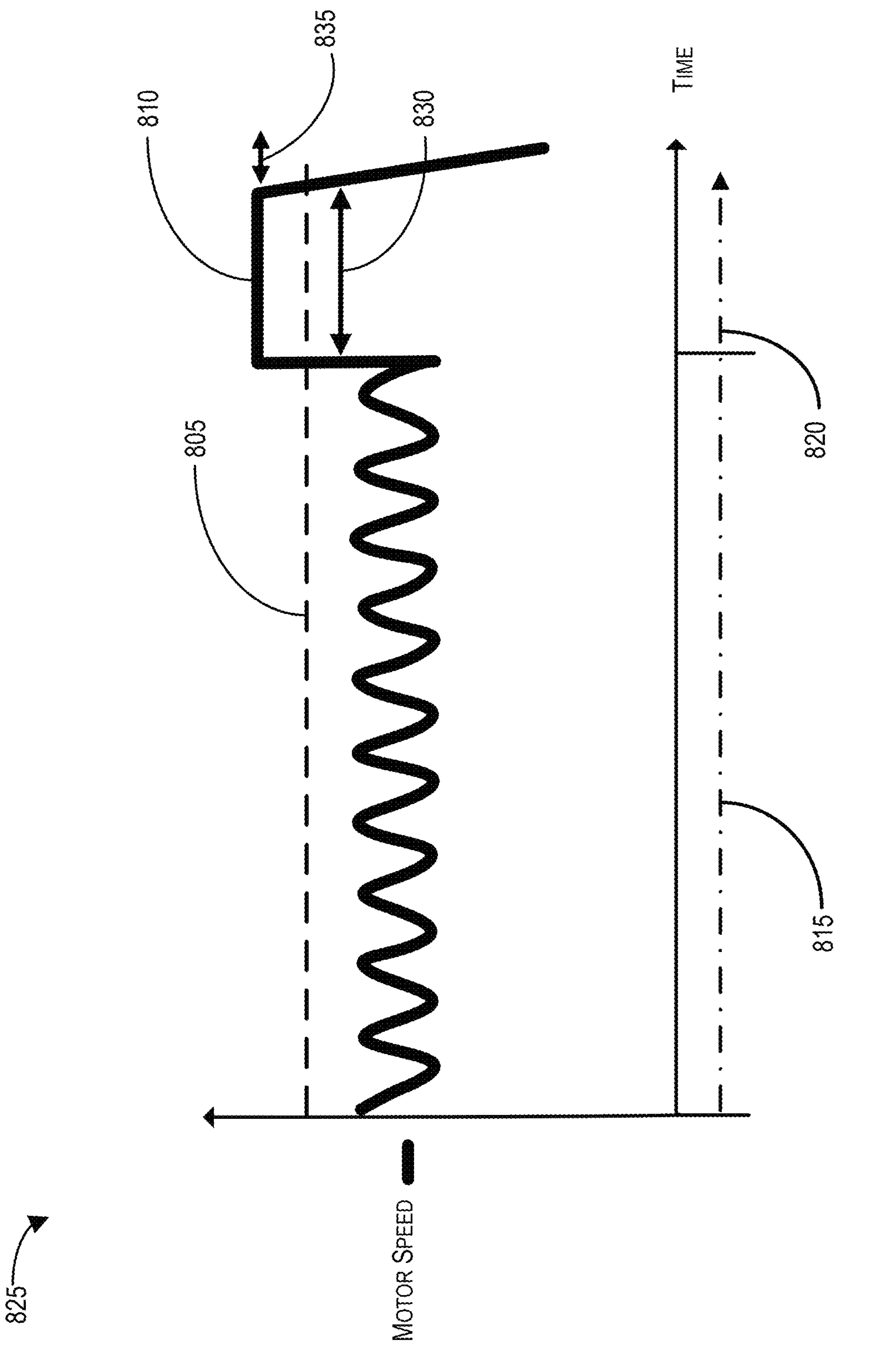

FIG. 8B is a graph 825 illustrating motor speed of the power tool 100 at a second time. The graph 825 differs from the graph 800 of FIG. 8A in that the second region 820 is further divided into a first sub-region 830 and a second sub-region 835. In the first sub-region 830, the motor 308 operates at the increased speed, as described with respect to FIG. 8A. In some embodiments, this increased speed is attained via dynamic field weakening. However, in the second sub-region 835, the speed of the motor 308 decreases to a speed lower than the speed of the motor 308 in the first region 815. By decreasing the speed of the motor 308 in the second sub-region 835, the likelihood of the nut being dropped or lost once the nut fully disengages from the other fastener decreases, thereby allowing the nut to be removed faster than a conventional nut removal method while retaining enhanced control of the nut following removal. In some embodiments, the speed reduction may be accomplished by lessening an amount of dynamic field weakening in the motor 308.

Figure 9:
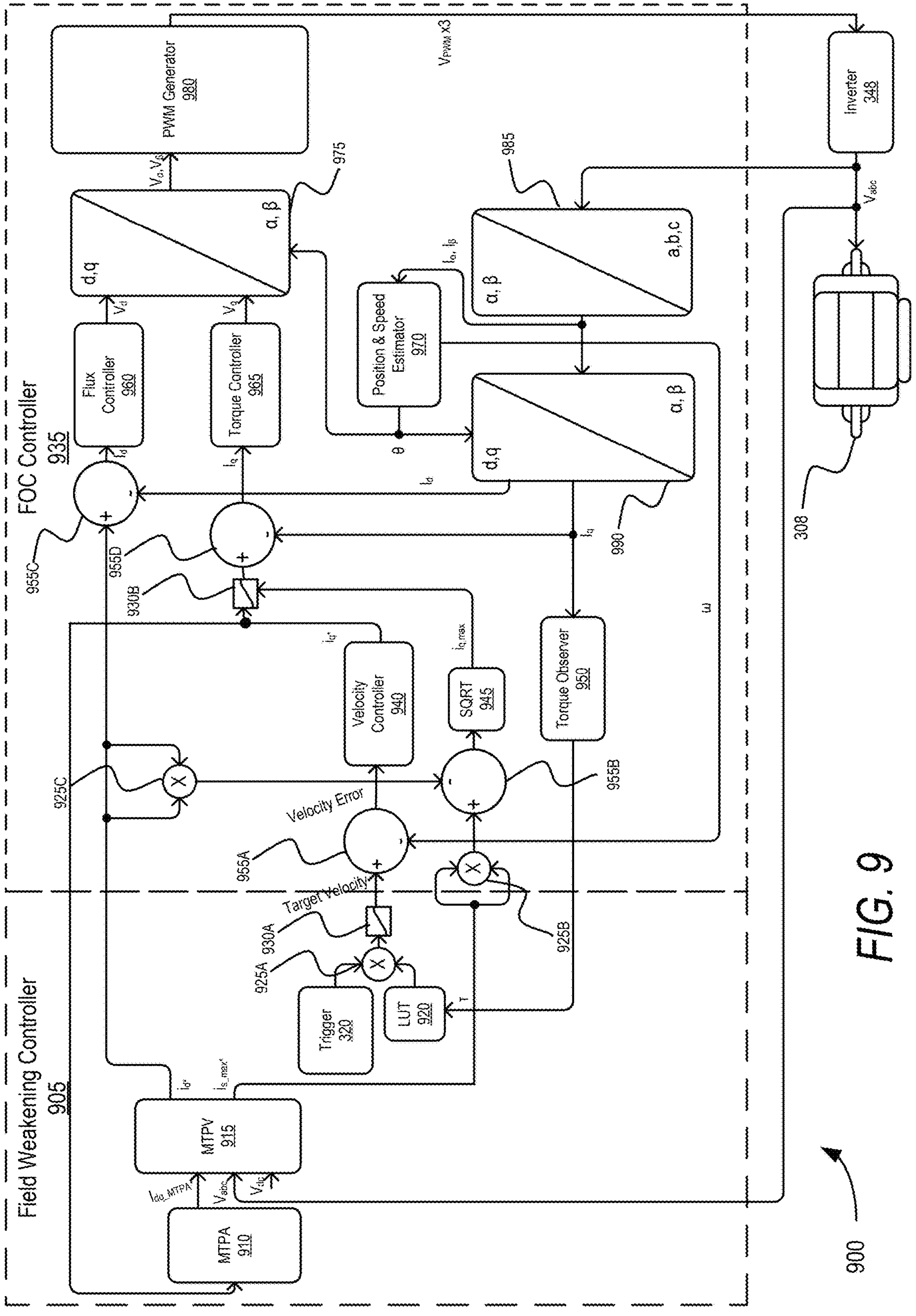
FIG. 9 is a block diagram for the control system of a dynamic field weakening algorithm for use in a power tool, according to some embodiments.

FIG. 9 is a block diagram for a control system 900 of a dynamic field weakening algorithm for use in a power tool. The control system 900 can be implemented by the controller 304 and can include one or more additional controllers (e.g., dedicated controllers). For example, as illustrated by FIG. 9, the control system 900 includes a field weakening controller 905 and a field-oriented control ("FOC") controller 935. The field weakening controller 905 and the FOC controller 935 may include one or more mathematical operator blocks, such as multiplication blocks 925A-C which multiply two or more input values, linear scaling blocks 930A-B which linearly scale an input value based on a scaling factor, square root blocks 945 which determine the square root of an input value, and/or addition/subtraction blocks 955A-D which add or subtract two or more input values. In some embodiments the mathematical operator blocks may perform different mathematical operations. For example, the linear scaling blocks 930A-B may scale a value up or down based on a non-linear function. The field weakening controller 905 and the FOC controller 935 may each include one or more components that are configured to send and receive signals between the field weakening controller 905 and the FOC controller 935.

The field weakening controller 905 includes a control block for controlling a max-torque-per-amps ("MTPA") algorithm ("MTPA block 910") and a control block for controlling a max-torque-per-volts ("MTPV") algorithm ("MTPV block 915"). The MTPA block 910 receives one or more inputs, such as an input $i_q$* from the FOC controller 935 relating to a torque current. The MTPA block 910 may perform one or more mathematical operations to generate and output a signal $I_{dq\_MTPA}$* relating to a flux current and a torque current. The MTPV block 915 receives one or more signals, such as an input $I_{dq\_MTPA}$* from the MTPA block 910 relating to a flux current and a torque current, an input $V_{abc}$ relating to voltages applied to the phases of the sensorless motor 308, and/or an input $V_{dc}$ relating to a voltage of a battery pack connected to the power tool 100. The MTPV block 915 may further generate one or more output signals, such as a signal $i_d$* relating to a flux current determined by the MTPV block 915 and/or a signal $i_{s\_max}$* relating to a maximum current of a stator of the sensorless motor 308 determined by the MTPV block 915.

The field weakening controller 905 may further include a look-up table ("LUT") 920 which contains one or more output values based on one or more input values. For example, the LUT 920 may receive a signal t relating to a present torque of the sensorless motor 308. The LUT 920 may determine and output a signal based on the received torque signal t. The field weakening controller 905 may further include a first multiplication block 925A which receives a first signal from the LUT 920 and a second signal from the trigger 320 of the power tool 100, and multiplies the first and second signals to generate an output signal. The field weakening controller may further include a first linear scaling block 930A which receives a signal from the first multiplication block 925A and scales the signal based on a linear function, and outputs a signal corresponding to the result of the scaling. In some embodiments, the function is non-linear. The signal output by the first linear scaling block 930A may be a target velocity for the sensorless motor 308.

The FOC controller 935 includes a first addition/subtraction block 955A configured to add a first signal received from the first linear scaling block 930A corresponding to a target velocity for the sensorless motor 308 and to subtract a second signal ω corresponding to a present velocity of the sensorless motor 308. The first addition/subtraction block 955A may be further configured to output a signal corresponding to the result of the first addition/subtraction block 955A. The signal output by the first addition/subtraction block 955A may be a velocity error of the sensorless motor 308. The FOC controller 935 may further include a velocity controller 940 configured to receive a signal from the first addition/subtraction block 955A corresponding to a velocity error of the sensorless motor 308. The velocity controller 940 may generate an output signal $i_q$* based on the velocity error and output the output signal $i_q$* to the MTPA block 910.

The FOC controller 935 may further include a second multiplication block 925B configured to receive two signals $i_{s\_max}$* (i.e., the same signal twice) from the MTPV block 915 of the field weakening controller 905. The second multiplication block 925B may multiply the two signals $i_{s\_max}$* together to generate a squared value of $i_{s\_max}$* and generate an output signal corresponding to the squared value of $i_{s\_max}$*. The FOC controller 935 may further include a third multiplication block 925C configured to receive two signals $i_d$* (i.e., the same signal twice) from the MTPV block 915 of the field weakening controller 905. The third multiplication block 925C may multiply the two signals $i_d$* together to generate a squared value of $i_d$*, and generate an output signal corresponding to the squared value of $i_d$*. The FOC controller 935 may further include a second addition/subtraction block 955B configured to receive and add a first signal from the second multiplication block 925B corresponding to the squared value of $i_{s\_max}*$. The second addition/subtraction block 955B may be further configured to receive and subtract a second signal from the third multiplication block 925C corresponding to the squared value of $i_d*$. The second addition/subtraction block 955B may be further configured to generate an output signal corresponding to the result of the second addition/subtraction block 955B. The FOC controller 935 may further include a square root block 945 configured to receive a signal from the second addition/subtraction block 955B corresponding to a result of the second addition/subtraction block 955B. The square root block 945 may be further configured to generate and output a signal $i_{q,max}$ corresponding a to a square root value of the signal received from the second addition/subtraction block 955B. That is to say, the combination of the second multiplication block 925B, the third multiplication block 925C, the second addition/subtraction block 955B, and the square root block 945 may be configured to perform a Pythagorean operation on the outputs of the MTPV block 915 to break the current $I_s$ of the stator of the sensorless motor 308 into its component vectors, the flux current $i_d$ and the torque current $i_q$.

The FOC controller 935 may further include a third addition/subtraction block 955C configured to receive and add a first signal $i_d*$ from the MTPV block 915 corresponding to the flux current determined by the MTPV block 915. The third addition/subtraction block 955C may be further configured to receive and subtract a second signal $I_d$ corresponding to a total flux current of the sensorless motor 308. The third addition/subtraction block 955C may be configured to output a signal $I_d$ corresponding to the result of the third addition/subtraction block 955C. The FOC controller 935 may further include a flux controller 960 configured to receive an input signal $I_d$ from the third addition/subtraction block 955C and generate and output a flux voltage signal $V_d$ based on the input signal $I_d$.

The FOC controller 935 further includes a second linear scaling block 930B configured to receive a first signal $i_q*$ from the velocity controller 940 and a second signal $i_{q,max}$ from the square root block 945. The second linear scaling block 930B may be further configured to linearly scale the first signal $i_q*$ based on the second signal $i_{q,max}$ and output a signal corresponding to the result of the second linear scaling block 930B. The FOC controller 935 further includes a fourth addition/subtraction block 955D configured to receive and add a first signal corresponding to the result of the second linear scaling block 930B. The fourth addition/subtraction block 955D may be further configured to receive and subtract a second signal $I_q$ corresponding to a total torque current of the sensorless motor 308. The fourth addition/subtraction block 955D may be configured to output a signal $I_q$ corresponding to the result of the fourth addition/subtraction block 955D. The FOC controller 935 may further include a torque controller 965 configured to receive an input signal $I_q$ from the fourth addition/subtraction block 955D and generate and output a torque voltage signal $V_q$ based on the input signal $I_q$.

The FOC controller 935 may further include an inverse Park transform block 975 configured to receive a first signal $V_d$ from the flux controller 960 corresponding to a flux voltage, a second signal $V_q$ from the torque controller 965 corresponding to a torque voltage, and a third signal θ corresponding to a present angular position of a rotor of the sensorless motor 308. The inverse Park transform block 975 may be configured to convert the first signal $V_d$ and second signal $V_q$ to orthogonal stationary reference frame quantities $V_\alpha$ and $V_\beta$ based on the third signal θ. The inverse Park transform block 975 may be further configured to output a signal corresponding to the orthogonal stationary reference frame quantities $V_\alpha$ and $V_\beta$. The FOC controller 935 may further include a PWM generator 980 including an inverse Clarke transform block, a PWM modulator, or both. The PWM generator 980 may be configured to receive the signal corresponding to the orthogonal stationary reference frame quantities $V_\alpha$ and $V_\beta$ from the inverse Park transform block 975 and generate a plurality of pulse-width modulated ("PWM") control signals $V_{PWM}\times 3$ configured to control the inverter 348. The inverter 348 may be configured to receive the plurality of PWM control signals $V_{PWM}\times 3$ and convert a DC power supply to a three-phase signal $V_{abc}$ for controlling the sensorless motor 308. The three-phase signal $V_{abc}$ may also be received by the MTPV block 915.

The FOC controller 935 further includes a three-phase-to-two-phase reference frame converter 985 configured to receive the three-phase signal $V_{abc}$ from the inverter 348 and generate and output a two-phase current signal $I_\alpha$, $I_\beta$ based on the three-phase signal $V_{abc}$. The FOC controller 935 furthers include a position and speed estimator 970 configured to receive the two-phase current signal $I_\alpha$, $I_\beta$ from the three-phase-to-two-phase reference frame converter 985 and estimate a position and speed of the sensorless motor 308 based on the two-phase current signal $I_\alpha$, $I_\beta$. The position and speed estimator 970 may be further configured to output a first signal θ relating to the current angular position of the rotor of the sensorless motor 308 and a second signal ω relating to the present rotational speed of the rotor of the sensorless motor 308. The first signal θ is received by the inverse Park transform block 975. The second signal ω is also received by the first addition/subtraction block 955A. The FOC controller 935 further includes a Park transform block 990 configured to receive the two-phase current signal $I_\alpha$, $I_\beta$ from the three-phase-to-two-phase reference frame converter 985 and the first signal θ relating to the present angular position of the rotor of the sensorless motor 308 from the position and speed estimator 970. The Park transform block 990 is further configured to generate a first signal $I_q$ corresponding to a total torque current of the sensorless motor 308 and a second signal $I_d$ corresponding to a total flux current of the sensorless motor 308 based on the two-phase current signal $I_\alpha$, $I_\beta$ and the first signal θ. The first signal $I_q$ may be received by the torque observer 950 and the fourth addition/subtraction block 955D. The second signal $I_d$ may be received by the third addition/subtraction block 955C.

Figure 10:
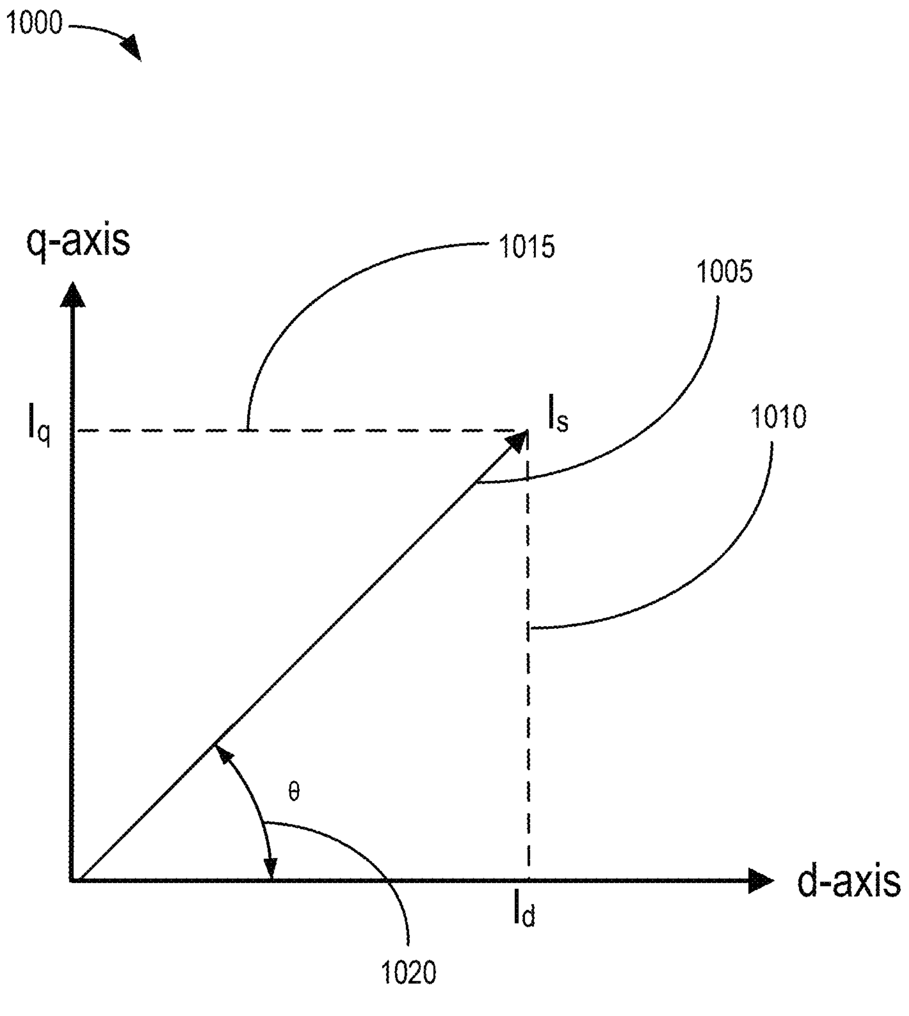
FIG. 10 is a graph illustrating a relationship between stator flux current and stator torque current, according to some embodiments.

FIG. 10 is a graph 1000 illustrating a relationship between stator flux current and stator torque current on a q-d coordinate plane. The graph 1000 illustrates that the stator flux current $i_d$ 1010 and the stator torque current $i_q$ 1015 are both component vectors of the stator current $I_s$ 1005. In particular, as illustrated by the graph 1000, $i_d$ 1010 can be calculated as a function of $I_s$ 1005 and the angle between $I_s$ 1005 and the d-axis, θ 1020, by equation (1).

$$i_d = I_s \cos\theta \quad (1)$$

Similarly, as illustrated by the graph 1000, $i_q$ 1015 can be calculated as a function of $I_s$ 1005 and θ 1020 by equation (2).

$$i_q = I_s \sin\theta \quad (2)$$

A sensorless motor (for example, the sensorless motor 308 of FIG. 3), includes a rotor with a permanent magnet. This permanent magnet generates magnetic saliency, which in turn produces a reluctance torque from the difference between an inductance on the d-axis and an inductance on the q-axis. The reluctance torque, $T_e$, can be determined by equation (3), where P is the number of pole pairs of the motor, of is the stator flux, $L_d$ is a direct inductance on the d-axis, and $L_q$ is a quadrature inductance on the q-axis.

$$T_e = 1.5P(\varphi_f i_q + (L_d - L_q)i_d i_q) \tag{3}$$

Based on equation (3), it can be noted that a negative value of $i_d$ 1010 will ensure that $T_e$ remains positive, which is favorable. Furthermore, the above equations (1), (2), and (3) can be combined to create equation (4).

$$T_e = 1.5P\left(\Phi_f I_s \sin\theta + 0.5(L_d - L_q)I_s^2 \sin 2\theta\right) \tag{4}$$

Figure 11:
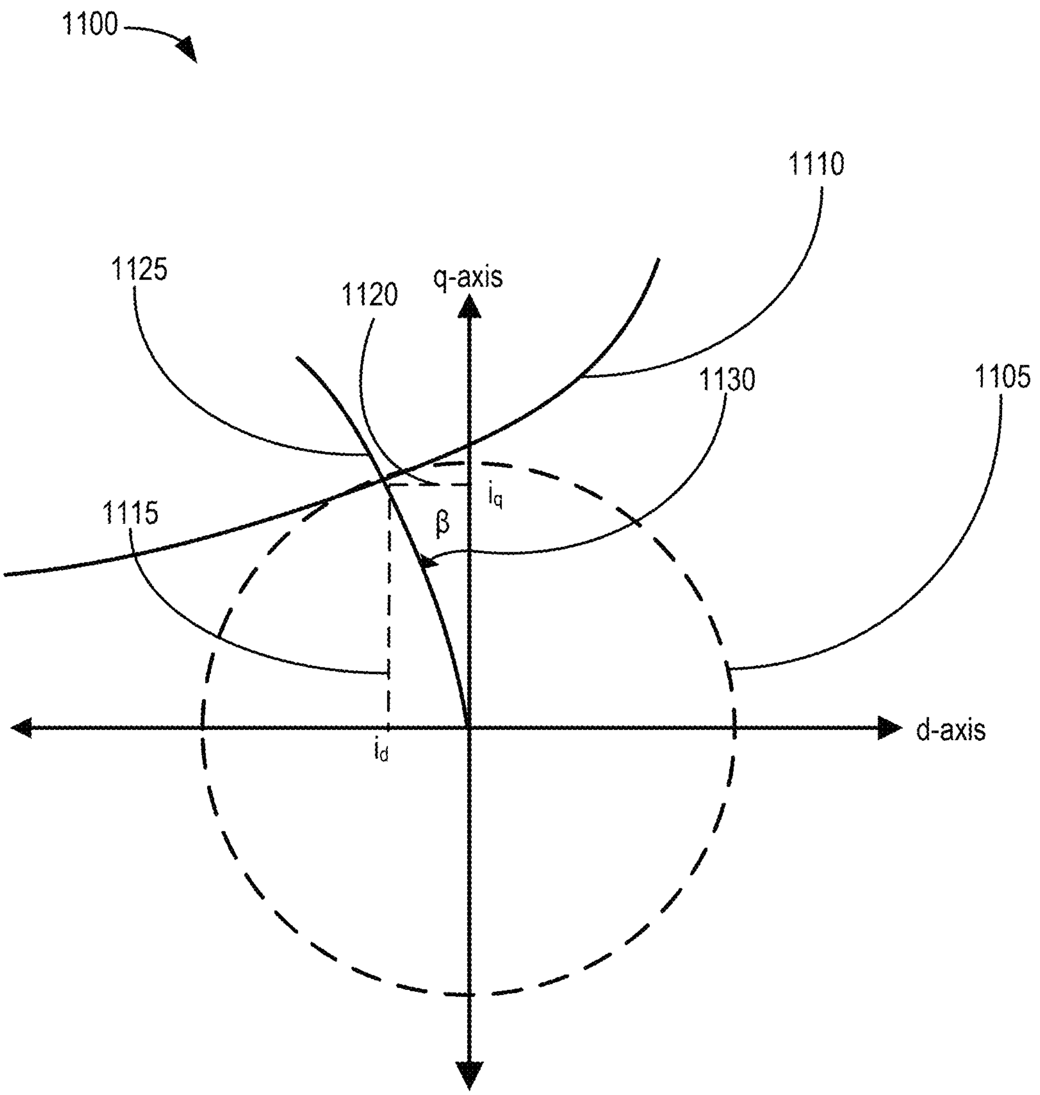
FIG. 11 is a graph illustrating a negative stator flux current for use in dynamic field weakening determined by a max-torque-per-amps ("MTPA") algorithm, according to some embodiments.

FIG. 11 is a graph 1100 illustrating a negative stator flux current for use in dynamic field weakening determined by a max-torque-per-amps ("MTPA") algorithm. In particular, the graph 1100 illustrates an MTPA vector 1125 generated by an MTPA block (for example, MTPA block 910) based on a crossing between of a constant current 1105 and a constant torque 1110 of the sensorless motor 308. In some embodiments, the MTPA vector 1125 is a minimum current space vector that satisfies at least one constraint of the MTPA algorithm. The MTPA vector 1125 further includes a beta-angle 1130. In some embodiments, the beta-angle 1130 is optimized between 0° and 45° from the q-axis. In some embodiments, the beta-angle 1130 being between 0° and 45° is a constraint of the MTPA algorithm. The point at which the MTPA vector 1125 crosses the constant current 1105 and the constant torque 1110 can be defined by a flux current $i_d$ 1115 and a torque current $i_q$ 1120. As can be seen by FIG. 11, at the point where the MTPA vector 1125 is optimized, the flux current $i_d$ 1115 is negative in terms of the d-axis. In some embodiments, the MTPA vector 1125 may be at a different beta-angle 1130 while still satisfying being between 0° and 45° from the q-axis. However, in these embodiments, the MTPA vector 1125 may not be a minimum current space vector, and therefore not optimized.

Figure 12:
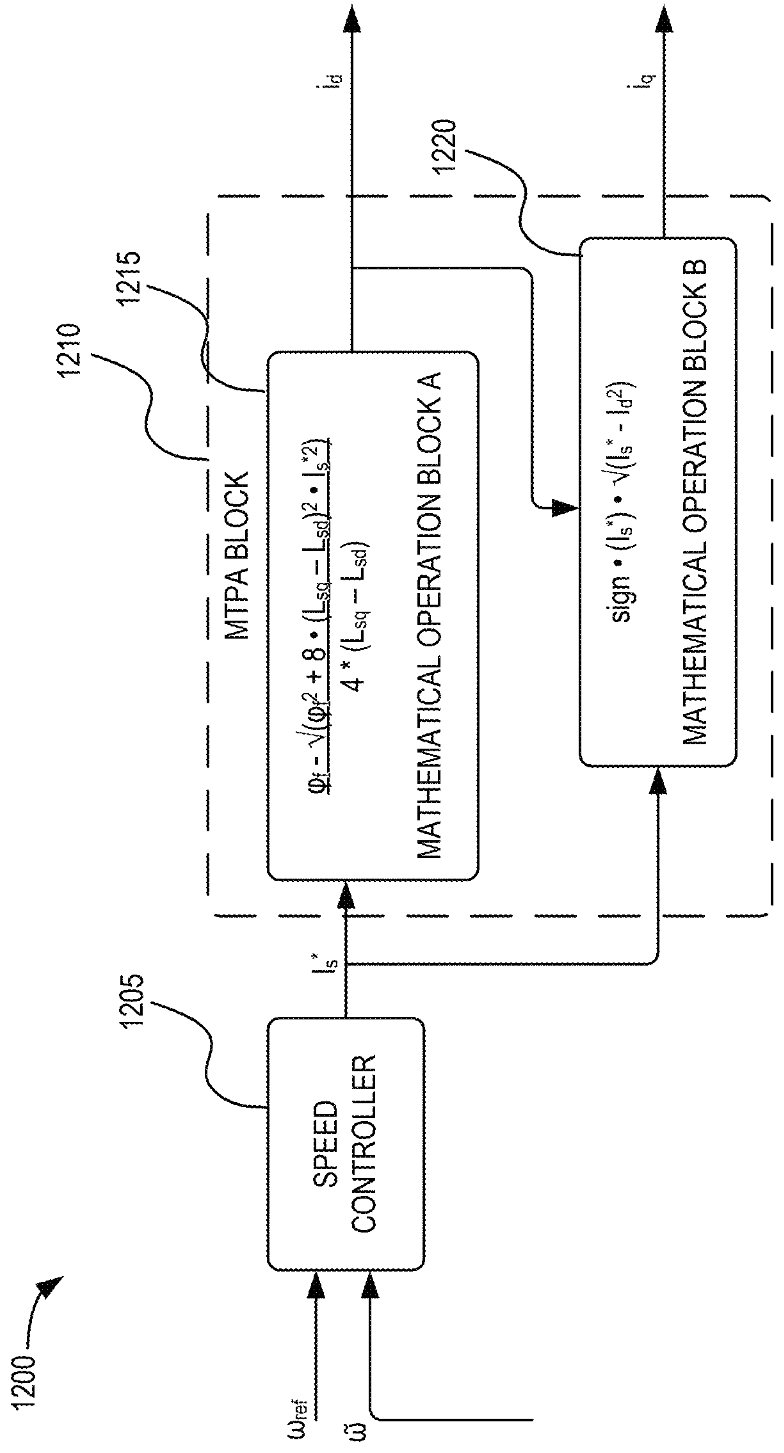
FIG. 12 is a block diagram of a control system for implementing an MTPA algorithm, according to some embodiments.

FIG. 12 is a block diagram of a control system 1200 for an MTPA algorithm. The control system 1200 includes a speed controller 1205 configured to receive a first signal $\omega_{ref}$ corresponding to a present angular speed of the rotor of the sensorless motor 308 and a second signal $\tilde{\omega}$ corresponding to a target angular speed for the rotor, and generate a stator current signal $I_s$* to control the stator based on the present angular speed $\omega_{ref}$ in reference to the target angular speed $\tilde{\omega}$. The control system 1200 may further include an MTPA block 1210 including a first mathematical operation block 1215 and a second mathematical operation block 1220. The first mathematical operation block 1215 is configured to receive the stator current signal $I_s$* and generate a flux current signal $i_d$. The second mathematical operation block 1220 is configured to receive the stator current signal $I_s$* and the flux current signal $i_d$ and generate a torque current signal $i_q$. The MTPA block 1210 is configured to generate a flux current signal $i_d$ and a torque current signal $i_q$ that, for example, satisfies the constraints identified with respect to FIG. 11 that the beta angle be between 0° and 45° from the q-axis and the MPTA vector (i.e., the vector created by the component $i_d$ and $i_q$ vectors) be a minimum current space vector. The values for $i_d$ and $i_q$ that satisfy these constraints can be determined by equations (5), (6), and (7).

$$i_d = \frac{\Phi_f - \sqrt{\Phi_f^2 + 8(L_q - L_d)^2 I_s^2}}{4(L_q - L_d)} \tag{5}$$

$$i_q = \text{sign }(I_s)\sqrt{I_s^2 - i_d^2}$$

$$\text{sign }(I_s) = 1 \text{ if } I_s \geq 0, \tag{6}$$

$$\text{sign }(I_s) = -1 \text{ if } I_s \leq 0 \tag{7}$$

The first mathematical operation block 1215 is configured to generate the flux current signal $i_d$ based on equation (5). The second mathematical operation block 1220 is configured to generate the torque current signal $i_q$ based on equations (6) and (7).

Figure 13:
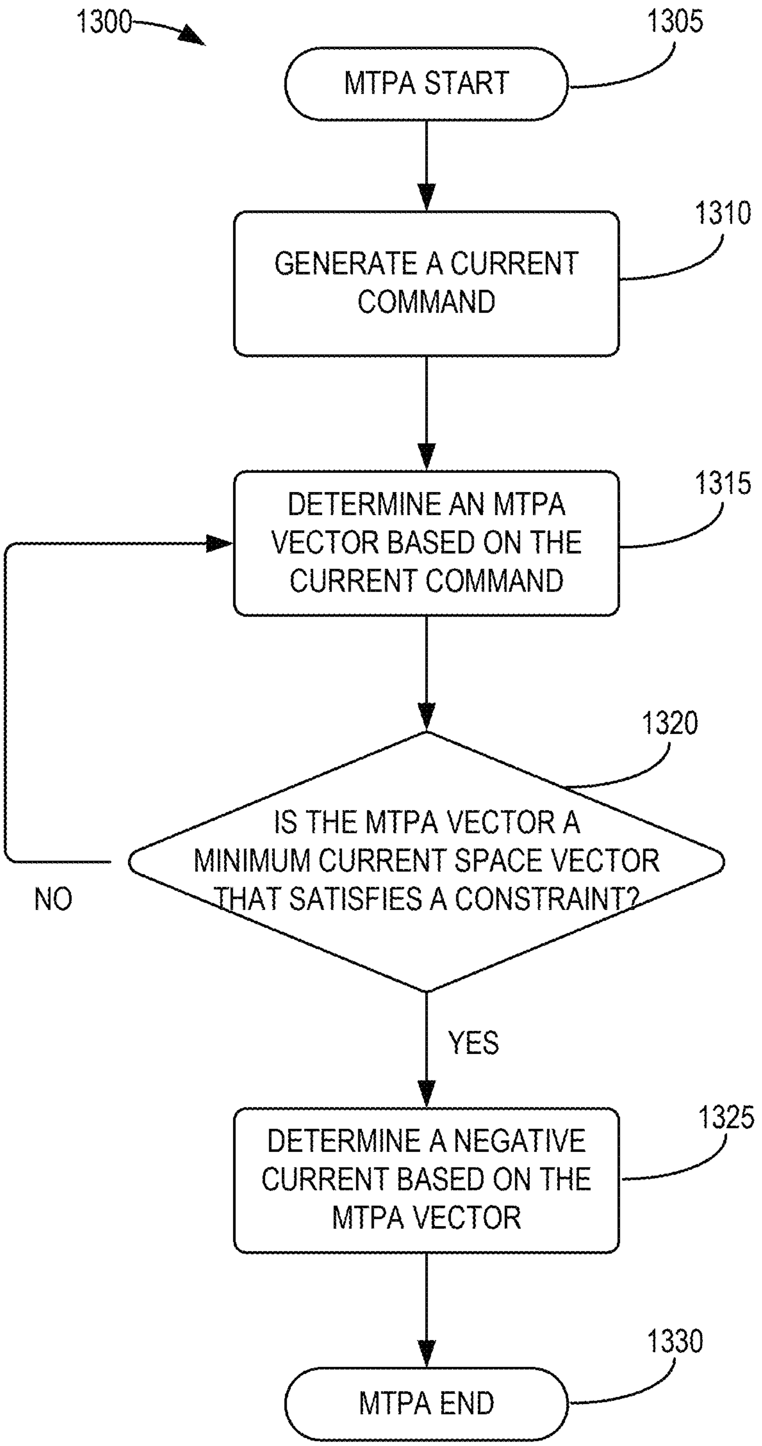
FIG. 13 is a flow chart of a method for implementing an MTPA algorithm, according to some embodiments.

FIG. 13 is a flow chart of a method 1300 for implementing an MTPA algorithm. The method 1300 begins when a controller (e.g., controller 304) executing the method 1300 receives a command to begin the MTPA algorithm (BLOCK 1305). The method 1300 includes generating a current command (BLOCK 1310). The current command may be generated by a speed controller (for example, speed controller 1205) based on a current angular speed $\omega_{ref}$ of the rotor of the sensorless motor 308 and a target angular speed $\tilde{\omega}$ for the rotor. The method 1300 also includes determining an MTPA vector (for example, the MTPA vector 1125) based on the current command (BLOCK 1315). The MTPA vector may be generated by an MTPA block (for example, MTPA block 1210) based on equation (5). The MTPA vector includes a torque current component, $i_q$, and a flux current component, $i_d$. The method 1300 also includes determining if the MTPA vector is a minimum current space vector that satisfies one or more constraints (BLOCK 1320). The one or more constraints may be one or more of the constraints identified with respect to FIG. 11, for example that the angle between the q-axis and the MTPA vector is between 0° and 45°.

If the MTPA vector is not a minimum current space vector that satisfies the one or more constraints, the method 1300 returns to BLOCK 1315 and recalculates the MTPA vector. Returning to BLOCK 1320, if the MTPA vector is a minimum current space vector that satisfies the one or more constraints, the method 1300 includes determining a negative current based on the MTPA vector (BLOCK 1325). The negative current may be a stator flux current component of the MTPA vector, that is, $i_d$. Once the negative current has been identified, the MTPA algorithm has been completed and the method 1300 ends (BLOCK 1330).

Figure 14:
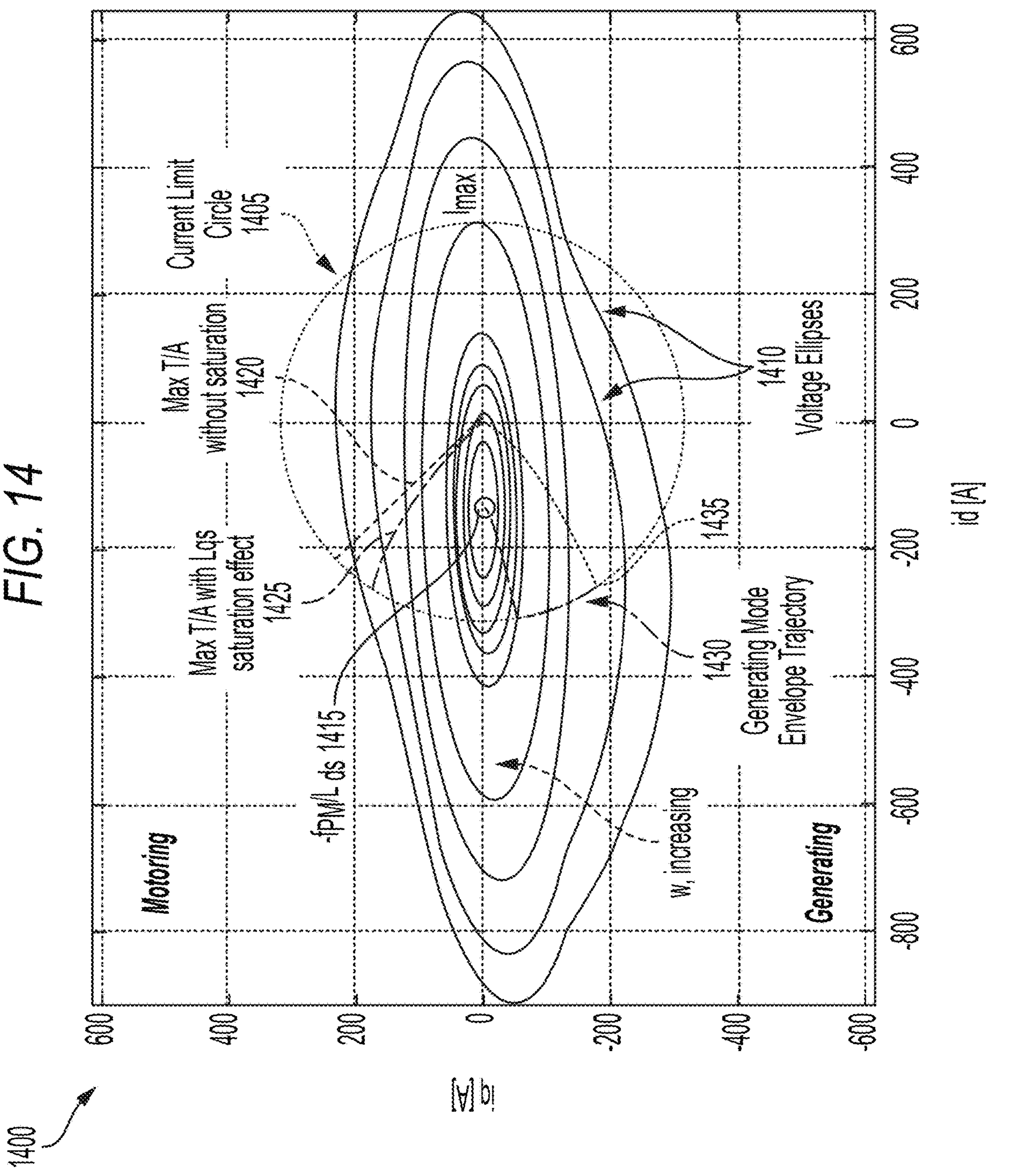
FIG. 14 is a graph illustrating a relationship between stator flux current and stator torque current, according to some embodiments.

FIG. 14 is a graph 1400 illustrating a relationship between stator flux current and stator torque current. The graph 1400 includes a current limit 1405 as a circle with an amplitude centered at the origin, and a voltage limit 1410 as a family of nested ellipses centered at the point at which the MTPA vector is optimized (that is, the value of $i_d$ counteracts the reluctance torque $T_e$ based on equation [3]). The radii of the ellipses of the voltage limit 1410 may vary inversely with a speed of the rotor of the sensorless motor 308. In some embodiments, the ellipses of the voltage limit 1410 are distorted along the vertical q-axis because of a saturation effect, and the diameters of the ellipses of the voltage limit 1410 exhibit a counter-clockwise tilt along the horizontal d-axis because of stator resistance effects. At any given speed, the sensorless motor 308 can operate at any combination of $i_q$ and $i_d$ values that falls within the overlapping area of the current limit 1405 and the voltage limit 1410 associated with that speed. The value of negative $I_d$ at which it completely opposes and negates the permanent magnet flux of the motor 308 is identified at 1415.

The graph 1400 also includes a first MTPA vector 1420 without the effects of magnetic saturation and a second MTPA vector 1425 with the effects of magnetic saturation. The first MTPA vector 1420 forms an angle with the negative d-axis that exceeds 45°, while the second MTPA vector 1425 forms an angle with the negative q-axis that does not exceed 45°. The graph 1400 also includes a maximum output power point 1430 that follows the periphery of the current limit 1405 towards the negative d-axis. This motion may be forced by the increasing speed that progressively shrinks the voltage limit 1410, preventing the machine from operating based on the MTPA algorithm, identified by a dashed line 1435.

The maximum output power point 1430 for speeds above the corner point may be an optimistic outer limit for the current vector locus that can only be approached but never quite reached for an actual current regulated drive. This is true because the outer boundary of the voltage limit 1410 at any speed corresponds to six-step voltage operation, representing a condition in which current regulator loops are completely saturated. Since a current regulator loses control of phase currents under such conditions, the current vector command can be continually adjusted so that it always resides safely inside the voltage limit 1410. However, it is desirable to approach the voltage limit 1410 as closely as possible under heavy load conditions in order to deliver maximum power from the sensorless motor 308, taking full advantage of the power supplied by the inverter 348. Therefore, the angle between the commanded current vector and the negative d-axis is reduced as the shrinking voltage limit 1410 progressively intrudes on the current limit 1405 for speeds above the corner point. This can be controlled by an MTPV algorithm, explained below with respect to FIGS. 15-17.

Figure 15:
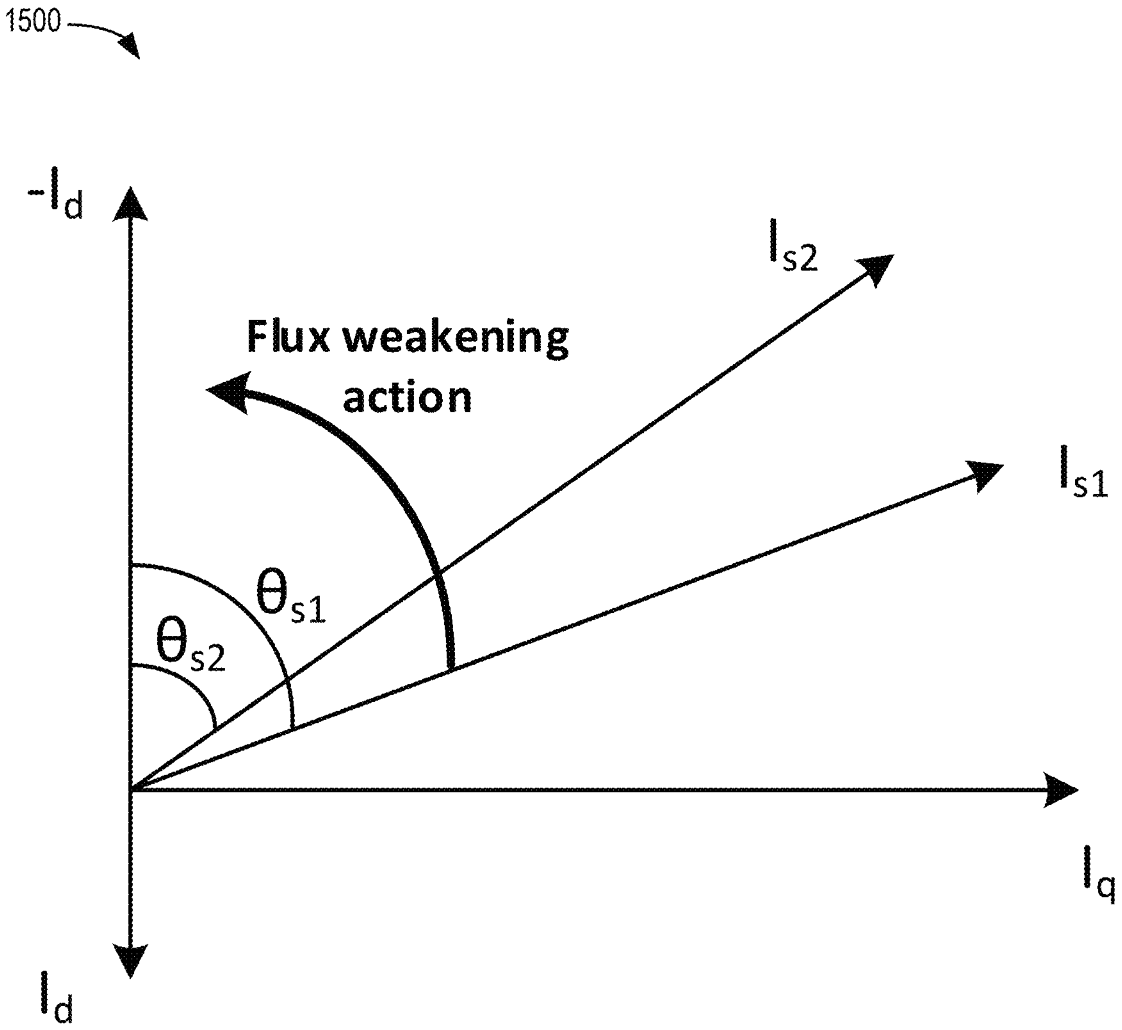
FIG. 15 is a graph illustrating the results of a dynamic field weakening operation, according to some embodiments.

FIG. 15 is a graph 1500 illustrating the results of a dynamic field weakening operation. Specifically, FIG. 15 illustrates how the angle, θs, between the commanded current vector, Is, is reduced as the shrinking voltage limit 1410 (see FIG. 14) progressively intrudes on the current limit 1405 for speeds above the corner point. This action illustrated in FIG. 15 forms the basis for implementing an MTPV control algorithm.

Figure 16:
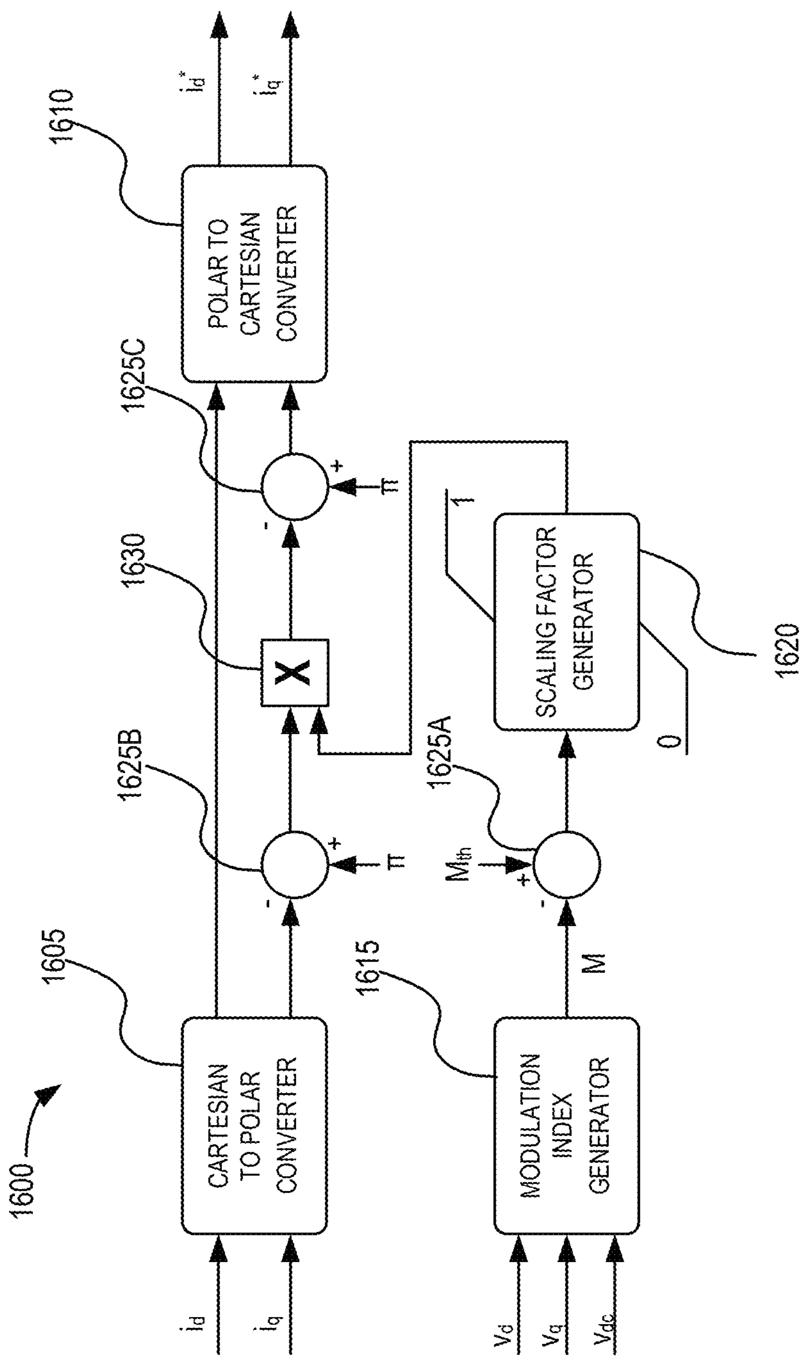
FIG. 16 is a block diagram of a control system for implementing an MTPV algorithm, according to some embodiments.

FIG. 16 is a block diagram of a control system 1600 for an MTPV algorithm. The control system 1600 includes a cartesian-to-polar converter 1605 configured to receive a first signal corresponding to stator flux current $i_d$ and a second signal corresponding to stator torque current $i_q$, and convert these signals from cartesian values to polar values. The cartesian-to-polar converter 1605 is configured to output a first signal corresponding to the polar $i_d$ value and a second signal corresponding to the polar $i_q$ value. The control system 1600 further includes a polar-to-cartesian converter 1610 configured to receive a first signal corresponding to the polar $i_d$ value and a second signal corresponding to the polar $i_q$ value. The polar $i_d$ value may be received directly from the cartesian-to-polar converter 1605, while the polar $i_q$ value may be received by an intervening control block.

The control system 1600 includes a modulation index generator 1615 configured to receive a first input signal $v_d$ corresponding to a flux voltage, a second input signal $v_q$ corresponding to a torque voltage, and a third input signal $v_{dc}$ corresponding to a DC link voltage applied to the inverter 348. The modulation index generator 1615 generates a PWM modulation index M based on the three input signals according to equation (8).

$$M = \frac{\sqrt{(v_d)^2 + (v_d)^2}}{\frac{2}{\pi} v_{dc}} \tag{8}$$

The modulation index generator 1615 outputs the PWM modulation index M. The control system 1600 further includes a first addition/subtraction block 1625A configured to receive and add an Mth value, wherein the Mth value is a preset modulation threshold value. The first addition/subtraction block 1625A also receives and subtracts the PWM modulation index M from the modulation index generator 1615. The first addition/subtraction block 1625A is further configured to output a signal corresponding to a result of the first addition/subtraction block 1625A. The control system 1600 includes a scaling factor generator 1620 configured to generate and output a signal corresponding to a scaling factor β between 0 and 1 based on the received signal from the first addition/subtraction block 1625A. By generating a scaling factor of between 0 and 1, only the angle of the current vector $I_s$, and not its amplitude, is directly controlled by the MTPV algorithm. Therefore, by using a scaling factor β of 1, the current vector generated by the MTPA control system 1200 is not affected. Referring back to FIG. 14, by using a scaling factor β of 1, the MTPV block 915 is effectively ignored while the field weakening controller 905 calculates values for $i_d$* and $i_q$*.

The control system 1600 also includes a second addition/subtraction block 1625B configured to receive and add a first signal n corresponding to Pi and receive and subtract a second signal corresponding to the polar torque current $i_q$ from the cartesian-to-polar converter 1605. The second addition/subtraction block 1625B is configured to output a signal corresponding to a result of the second addition/subtraction block 1625B. The control system 1600 further includes a multiplication block 1630 configured to receive a first signal β from the scaling factor generator 1620 corresponding to the generated scaling factor between 0 and 1, and a second signal from the second addition/subtraction block 1625B corresponding to a result of the second addition/subtraction block 1625B. The multiplication block 1630 is configured to output a signal corresponding to a product of the first signal and the second signal. The control system 1600 includes a third addition/subtraction block 1625C configured to receive and add a first signal n corresponding to Pi (e.g., Pi radians) and receive and subtract a second signal from the multiplication block 1630 corresponding to a result of the multiplication block 1630. The third addition/subtraction block 1625C is configured to output a signal corresponding to a result of the third addition/subtraction block 1625C. The polar-to-cartesian converter is configured to receive this signal from the third addition/subtraction block 1625C.

Figure 17:
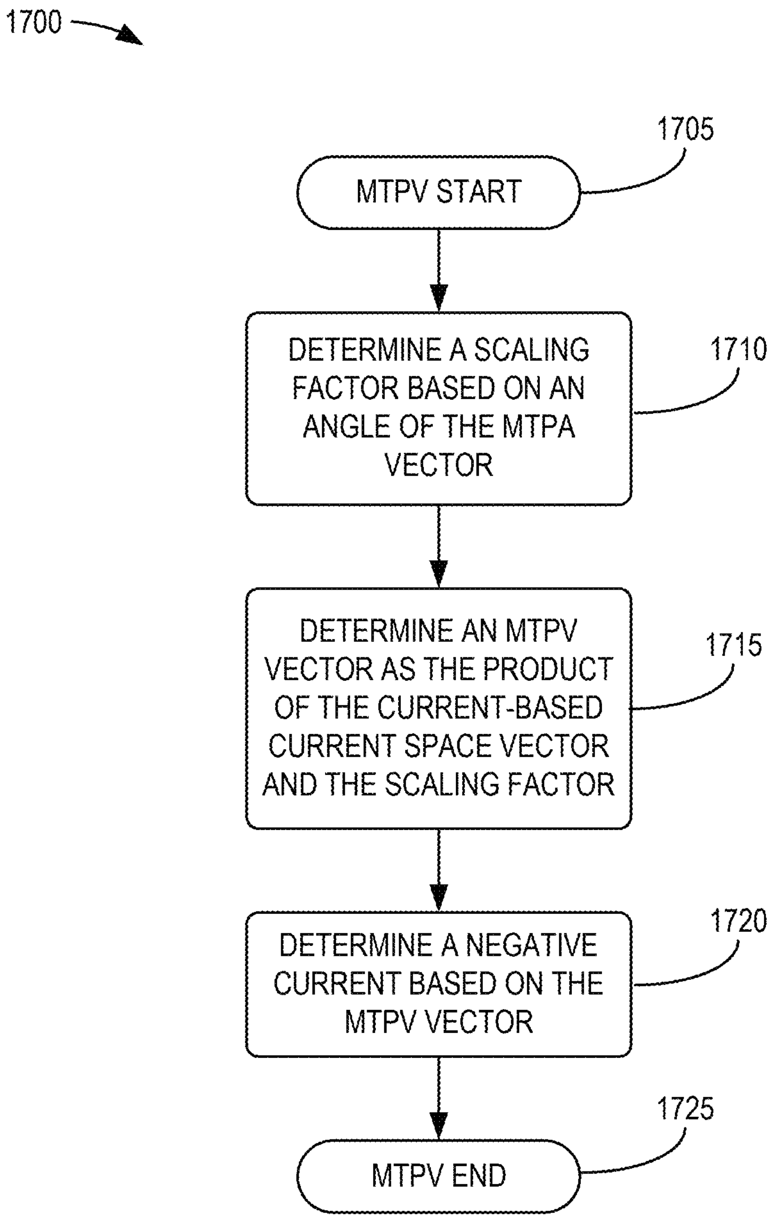
FIG. 17 is a flow chart of a method for implementing an MTPV algorithm, according to some embodiments.

FIG. 17 is a flow chart of a method 1700 for implementing an MTPV algorithm. The method 1700 begins when a controller executing the method 1700 receives a command to begin the MTPV algorithm (BLOCK 1705). The method includes determining a scaling factor based on an angle of the MTPA vector output by the MTPA algorithm (for example, in BLOCK 1325 of FIG. 13) (BLOCK 1710). The scaling factor may be between 0 and 1. The method 1700 also includes determining an MTPV vector as the product of the MTPA vector and the scaling factor (BLOCK 1715). In some embodiments, the scaling factor is 1. In these embodiments, the MTPV vector is the same as the MTPA vector. The method 1700 also includes determining a negative current based on the MTPV vector (BLOCK 1720). The negative current may be the flux current component $i_d$ of the MTPV vector, that is, $i_d$. Once the negative current has been identified, the MTPV algorithm has been completed and the method 1700 ends (BLOCK 1725).

Figure 18:
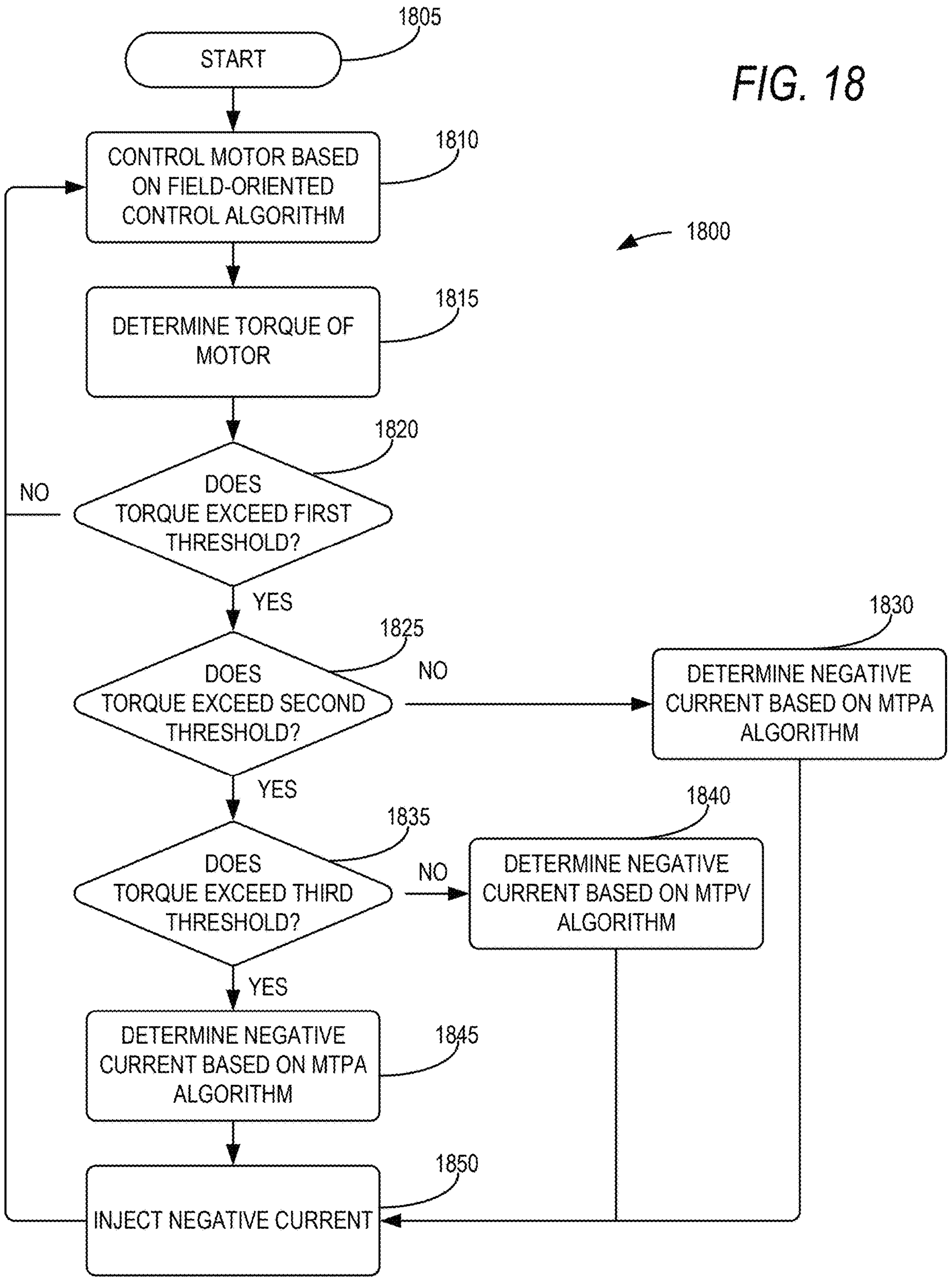
FIG. 18 is a flow chart of a method for implementing dynamic field weakening in a power tool, according to some embodiments.

FIG. 18 is a flow chart of a method 1800 for implementing dynamic field weakening in a power tool based on the above disclosures. The method 1800 begins when a power tool (for example, the power tool 100) begins operation (BLOCK 1805). In some embodiments, the power tool may be capable of switching between field weakening and non-field weakening modes. The method 1800 includes controlling a sensorless motor of the power tool (for example, the sensorless motor 308) based on a field-oriented control (FOC) algorithm (BLOCK 1810). The FOC algorithm may be implemented on an FOC controller (for example, the FOC controller 935). The method 1800 then includes determining a torque of the sensorless motor (BLOCK 1815). The method 1800 may determine torque based on a torque observer (for example, the torque observer 950). The method 1800 then determines if the torque exceeds a first predetermined threshold (BLOCK 1820). In some embodiments, the first predetermined threshold is 0 Nm (i.e., dynamic field weakening is implemented whenever the sensorless motor is in an operating mode). If the torque does not exceed the first predetermined threshold, the method 1800 then returns to BLOCK 1810. In some embodiments, the method 1800 may include determining a parameter of the sensorless motor other than the torque in BLOCK 1815. For example, the method 1800 may instead determine a speed, a temperature, an operating time, or another parameter. In these embodiments, the first predetermined threshold (and other thresholds) may be based on the determined parameter. For example, in an embodiment in which motor speed is determined, the first predetermined threshold may be a speed threshold.

Returning to BLOCK 1820, if the method 1800 determines that the torque does exceed the first predetermined threshold, the method 1800 includes determining if the torque also exceeds a second predetermined threshold (BLOCK 1825). If the torque does not exceed the second predetermined threshold, the method 1800 includes determining a negative stator flux current based on a max-torque-per-amps ("MTPA") algorithm, such as the algorithm described by FIG. 13 (BLOCK 1830). Returning to BLOCK 1825, if the method 1800 determines that the torque does exceed the second predetermined threshold, the method 1800 includes determining if the torque also exceeds a third torque threshold (BLOCK 1835). If the torque does not exceed the third predetermined threshold, the method 1800 includes determining a negative stator flux current based on a max-torque-per-volts ("MTPV") algorithm, such as the algorithm described by FIG. 17 (BLOCK 1840). Returning to FIG. 1835, if the method 1800 determines that the torque does exceed the third predetermined threshold, the method 1800 includes determining a negative stator flux current based on the MTPA algorithm, such as the algorithm described by FIG. 8 (BLOCK 1845). Following the determination of a negative stator flux current by any of BLOCKS 1830, 1840, or 1845, the method 1800 also includes injecting the negative stator flux current into the sensorless motor to weaken a magnetic field generated by the rotor, therefore increasing the speed of the rotor (BLOCK 1850). It is important to note that the method 1800 requires significant processing power to complete the associated MPTA and MPTV algorithms. Conventional power tools (e.g., handheld power tools) lack the processing power required to implement the method 1800. However, the power tool 100 is capable of implementing the method 1800.

Figure 19:
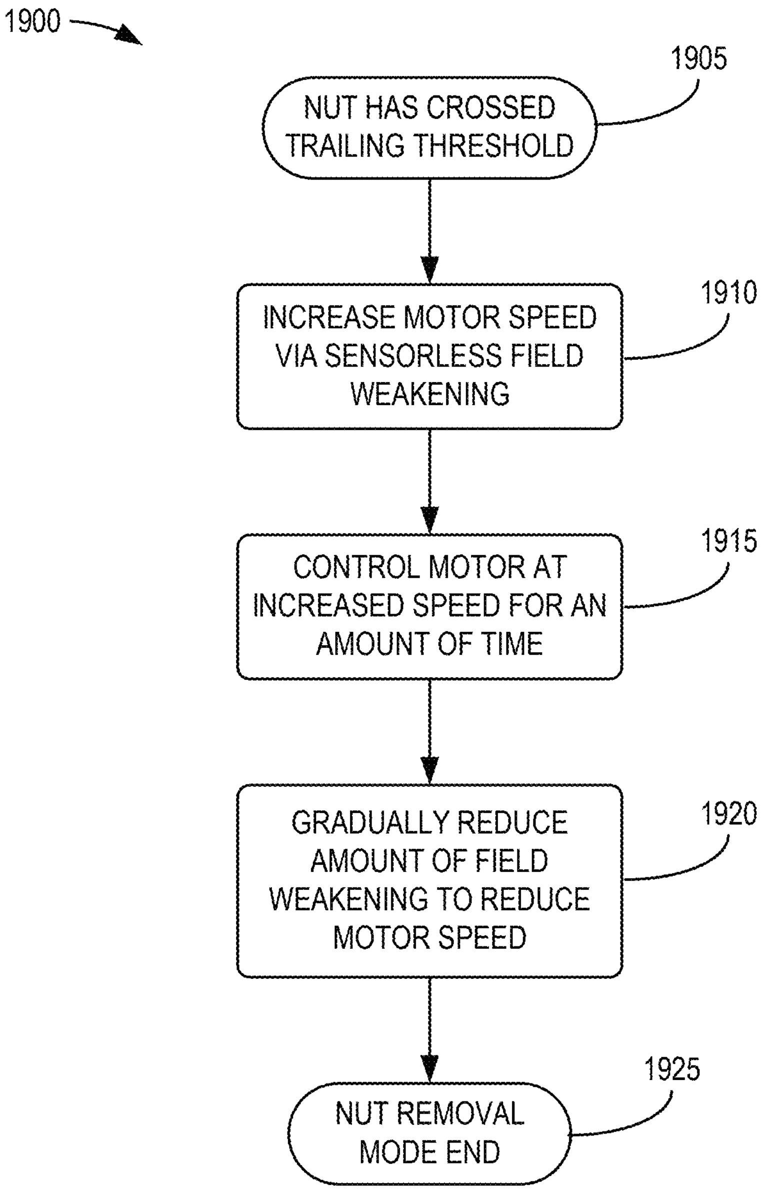
FIG. 19 is a flow chart of a method for implementing an adaptive nut removal mode in a power tool via dynamic field weakening, according to some embodiments.

FIG. 19 is a flow chart of a method 1900 for implementing an adaptive nut removal mode in a power tool via dynamic field weakening. The method 1900 begins when the nut has broken away from a joint (e.g., crossed a trailing threshold), for example in BLOCK 615 of FIG. 6 (i.e., the method 1900 occurs in BLOCK 620) (BLOCK 1905). The method includes increasing a speed of the motor 308 by employing dynamic field weakening (e.g., the method 1800 of FIG. 18) (BLOCK 1910). In some embodiments, a sensored motor control scheme is implemented and conduction angle phase advance is used to increase the speed of the motor. The amount of field weakening in the motor 308 may be such that the speed of the motor 308 increases above a no-load speed of the motor 308. The method 1900 also includes controlling the motor 308 at the increased speed for an amount of time (e.g., a predetermined amount of time) (BLOCK 1915). In some embodiments, the predetermined time may be a calculated time until the nut disengages from the other fastener. In other embodiments, the predetermined time may be set by an operator of the power tool 100. In still other embodiments, the predetermined time may be identified based on a parameter of the power tool 100. Following the predetermined time, the method 1900 includes gradually reducing the amount of field weakening to reduce the speed of the motor (BLOCK 1920). This allows the power tool 100 to retain greater control of the nut once the nut has disengaged entirely from the other fastener. The method 1900 ends when the nut removal mode ends (for example, in BLOCK 625 of FIG. 6) (BLOCK 1925).

Figure 20A:
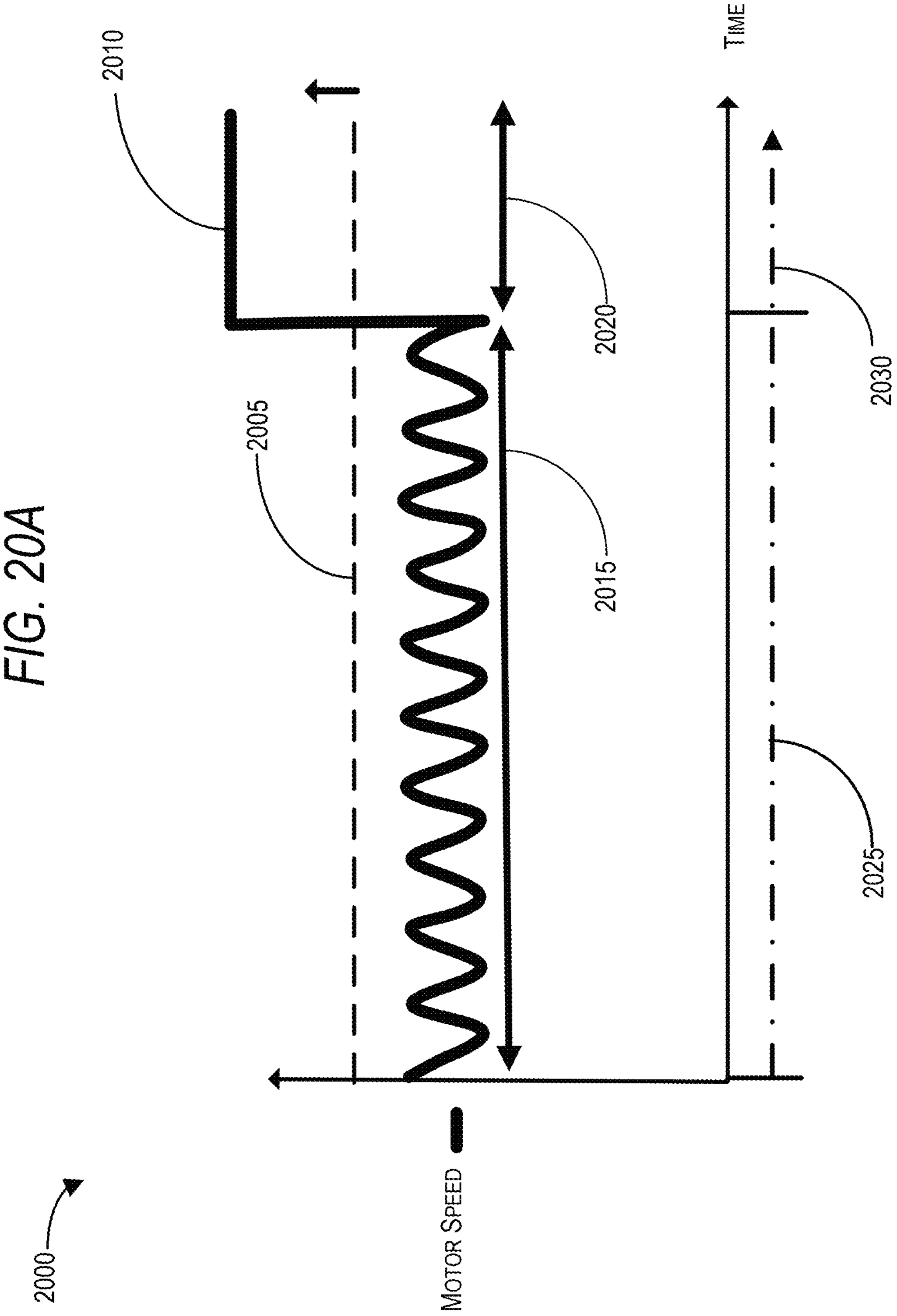
FIGS. 20A and 20B are graphs illustrating motor speed of a power tool implementing an adaptive nut removal mode at a first time and a second time, respectively, according to some embodiments.

FIG. 20A is a graph 2000 illustrating motor speed of a power tool implementing an adaptive nut removal mode (for example, the power tool 100) at a first time. The graph 2000 includes a dashed line 2005 representing a speed of a motor of the power tool 100 (for example, the motor 308) while operating in a no-load condition. The graph 2000 also includes a solid line 2010 representing a speed of the motor 308 during the adaptive nut removal mode. The graph 2000 also includes a first arrow 2015 representing a region in which the motor 308 is in a first configuration, and a second arrow 2020 representing a region in which the motor 308 is in a second configuration. In some embodiments, the first configuration is a WYE configuration, and the second configuration is a DELTA configuration. The x-axis of the graph 2000 is divided into a first region 2025 and a second region 2030, representing two periods of time in the nut removal operation. The first region 2025 represents a time during which a tension of the nut is still present (i.e., the nut resists spinning), and the second region 2030 represents a time during which there is limited or no tension on the nut (i.e., the nut spins freely). The y-axis of the graph 2000 represents the speed of the motor. As illustrated by the solid line 2010, while operating in the first region 2025, the motor 308 functions similarly to the conventional motor illustrated by FIG. 5B. However, unlike the conventional motor, in the second region 2030 the speed of the motor 308 increases to a higher value (e.g., a constant value) greater than the no-load speed. In some embodiments, this speed increase is accomplished by employing motor configuration switching, which is explained further below. Increasing the speed of the motor in the second region 2030 allows for the nut to be removed faster than in a conventional nut removal mode.

Figure 20B:
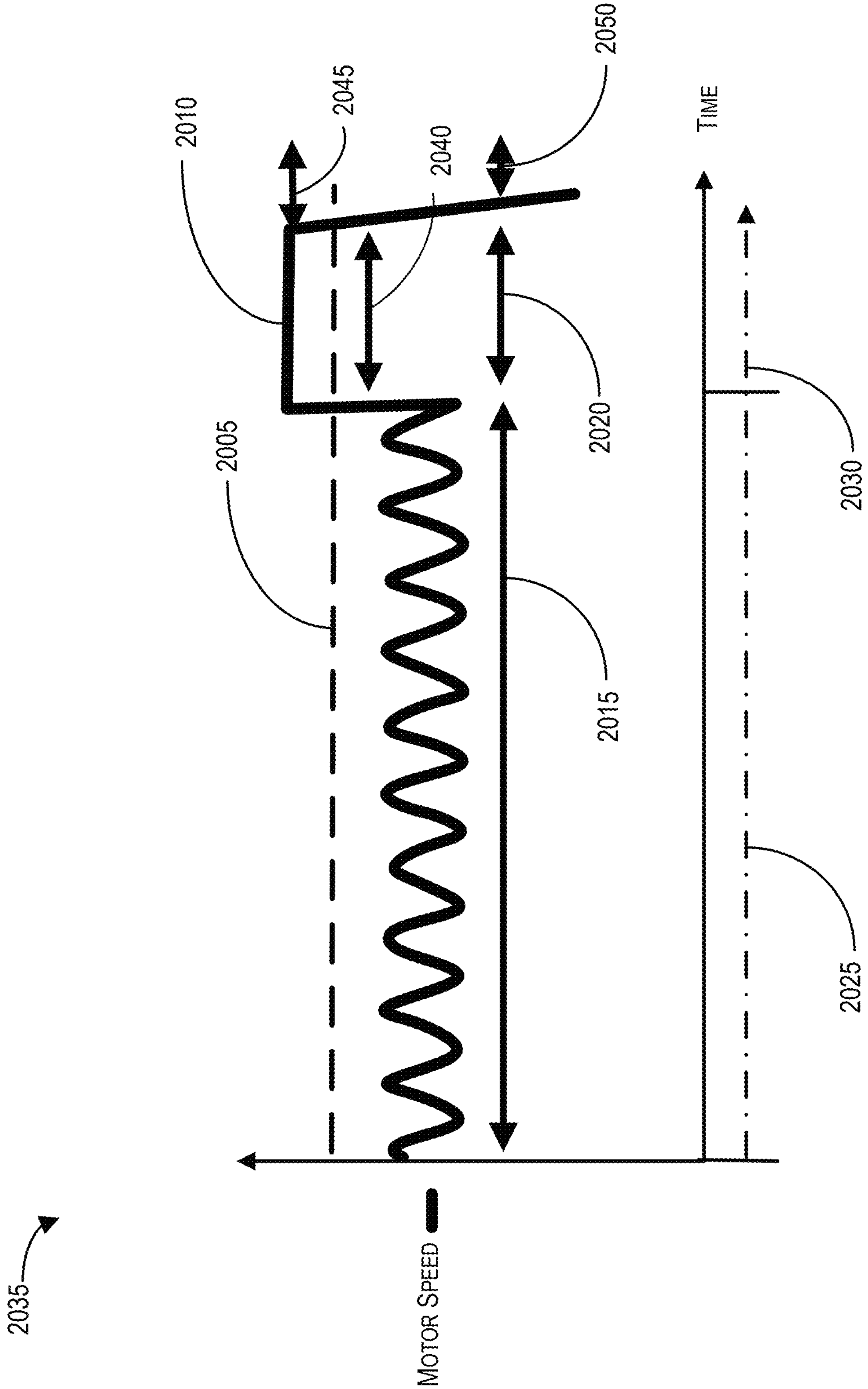

FIG. 20B is a graph 2035 illustrating motor speed of the power tool 100 at a second time. The graph 2035 differs from the graph 2000 of FIG. 20A in that the second region 2030 is further divided into a first sub-region 2040 and a second sub-region 2045. In the first sub-region 2040, the motor 308 operates at the increased constant speed, as described with respect to FIG. 20A. In some embodiments, this increased speed is attained via motor configuration switching. However, in the second sub-region 2045, the speed of the motor 308 decreases to a speed lower than the speed of the motor 308 in the first region 2025. By decreasing the speed of the motor 308 in the second sub-region 2045, the likelihood of the nut being dropped or lost once the nut fully disengages from the other fastener decreases, thereby allowing the nut to be removed faster than a conventional nut removal method while retaining control of the nut following removal. In some embodiments, the speed reduction may be accomplished by reverting the motor configuration switching operation. For example, the graph 2035 also includes a third arrow 2050 representing a region in which the motor 308 has returned to the first configuration.

Figure 21:
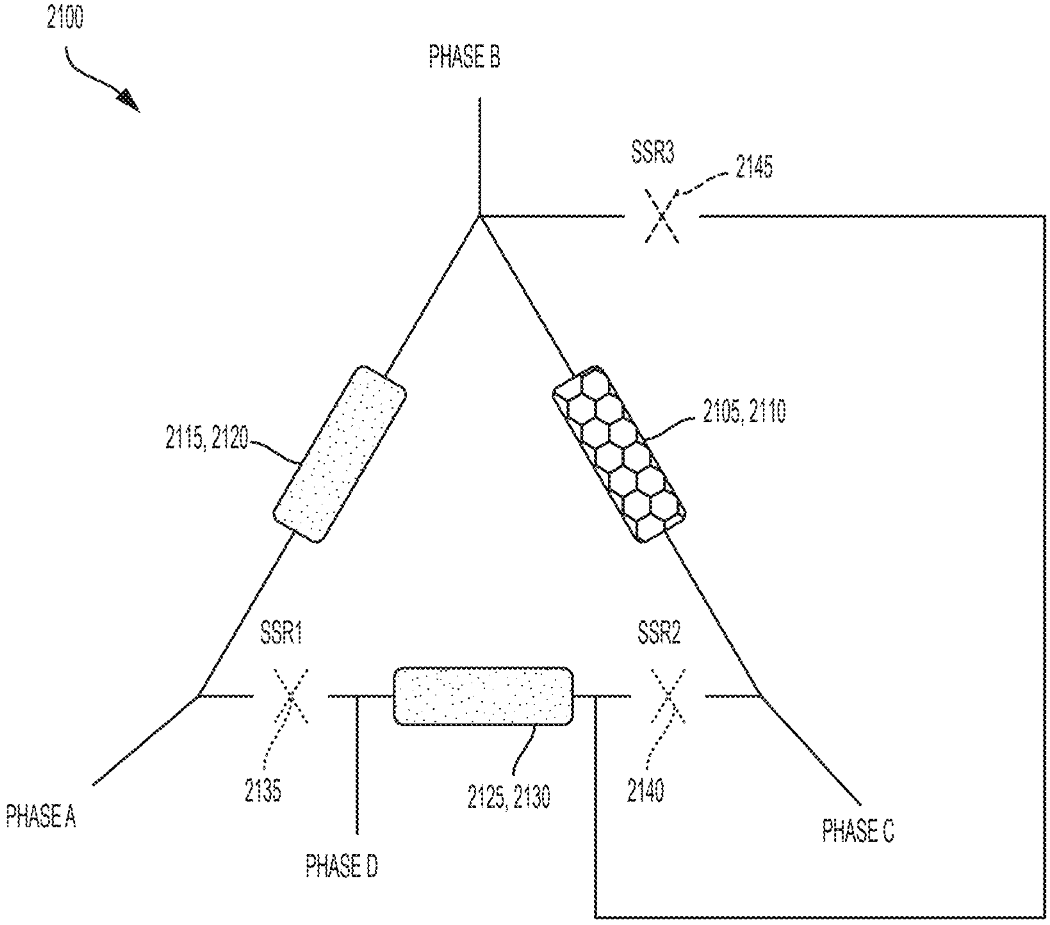
FIG. 21 illustrates a circuit for configuring a motor in a WYE or DELTA configuration, according to some embodiments.

FIG. 21 illustrates a circuit 2100 for switching between a DELTA configuration of a motor and a WYE configuration of a motor. The circuit 2100 includes two phase windings for a first phase 2105, 2110 of the motor 308, two phase windings for a second phase 2115, 2120 of the motor 308, and two phase windings for a third phase 2125, 2130 of the motor 308. In some embodiments, the three pairs of phase windings are included in a stator of the motor 308. In the circuit 2100 illustrated in FIG. 21, in addition to phase A, phase B, and phase C, a fourth phase D is included in the circuit 2100. For example, an additional pair of phase switches can be added to the inverter 348. As a result, rather than having a total of six switches (e.g., MOSFETs) in the inverter 348, the inverter 348 could include eight switches (e.g., two switches per phase of the motor 308). However, because the motor 308 only includes three pairs of phase windings in the stator, only three of the four motor phases are actively used at a given time. Which of the phases are active depends upon the selected configuration of the stator.

As shown in FIG. 21, the circuit 2100 also includes a first switching point 2135, a second switching point 2140, and a third switching point 2145. The first switching point 2135 is between phase A and phase D, the second switching point 2140 is between phase C and the third switching point 2145, and the third switching point 2145 is between phase B and the second switching point 2140. In some embodiments, each switching point includes one switch (e.g., a FET, a MOSFET, a solid-state relay, etc.). In other embodiments, each switching point includes more than one switch (e.g., two switches back-to-back [common source or common drain] to create four-quadrant switch implementation). Accordingly, in some embodiments, the circuit 2100 includes a total of eight additional switches when compared to a conventional three phase DC motor that is permanently configured in either a DELTA configuration or a WYE configuration. The switches at the switching points 2135, 2140, 2145 are selectively controlled by the controller 304 to configure the stator in either a DELTA configuration or a WYE configuration.

Figure 22A:
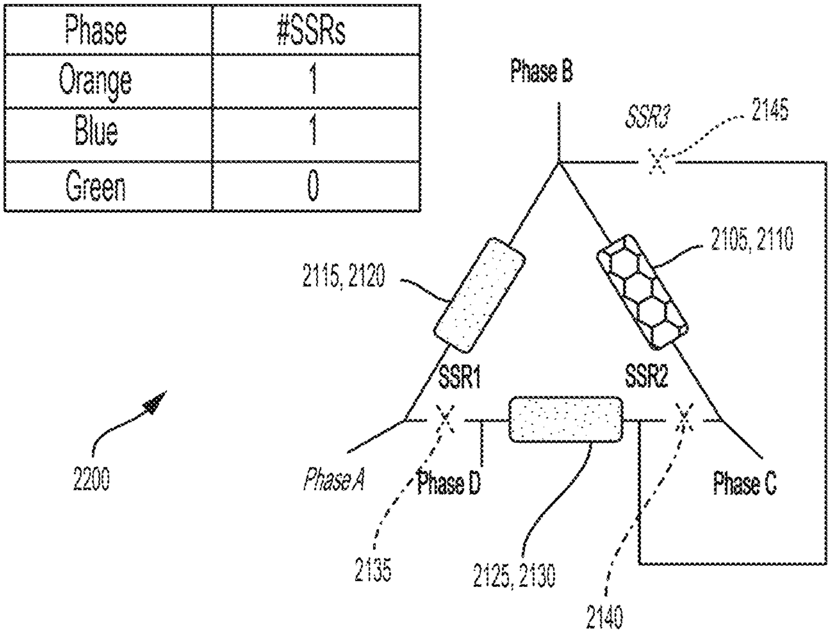
FIG. 22A illustrates a technique for configuring a motor in a DELTA configuration, according to some embodiments.

FIG. 22A illustrates a circuit 2200 for the stator in a DELTA configuration of the four-phase circuit of FIG. 21. In the DELTA configuration, the first switching point 2135 and the second switching point 2140 are configured to be closed (i.e., conducting state), and the third switching point 2145 is configured to be open (i.e., non-conducting state). As also illustrated in FIG. 22A, the stator is using the additional fourth phase D rather than the conventional phase A. As a result, the phase windings 2105, 2110 include the first switching point 2135 (and associated switches) and the phase windings 2125, 2130 include the second switching point 2140 (and associated switches).

Figure 22B:
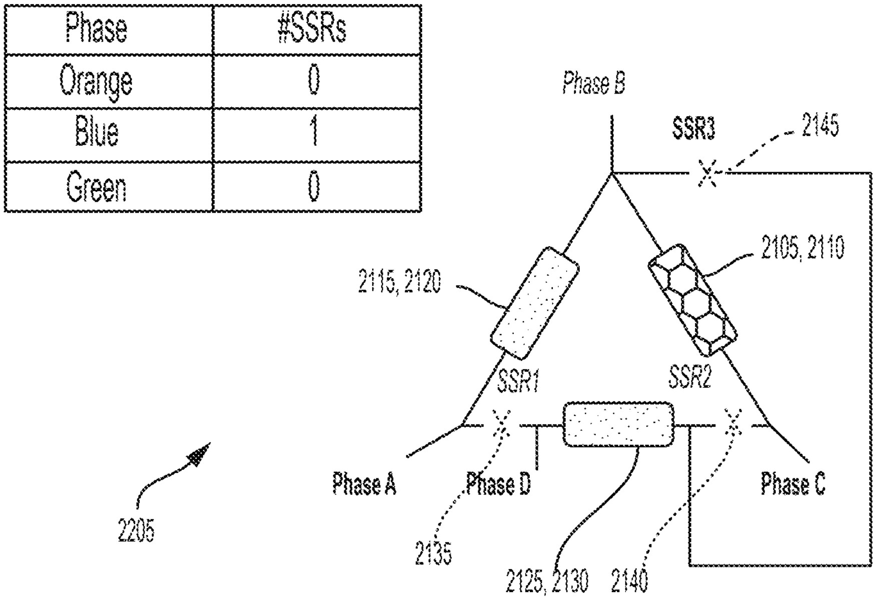
FIG. 22B illustrates a technique for configuring a motor in a WYE configuration, according to some embodiments.

FIG. 22B illustrates a circuit 2205 for the stator in a WYE configuration of the four-phase circuit of FIG. 21. In the WYE configuration, the first switching point 2135 and the second switching point 2140 are configured to be open (i.e., non-conducting state), and the third switching point 2145 is configured to be closed (i.e., conducting state). As also illustrated in FIG. 22B, the stator is using the additional fourth phase D rather than the conventional phase B. As a result, the phase windings 2125, 2130 include the third switching point 2145 (and associated switches).

Figure 23A:
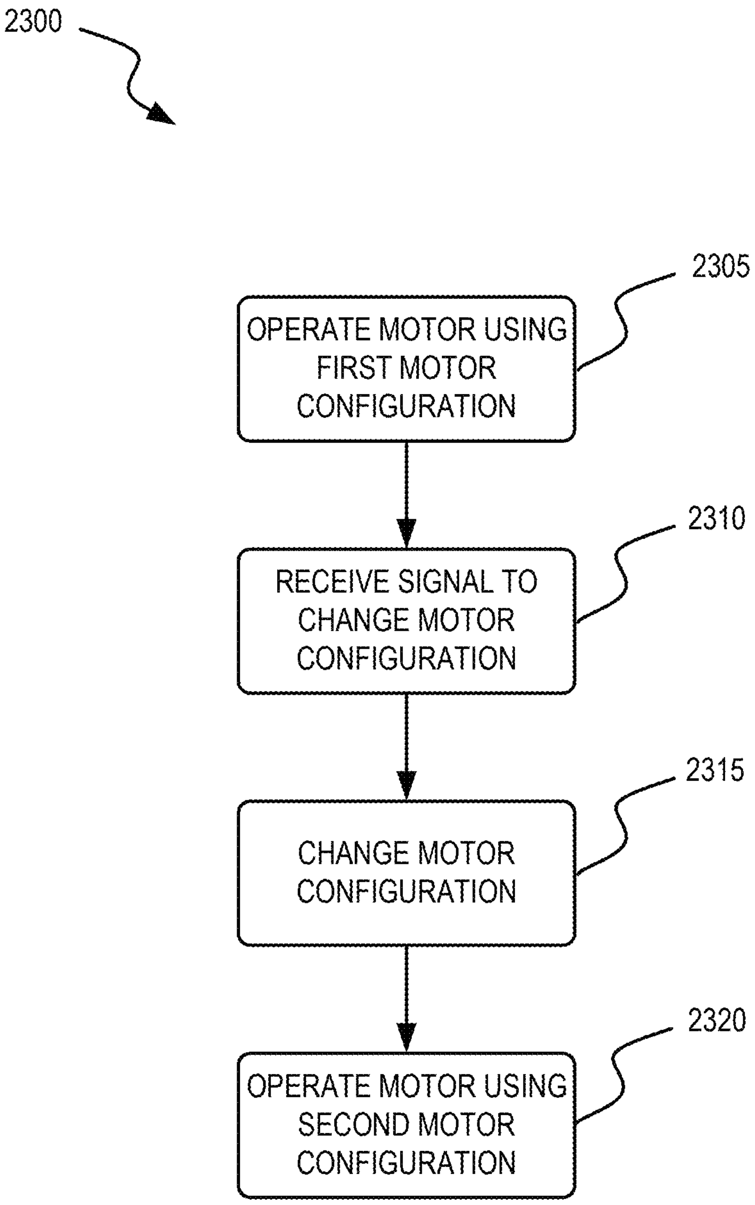
FIG. 23A is a flow chart of a method for changing a motor configuration, according to some embodiments.

FIG. 23A is a flow chart illustrating a method 2300 for switching the circuit 2100 of FIG. 21 between the DELTA configuration of circuit 2200 and the WYE configuration of circuit 2205, and vice versa. The method 2300 includes operating the power tool 100 by the controller 304 with the motor 308 having the stator in a first motor configuration (BLOCK 2305). Operation of the power tool 100 generally refers to the motor 308 rotating in order to produce a rotational output of the drive mechanism 215. The rotational motion of the drive mechanism 215 is then used to produce a desired output operation, which varies by a type of power tool 100 (e.g., a rotational output, a reciprocating output, a pulling output, etc.). The method 2300 then includes receiving a signal to change the configuration of the motor 308 (BLOCK 2310). In some embodiments, the signal is provided by a user through the user input module(s) 336. For example, a user can select or adjust a shift point based on a particular application (e.g., wood, metal, embedded nail, etc.). In other embodiments, the signal is generated internally by the controller 304 based on a condition of the power tool 100 and/or motor 308. For example, the controller 304 can generate the signal to change motor configuration based on a speed of the motor, a torque of the motor, a current of the motor, a load point of the motor, a field weakening conduction angle of the motor (e.g., an amount of field weakening used to maintain the current speed), a type of battery pack connected to the power tool (e.g., based on the capacity of the battery pack), a state of charge of a battery pack (e.g., to optimize runtime over performance), grip strength above a threshold grip strength, a temperature (e.g., motor temperature) above or below a temperature threshold, etc. After the controller 304 determines that the motor configuration is to be changed, the method 2300 include controlling the switching points 2135, 2140, 2145 to either switch the motor from the DELTA configuration to the WYE configuration or from the WYE configuration to the DELTA configuration (BLOCK 2315). In some embodiments, the motor 308 is allowed to coast (e.g., all switches in the inverter 348 ON) for a predetermined amount of time (e.g., 600 μs) prior to changing the motor configuration to the DELTA configuration or the WYE configuration. The method 2300 also includes operating the power tool 100 and motor 308 by the controller 304 with the modified motor configuration (BLOCK 2320).

Figure 23B:
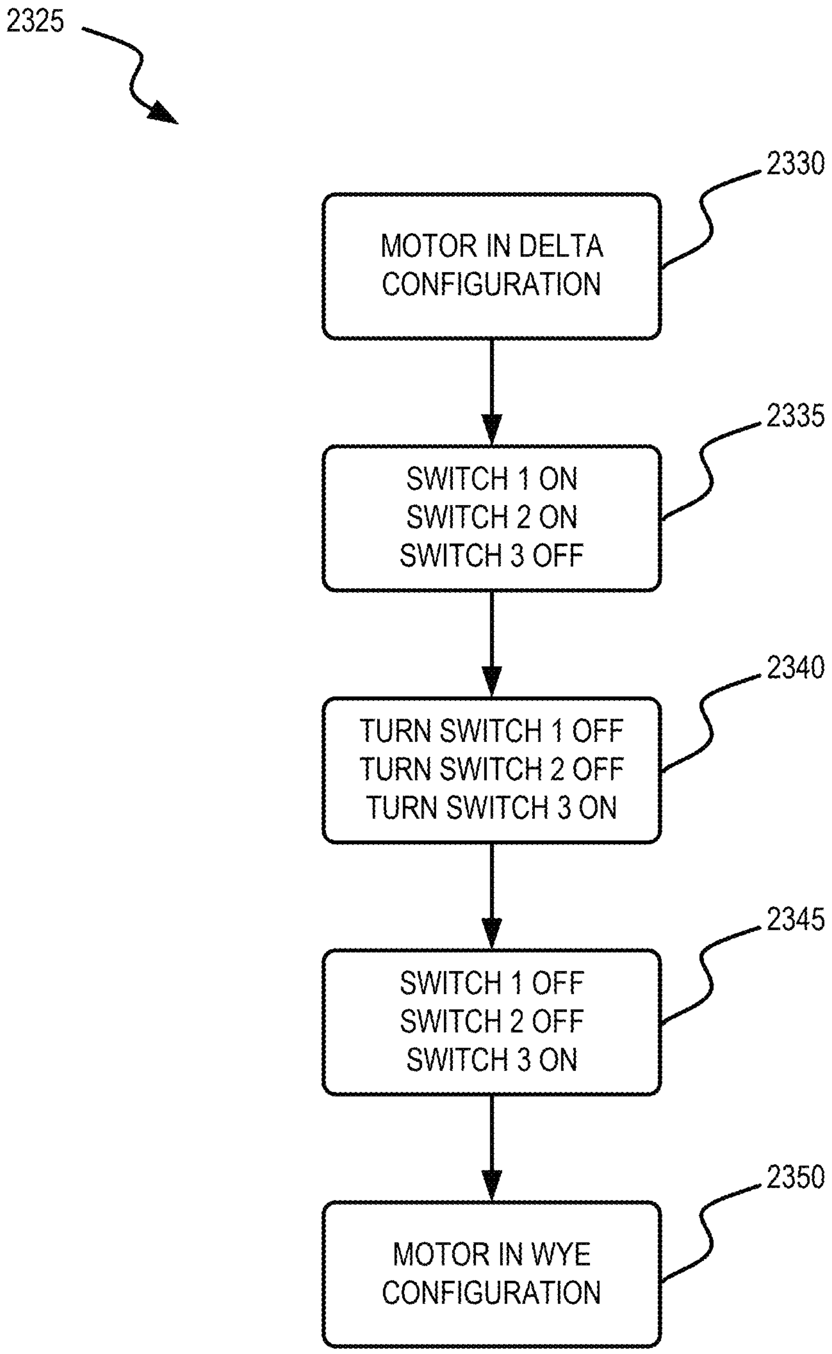
FIG. 23B is a flow chart of a method for changing a motor configuration, according to some embodiments.

FIG. 23B is a process 2325 for switching the circuit 2100 of FIG. 21 from the DELTA configuration of circuit 2200 to the WYE configuration of circuit 2205. At BLOCK 2330, the power tool 100 is being operated by the controller 304 with the stator in the DELTA configuration. In the DELTA configuration, the first switching point 2135 is ON, the second switching point 2140 is ON, and the third switching point 2145 is OFF (BLOCK 2335). When the controller 304 switches from the DELTA configuration to the WYE configuration, the first switching point 2135 is turned OFF, the second switching point 2140 is turned OFF, and the third switching point 2145 is turned ON (BLOCK 2340). The stator is now in the WYE configuration and the first switching point 2135 is OFF, the second switching point 2140 is OFF, and the third switching point 2145 is ON (BLOCK 2345). The controller 304 then operates the power tool 100 and the motor 308 in the WYE configuration (BLOCK 2350).

Figure 23C:
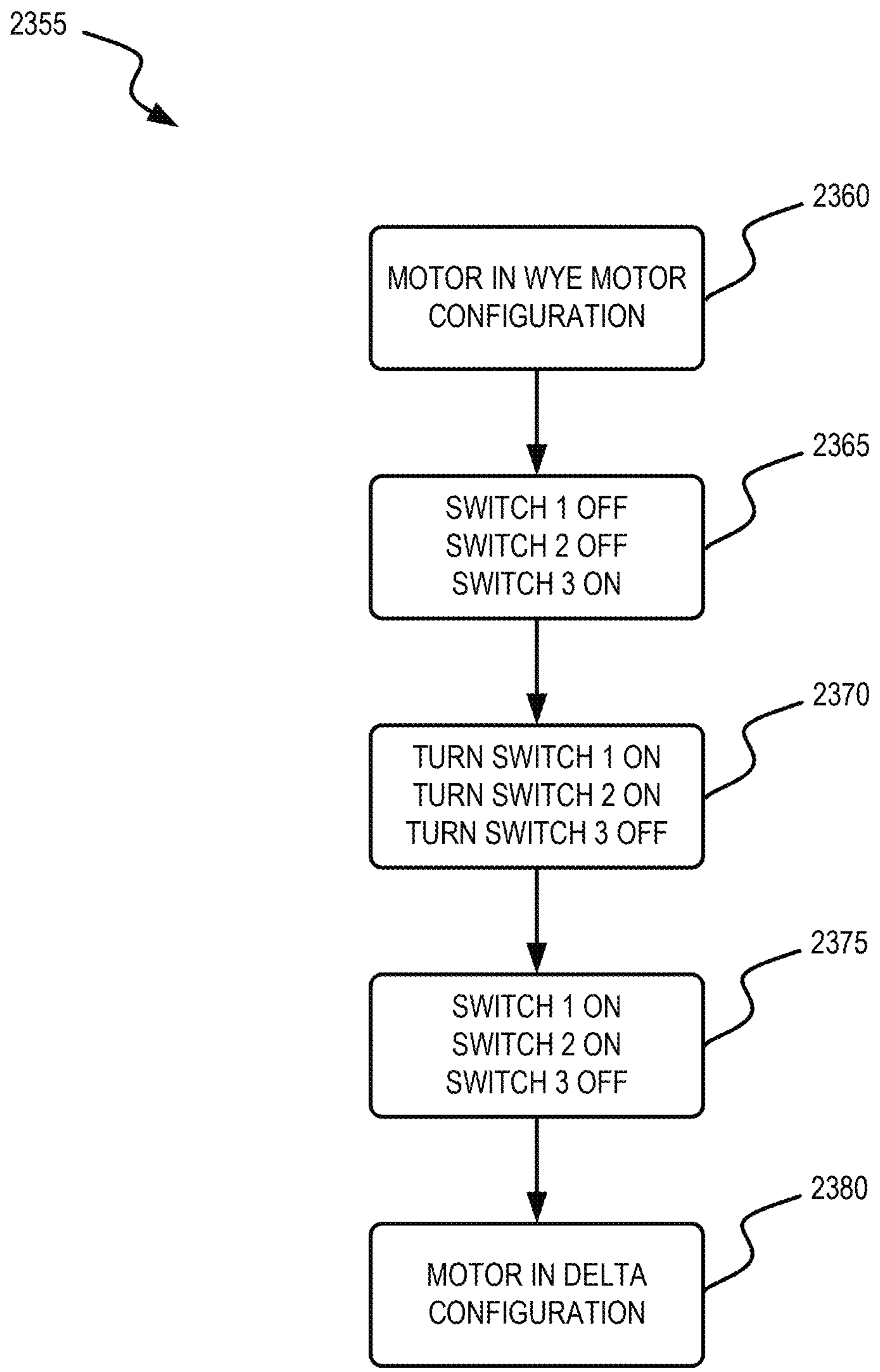
FIG. 23C is a flow chart of a method for changing a motor configuration, according to some embodiments.

FIG. 23C is a process 2355 for switching the circuit 2100 of FIG. 21 from the WYE configuration of circuit 2205 to the DELTA configuration of circuit 2200. At BLOCK 2360, the power tool 100 is being operated by the controller 304 with the stator in the WYE configuration. In the WYE configuration, the first switching point 2135 is OFF, the second switching point 2140 is OFF, and the third switching point 2145 is ON (BLOCK 2365). When the controller 304 switches from the WYE configuration to the DELTA configuration, the first switching point 2135 is turned ON, the second switching point 2140 is turned ON, and the third switching point 2145 is turned OFF (BLOCK 2370). The stator is now in the DELTA configuration and the first switching point 2135 is ON, the second switching point 2140 is ON, and the third switching point 2145 is OFF (BLOCK 2375). The controller 304 then operates the power tool 100 and the motor 308 in the DELTA configuration (BLOCK 2380).

Figure 24:
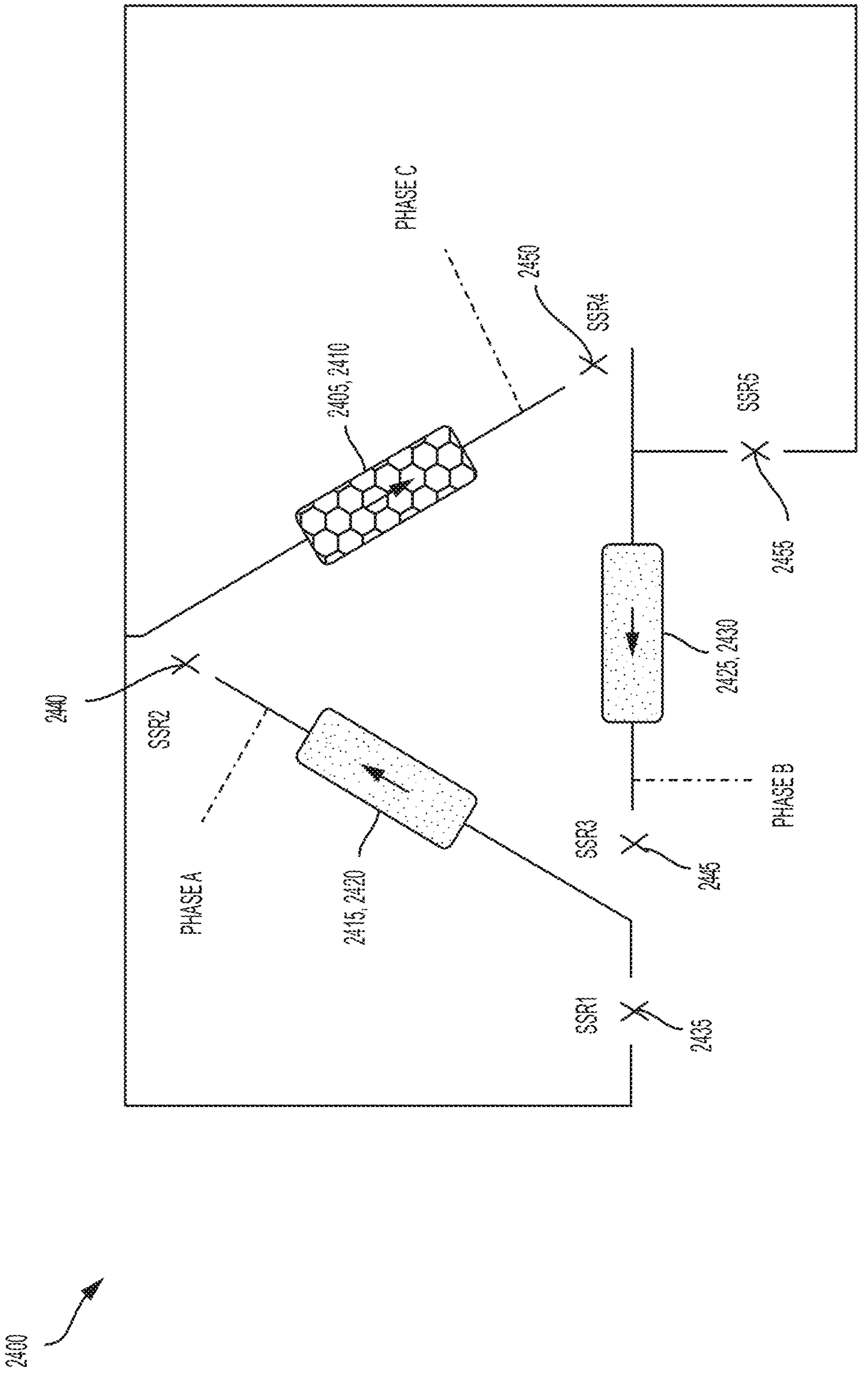
FIG. 24 illustrates a circuit for configuring a motor in a WYE or DELTA configuration, according to some embodiments.

FIG. 24 illustrates another circuit 2400 for switching between a DELTA configuration of a motor and a WYE configuration of a motor. The circuit 2400 includes two phase windings for a first phase 2405, 2410 of the motor 308, two phase windings for a second phase 2415, 2420 of the motor 308, and two phase windings for a third phase 2425, 2430 of the motor 308. In some embodiments, the three pairs of phase windings are included in a stator of the motor 308. In the circuit illustrated in FIG. 24, in the power tool 100 includes phase A, phase B, and phase C (but not the fourth phase D included in the circuit 2100 of FIG. 21). As shown in FIG. 24, the circuit 2400 also includes a first switching point 2435, a second switching point 2440, a third switching point 2445, a fourth switching point 2450, and a fifth switching point 2455. The first switching point 2435 is between phase windings 2415, 2420 and the phase windings 2425, 2430. The second switching point 2440 is between the phase windings 2405, 2410 and the phase windings 2415, 2420. The third switching point 2445 is between phase windings 2415, 2420 and phase B. The fourth switching point 2450 is between phase C and the phase windings 2425, 2430. The fifth switching point 2455 is between the phase windings 2425, 2430 and the phase windings 2405, 2410. In some embodiments, each switching point includes one switch (e.g., a FET, a MOSFET, a solid-state relay, etc.). In other embodiments, each switching point includes more than one switch (e.g., two switches back-to-back to create four-quadrant switch implementation). Accordingly, in some embodiments, the circuit 2400 includes a total of ten additional switches when compared to a conventional three phase DC motor that is permanently configured in either a DELTA configuration or a WYE configuration. The switches at the switching points 2435, 2440, 2445, 2450, 2455 are selectively controlled by the controller 304 to configure the stator in either a DELTA configuration or a WYE configuration. The circuit 2400 uses fewer switches than conventional DELTA-WYE switching configurations, and keeps the neutral line attached to one of the three phases when not in the WYE configuration. Conventionally, the neutral line would be floating when not in the WYE configuration.

Figure 25A:
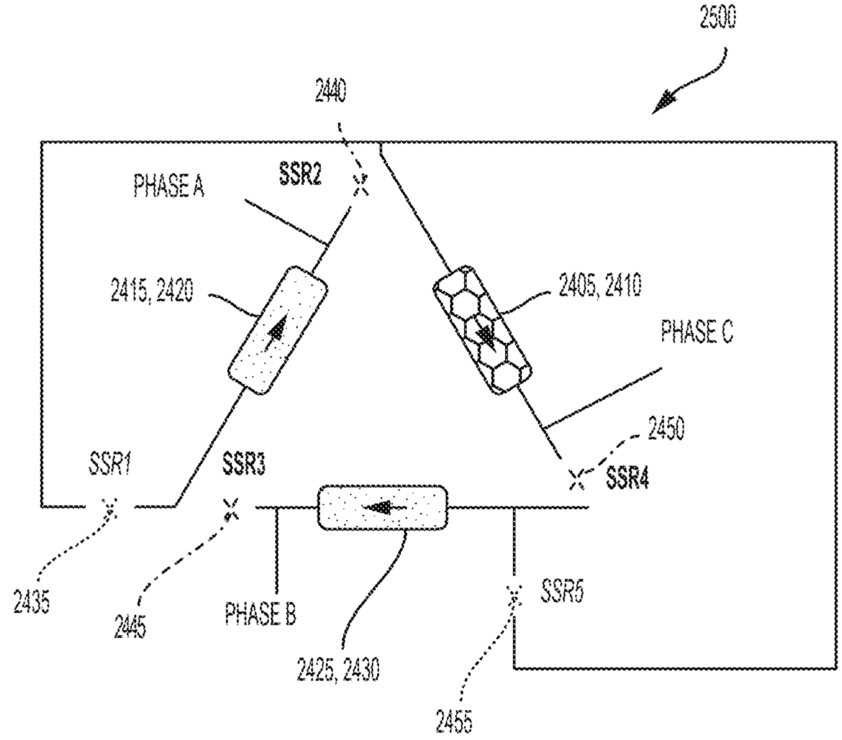
FIG. 25A illustrates a technique for configuring a motor in a DELTA configuration, according to some embodiments.

FIG. 25A illustrates a circuit 2500 for the stator in a DELTA configuration of the circuit 2400 of FIG. 24. In the DELTA configuration, the first switching point 2435 and the fifth switching point 2455 are configured to be OFF (i.e., non-conducting state), and the second switching point 2440, the third switching point 2445, and the fourth switching point 2450 are configured to be ON (i.e., conducting state). As a result, the phase windings 2405, 2410 include the second switching point 2440 (and associated switches), the phase windings 2415, 2420 include the third switching point 2445 (and associated switches), the phase windings 2425, 2430 include the fourth switching point 2450 (and associated switches).

Figure 25B:
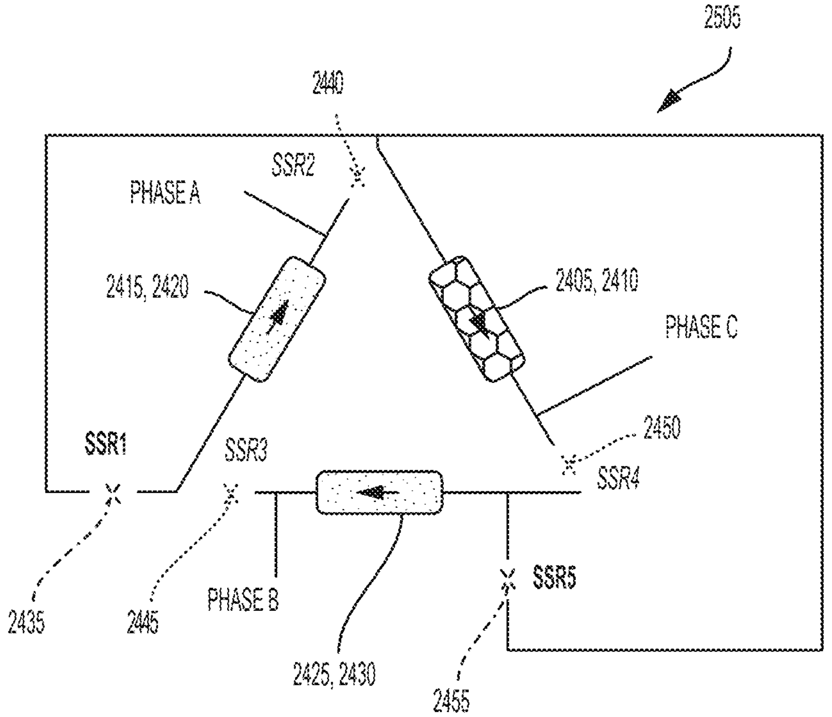
FIG. 25B illustrates a technique for configuring a motor in a WYE configuration, according to some embodiments.

FIG. 25B illustrates a circuit 2505 for the stator in a WYE configuration of the circuit 2400 of FIG. 24. In the WYE configuration, the first switching point 2435 and the fifth switching point 2455 are configured to be ON (i.e., conducting state), and the second switching point 2440, the third switching point 2445, and the fourth switching point 2450 are configured to be OFF (i.e., non-conducting state). As a result, the phase windings 2405, 2410 include the first switching point 2435 (and associated switches) and the phase windings 2425, 2430 include the fifth switching point 2455 (and associated switches).

Figure 26A:
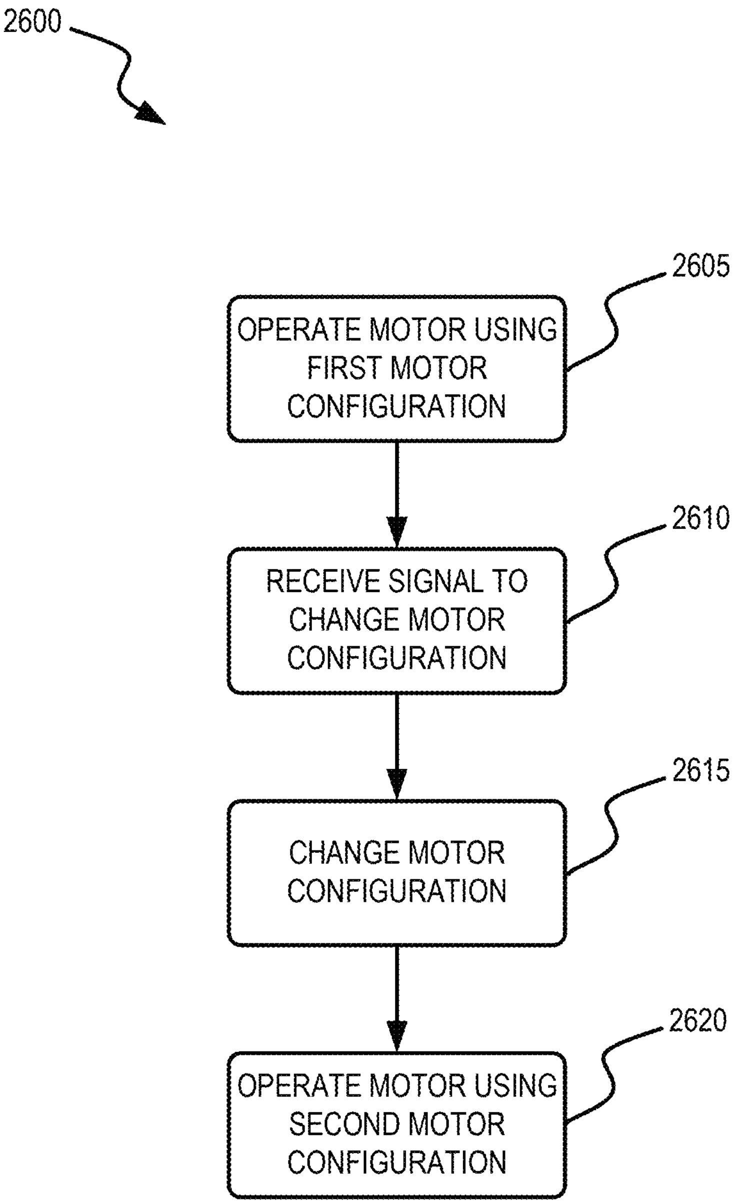
FIG. 26A is a flow chart of a method for changing a motor configuration, according to some embodiments.

FIG. 26A is a method 2600 for switching the circuit 2400 of FIG. 24 between the DELTA configuration of circuit 2500 and the WYE configuration of circuit 2505, and vice versa. The method 2600 includes operating the power tool 100 by the controller 304 with the motor 308 having the stator in a first motor configuration (BLOCK 2605). Operation of the power tool 100 generally refers to the motor 308 rotating in order to produce a rotational output of the drive mechanism 215. The rotational motion of the drive mechanism 215 is then used to produce a desired output operation, which varies by the type of power tool 100 (e.g., a rotational output, a reciprocating output, a pulling output, etc.). The method 2600 also includes receiving a signal to change the configuration of the motor 308 (BLOCK 2610). In some embodiments, the signal is provided by a user through the user input module(s) 336. For example, a user can select or adjust a shift point based on a particular application (e.g., wood, metal, embedded nail, etc.). In other embodiments, the signal is generated internally by the controller 304 based on a condition of the power tool 100 and/or motor 308. For example, the controller 304 can generate the signal to change motor configuration based on a speed of the motor, a torque of the motor, a current of the motor, a load point of the motor, a field weakening conduction angle of the motor, a type of battery pack connected to the power tool (e.g., based on the capacity of the battery pack), a state of charge of a battery pack (e.g., to optimize runtime over performance), grip strength above a threshold grip strength, a temperature (e.g., motor temperature) above or below a temperature threshold, etc. After the controller 304 determines that the motor configuration is to be changed, the method 2600 includes controlling the switching points 2435, 2440, 2445, 2450, 2455 to either switch the motor from the DELTA configuration to the WYE configuration or from the WYE configuration to the DELTA configuration (BLOCK 2615). In some embodiments, the motor 308 is allowed to coast (e.g., all switches in the inverter 348 OFF, pining one phase, etc.) for a predetermined amount of time (e.g., 600 μs) prior to changing the motor configuration to the DELTA configuration or the WYE configuration. The method 2600 also includes operating the power tool 100 and motor 308 with the modified motor configuration (BLOCK 2620).

Figure 26B:
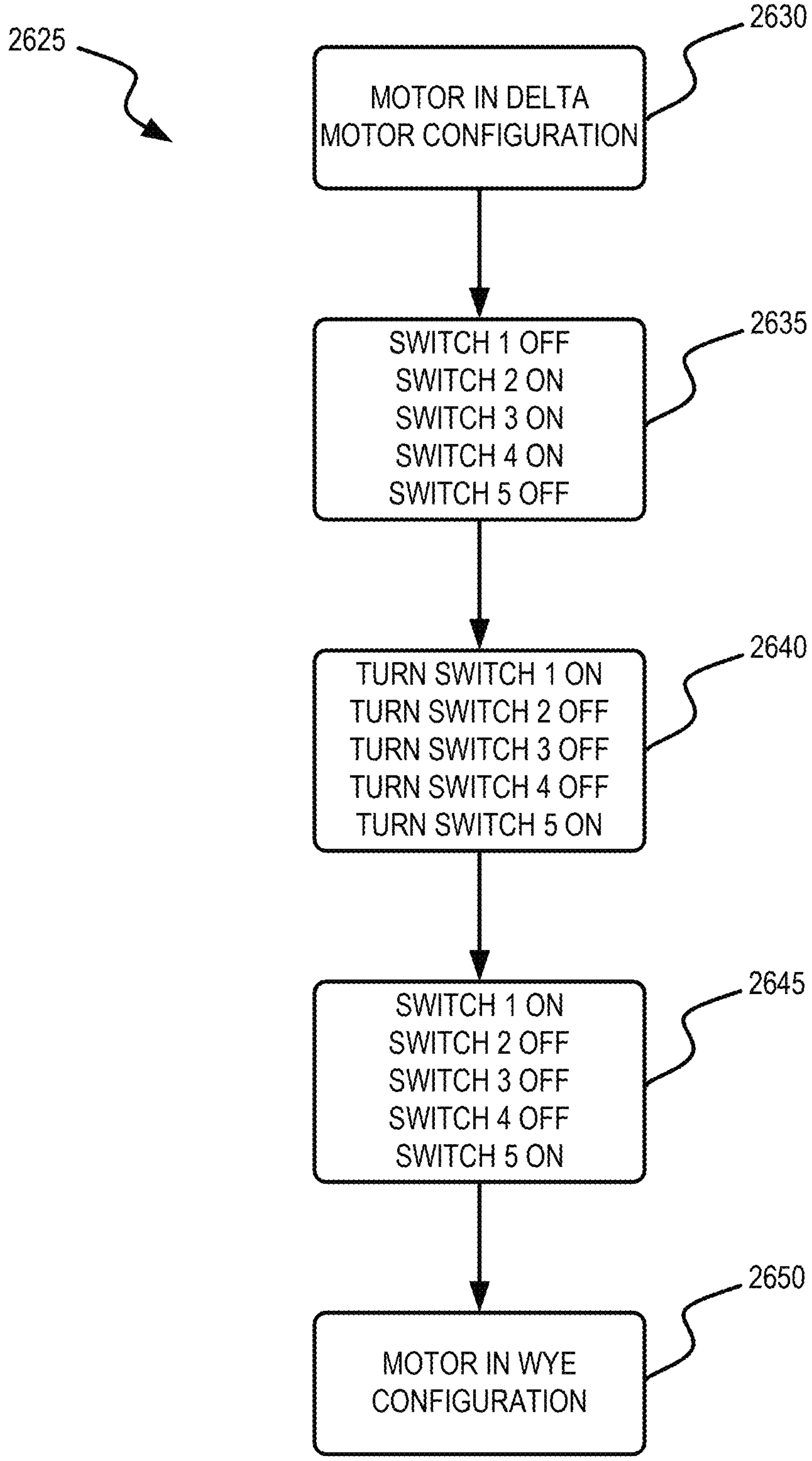
FIG. 26B is a flow chart of a method for changing a motor configuration, according to some embodiments.

FIG. 26B is a process 2625 for switching the circuit 2530 of FIG. 24 from the DELTA configuration of circuit 2500 to the WYE configuration of circuit 2505. At BLOCK 2630, the power tool 100 is being operated by the controller 304 with the stator in the DELTA configuration. In the DELTA configuration, the first switching point 2435 is OFF, the second switching point 2440 is ON, the third switching point 2445 is ON, the fourth switching point 2450 is ON, and the fifth switching point 2455 is OFF (BLOCK 2635). When the controller 304 switches from the DELTA configuration to the WYE configuration, the first switching point 2435 is turned ON, the second switching point 2440 is turned OFF, the third switching point 2445 is turned OFF, the fourth switching point 2450 is turned OFF, and the fifth switching point 2455 is turned ON (BLOCK 2640). The stator is now in the WYE configuration and the first switching point 2435 is ON, the second switching point 2440 is OFF, the third switching point 2445 is OFF, the fourth switching point 2450 is OFF, and the fifth switching point 2455 is ON (BLOCK 2645). The controller 304 then operates the power tool 100 and the motor 308 in the WYE configuration (BLOCK 2650).

Figure 26C:
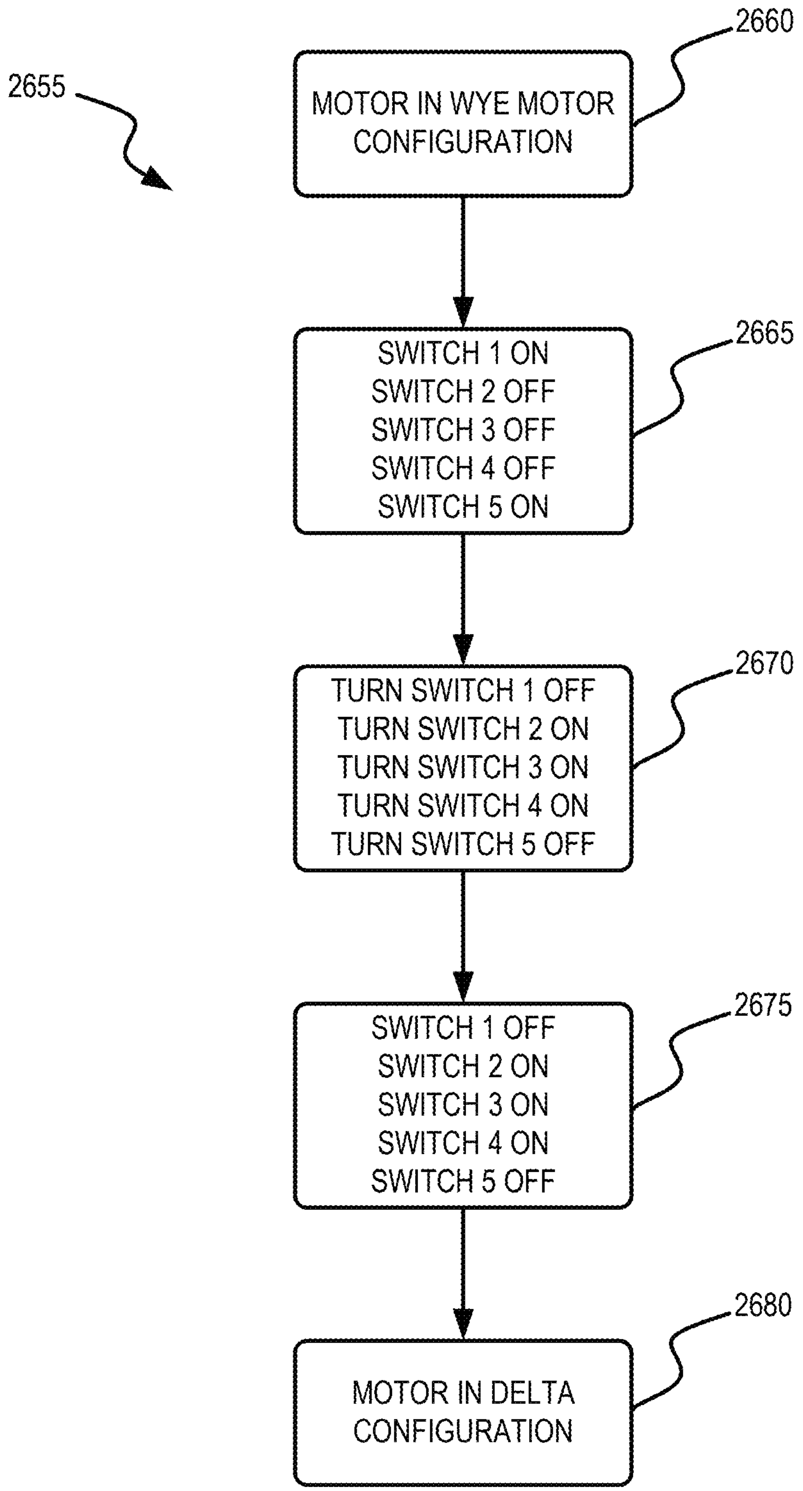
FIG. 26C is a flow chart of a method for changing a motor configuration, according to some embodiments.

FIG. 26C is a method 2655 for switching the circuit 2530 of FIG. 24 from the WYE configuration of circuit 2505 to the DELTA configuration of circuit 2500. At BLOCK 2660, the power tool 100 is being operated by the controller 304 with the stator in the WYE configuration. In the WYE configuration, the first switching point 2435 is ON, the second switching point 2440 is OFF, the third switching point 2445 is OFF, the fourth switching point 2450 is OFF, and the fifth switching point 2455 is ON (BLOCK 2665). When the controller 304 switches from the WYE configuration to the DELTA configuration, the first switching point 2435 is turned OFF, the second switching point 2440 is turned ON, the third switching point 2445 is turned ON, the fourth switching point 2450 is turned ON, and the fifth switching point 2455 is turned OFF (BLOCK 2670). The stator is now in the DELTA configuration and the first switching point 2435 is OFF, the second switching point 2440 is ON, the third switching point 2445 is ON, the fourth switching point 2450 is ON, and the fifth switching point 2455 is OFF (BLOCK 2675). The controller 304 then operates the power tool 100 and the motor 308 in the DELTA configuration (BLOCK 2680).

Figure 27:
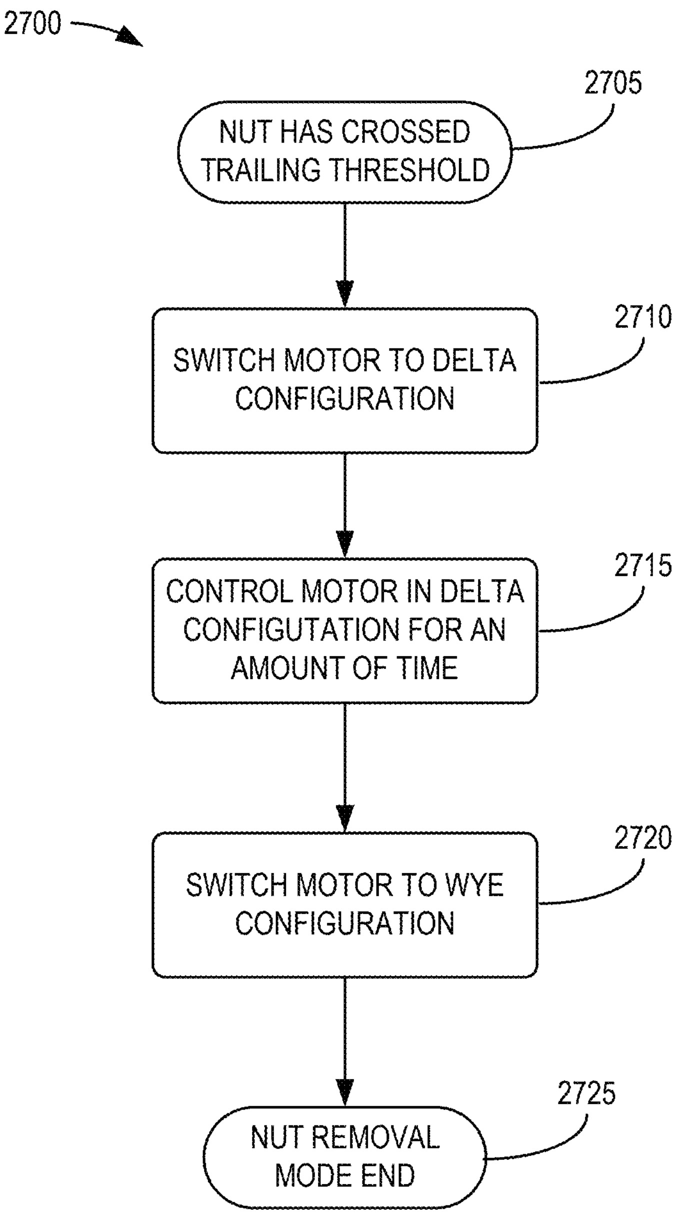
FIG. 27 is a flow chart of a method for implementing an adaptive nut removal mode in a power tool via switching between a WYE configuration and a DELTA configuration, according to some embodiments.

FIG. 27 is a flow chart of a method 2700 for implementing an adaptive nut removal mode in a power tool via motor configuration switching. The method 2700 begins when the nut has broken away from a joint (e.g., crossed a trailing threshold), for example in BLOCK 615 of FIG. 6 (i.e., the method 2700 occurs in BLOCK 620) (BLOCK 2705). The method includes increasing a speed of the motor 308 by switching the motor 308 from a WYE configuration to a DELTA configuration (e.g., the method 2355 of FIG. 23C or the method 2655 of FIG. 26C) (BLOCK 2710). In some embodiments, the motor 308 may begin in a DELTA configuration and switch to a WYE configuration. The method 2700 also includes controlling the motor 308 in the DELTA configuration for an amount of time (e.g., a predetermined amount of time) (BLOCK 2715). In some embodiments, the predetermined time may be a calculated time until the nut disengages from the other fastener. In other embodiments, the predetermined time may be set by an operator of the power tool 100. In still other embodiments, the predetermined time may be identified based on a parameter of the power tool 100. Following the predetermined time, the method 2700 can include switching the motor 308 from the DELTA configuration to the WYE configuration (BLOCK 2720). This reduces a speed of the motor 308 and allows the power tool 100 to retain greater control of the nut once the nut has disengaged entirely from the other fastener. The method 2700 ends when the nut removal mode ends (for example, in BLOCK 625 of FIG. 6) (BLOCK 2725).

It is to be understood that, while embodiments described above have accomplished the adaptive nut removal mode via dynamic field weakening or motor configuration switching, further embodiments may accomplish the adaptive nut removal mode via a combination of dynamic field weakening and motor configuration switching.

Figure 28A:
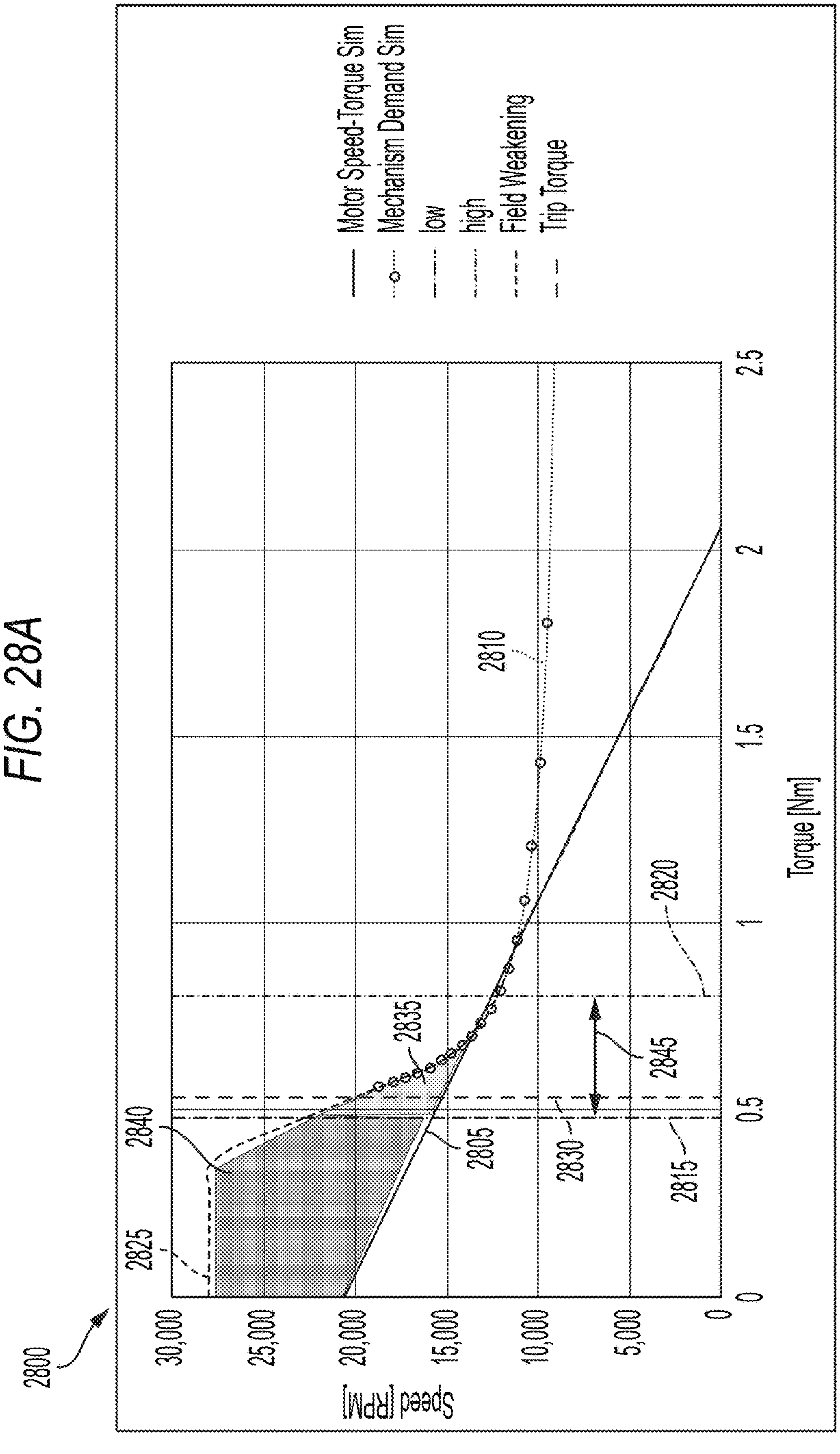
FIGS. 28A and 28B are graphs of various relationships between motor speed and motor torque of a power tool implementing an adaptive nut removal mode, according to some embodiments.

FIG. 28A is a graph 2800 of various relationships between motor speed and motor torque of a power tool implementing an adaptive nut removal mode (for example, the power tool 100). The graph 2800 includes a line 2805 representing a speed-torque curve of a motor of the power tool 100 (for example, the motor 308). The graph 2800 also includes a line 2810 representing a mechanism demand (e.g., the torque and speed combinations that achieve consistent engagement between the hammer and anvil lugs), and identifies where additional speed applied by the motor of the power tool 100 would be useful in delivering more power though the mechanism. The graph 2800 also includes a first vertical line 2815 representing a low torque threshold and a second vertical line 2820 representing a high torque threshold. An arrow 2845 between the first vertical line 2815 and the second vertical line 2820 represents an operating range of the adaptive nut removal mode. Within this range, the rebound coefficient may be between 0.1 and 0.2. The graph 2800 also includes a line 2825 representing field weakening in the motor 308. The graph 2800 also includes a vertical line 2830 representing a trip torque or trailing torque of the motor 308 (i.e., the torque at which the motor 308 begins the adaptive nut removal mode). The trip torque is generally higher than a minimum motor torque and is affected by inertia and acceleration of the motor 308. Higher acceleration generally reduces the trip torque. The graph 2800 also includes a first shaded region 2835 and a second shaded region 2840. The first shaded region 2835 represents the first region of the adaptive nut removal mode (for example, the first region 815 or 2025). The second shaded region 2840 represents the second region of the adaptive nut removal mode (for example, the second region 820 or 2030). The power tool 100 may experience the most benefit to nut removal within the cross-section of the first shaded region 2835 and the vertical line 2830.

Figure 28B:
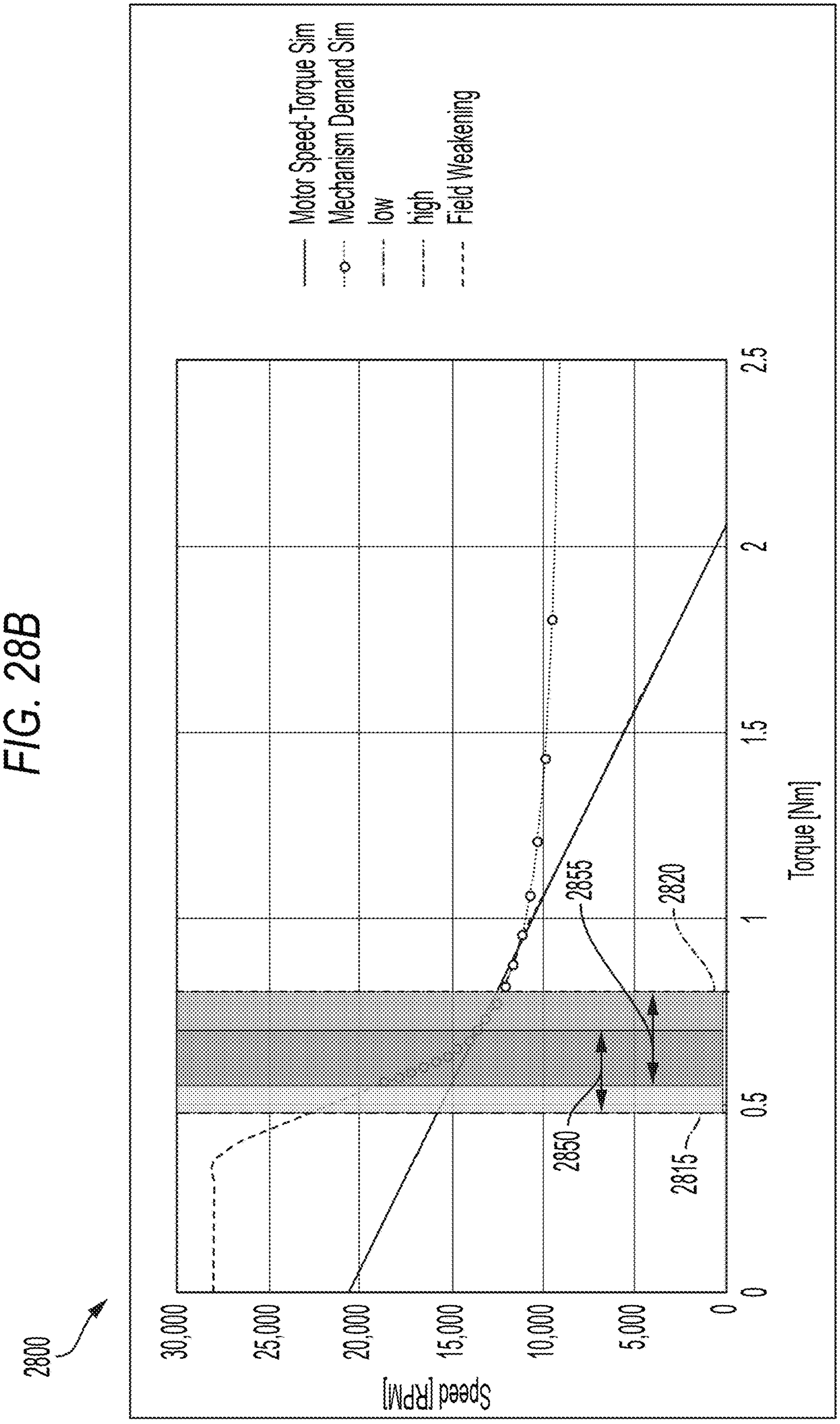

FIG. 28B is similar to FIG. 28A but additionally includes a first arrow 2850 indicating a third shaded region starting at the first vertical line 2815 and a second arrow 2855 indicating a fourth shaded region starting at the second vertical line 2820. The third shaded region represents the operating range of the adaptive nut removal mode while removing a nut from a soft joint. The rebound coefficient of the soft joint is e=0.1, and the operating parameters are given below in Table (1).

TABLE 1

Operating Parameters for a Soft Joint (e = 0.1)

| e = 0.1 | Torque [Nm] | Speed [rpm] |
|---|---|---|
| Average | 0.584 | 14,793 |
| Max | 0.660 | 15,834 |
| Min | 0.480 | 14,086 |

The fourth shaded region represents the operating range of the adaptive nut removal mode while removing a nut from a hard joint. The rebound coefficient of the hard joint is e=0.4, and the operating parameters are given below in Table (2).

TABLE 2

Operating Parameters for a Hard Joint (e = 0.4)

| e = 0.4 | Torque [Nm] | Speed [rpm] |
|---|---|---|
| Average | 0.688 | 13,759 |
| Max | 0.805 | 15,528 |
| Min | 0.511 | 12,585 |

Thus, embodiments described herein provide systems and methods for implementing an adaptive nut removal mode for a power tool. Various features and advantages are set forth in the following claims.

What is claimed is:

1. A power tool comprising:

a housing;

a motor within the housing, the motor including a rotor and a stator, the stator including a plurality of stator windings;

a power switching circuit configured to provide a supply of power from a power source to the motor; and an electronic controller configured to control the power tool to remove a fastener from a joint, the electronic controller configured to:

monitor a torque of the motor, determine whether the torque of the motor is equal to or less than a threshold torque value, operate, when the torque of the motor is greater than the threshold torque value, the motor in a loosening mode while the torque of the motor decreases, and increase, when the torque of the motor is equal to or less than the threshold torque value, a speed of the motor.

2. The power tool of claim 1, wherein the electronic controller is further configured to apply an amount of field weakening to increase the speed of the motor.

3. The power tool of claim 2, wherein the electronic controller is further configured to control the motor to maintain the increased speed of the motor for a predetermined time.

4. The power tool of claim 3, wherein the electronic controller is further configured to reduce the amount of field weakening to decrease the speed of the motor after the predetermined time.

5. The power tool of claim 1, further comprising a plurality of switches configured to selectively couple the plurality of stator windings in a first configuration or a second configuration.

6. The power tool of claim 5, wherein the electronic controller is further configured to change a motor configuration of the motor from the first configuration to the second configuration to increase the speed of the motor.

7. The power tool of claim 6, wherein the first configuration is a WYE configuration and the second configuration is a DELTA configuration.

8. A method implemented on a power tool for removing a fastener, the method comprising:

monitoring a torque of a motor of the power tool;

determining whether the torque of the motor is equal to or less than a threshold torque value;

operating, when the torque of the motor is greater than the threshold torque value, the motor in a loosening mode while the torque of the motor decreases, and increasing, when the torque of the motor is equal to or less than the threshold torque value, a speed of the motor.

9. The method of claim 8, the method further comprising:

applying an amount of field weakening to increase the speed of the motor.

10. The method of claim 9, the method further comprising:

controlling the motor to maintain the increased speed of the motor for a predetermined time.

11. The method of claim 10, the method further comprising:

reducing the amount of field weakening to decrease the speed of the motor after the predetermined time.

12. The method of claim 8, wherein the power tool includes a plurality of switches and a plurality of stator windings, the method further comprising:

coupling, selectively, the plurality of switches to the plurality of stator windings in a first configuration or a second configuration.

13. The method of claim 12, the method further comprising:

changing a motor configuration of the motor from the first configuration to the second configuration to increase the speed of the motor.

14. The method of claim 13, wherein the first configuration is a WYE configuration and the second configuration is a DELTA configuration.

15. A non-transitory computer-readable medium storing a set of computer executable instructions for controlling operation of a power tool to:

monitor a torque of a motor of the power tool;

determine whether the torque of the motor is equal to or less than a threshold torque value;

operate, when the torque of the motor is greater than the threshold torque value, the motor in a loosening mode while the torque of the motor decreases, and increase, when the torque of the motor is equal to or less than the threshold torque value, a speed of the motor.

16. The non-transitory computer-readable medium of claim 15, further storing computer executable instructions for controlling operation of a power tool to:

apply an amount of field weakening to increase the speed of the motor.

17. The non-transitory computer-readable medium of claim 16, further storing computer executable instructions for controlling operation of a power tool to:

control the motor to maintain the increased speed of the motor for a predetermined time.

18. The non-transitory computer-readable medium of claim 17, further storing computer executable instructions for controlling operation of a power tool to:

reduce the amount of field weakening to decrease the speed of the motor after the predetermined time.

19. The non-transitory computer-readable medium of claim 15, further storing computer executable instructions for controlling operation of a power tool to: change a motor configuration of the motor from the second configuration to the first configuration to decrease the speed of the motor.

20. The non-transitory computer-readable medium of claim 15, wherein the first configuration is a WYE configuration and the second configuration is a DELTA configuration.

* * * * *